US010972852B2

(12) United States Patent
Munoz et al.

(10) Patent No.: US 10,972,852 B2
(45) Date of Patent: Apr. 6, 2021

(54) ADAPTING AUDIO STREAMS FOR RENDERING

(71) Applicant: QUALCOMM Incorporated, San Diego, CA (US)

(72) Inventors: Isaac Garcia Munoz, San Diego, CA (US); Siddhartha Goutham Swaminathan, San Diego, CA (US); Nils Günther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/918,372

(22) Filed: Jul. 1, 2020

(65) Prior Publication Data
US 2021/0006918 A1 Jan. 7, 2021

Related U.S. Application Data

(60) Provisional application No. 62/870,584, filed on Jul. 3, 2019.

(51) Int. Cl.
*H04S 7/00* (2006.01)
*H04R 3/12* (2006.01)
(Continued)

(52) U.S. Cl.
CPC ............. *H04S 7/30* (2013.01); *G10L 19/167* (2013.01); *H04R 3/12* (2013.01); *H04W 4/44* (2018.02);
(Continued)

(58) Field of Classification Search
None
See application file for complete search history.

(56) References Cited

U.S. PATENT DOCUMENTS 10,657,974 B2   5/2020 Kim et al.
10,812,921 B1 * 10/2020 Hinthorn ................ H04R 1/406
(Continued)

FOREIGN PATENT DOCUMENTS

EP   2798636 A1   11/2014
WO   2013006338 A2   1/2013
WO   2018064528 A1   4/2018

OTHER PUBLICATIONS

Audio: "Call for Proposals for 3D Audio", International Organisation for Standardisation Organisation Internationale De Normalisation, ISO/IEC JTC1/SC29/WG11, Coding of Moving Pictures and Audio, ISO/IEC JTC1/SC29/WG11/N13411, Geneva, Jan. 2013, pp. 1-20.

(Continued)

*Primary Examiner* — Paul W Huber
(74) *Attorney, Agent, or Firm* — Shumaker & Sieffert, P.A.

(57) ABSTRACT

In general, techniques are described for adapting audio streams for rendering. A device comprising a memory and one or more processors may be configured to perform the techniques. The memory may store a plurality of audio streams that include one or more sub-streams. The one or more processors may determine, based on the plurality of audio streams, a total number of the one or more sub-streams for all of the plurality of audio streams, and adapt, when the total number of the sub-streams is greater than a render threshold, the plurality of audio streams to decrease the number of the one or more sub-streams and obtain an adapted plurality of audio streams. The one or more processors may also apply the renderer to the adapted plurality of audio streams to obtain the one or more speaker feeds, and output the one or more speaker feeds to one or more speakers.

30 Claims, 28 Drawing Sheets

(51) Int. Cl.
    *G10L 19/16*    (2013.01)
    *H04W 4/44*    (2018.01)
(52) U.S. Cl.
    CPC ....... *H04R 2499/13* (2013.01); *H04S 2420/11* (2013.01)

(56) References Cited

U.S. PATENT DOCUMENTS

| | | | |
|---|---|---|---|
| 2011/0249821 | A1 | 10/2011 | Jaillet et al. |
| 2011/0268425 | A1* | 11/2011 | Glen ...................... H04N 19/44 386/272 |
| 2013/0322648 | A1 | 12/2013 | Chukka et al. |
| 2016/0080886 | A1* | 3/2016 | De Bruijn ............... H04S 7/302 381/17 |
| 2017/0180905 | A1* | 6/2017 | Purnhagen ............ G10L 19/008 |
| 2018/0315437 | A1 | 11/2018 | Edry et al. |
| 2019/0007781 | A1 | 1/2019 | Peters et al. |

OTHER PUBLICATIONS

Bianchi et al., "The Ray Space Transform: A New Framework for Wave Field Processing", IEEE Transactions on Signal Processing, vol. 64, No. 21, Nov. 1, 2016, pp. 5696-5706.
ETSI TS 103 589 V1.1.1, "Higher Order Ambisonics (HOA) Transport Format", Jun. 2018, 33 pages.
Herre J., et al., "MPEG-H 3D Audio—The New Standard for Coding of Immersive Spatial Audio", IEEE Journal of Selected Topics in Signal Processing, vol. 9, No. 5, Aug. 1, 2015 (Aug. 1, 2015), XP055243182, pp. 770-779, US ISSN: 1932-4553, DOI: 10.1109/JSTSP.2015.2411578.
Hollerweger F., "An Introduction to Higher Order Ambisonic", Oct. 2008, pp. 1-13, Accessed online [Jul. 8, 2013].
"Information Technology—Dynamic Adaptive Streaming Over HTTP (DASH)—Part 1: Media Presentation Description and Segment Formats", ISO/IEC 23009-1, International Standard, Draft Third Edition, Jan. 9, 2017, 216 pages.
"Information Technology—High Efficiency Coding and Media Delivery in Heterogeneous Environments—Part 3: 3D Audio", ISO/IEC JTC 1/SC 29, ISO/IEC DIS 23008-3, Jul. 25, 2014, 433 Pages.
"Information Technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.
"Information Technology—High Efficiency Coding and Media Delivery in Heterogeneous Environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 Pages.
International Search Report and Written Opinion—PCT/US2020/040634—ISA/EPO—dated Nov. 13, 2020 23 Pages.
ISO/IEC/JTC: "ISO/IEC JTC 1/SC 29 N ISO/IEC CD 23008-3 Information Technology—High Efficiency Coding and Media Delivery in Heterogeneous Environments—Part 3: 3D Audio", Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].
Markovic et al., "Multiview Soundfield Imaging in the Projective Ray Space", IEEE/ACM Transactions on Audio, Speech, and Language Processing, vol. 23, No. 6, Jun. 2015, pp. 1054-1067.
Partial International Search Report—PCT/US2020/040634—ISA/EPO—dated Sep. 14, 2020 13 Pages.
Patricio et al., "Toward Six Degrees of Freedom Audio Recording and Playback Using Multiple Ambisonics Sound Fields", Audio Engineering Society, Convention Paper 10141, Presented at the 146th Convention Mar. 20-23, 2019, Dublin, Ireland, pp. 1-9.
Peterson J., et al., "Virtual Reality, Augmented Reality, and Mixed Reality Definitions", EMA, version 1.0, Jul. 7, 2017, 4 Pages.
Pezzoli et al., "Estimation of the Sound Field at Arbitrary Positions in Distributed Microphone Networks Based on Distributed Ray Space Transform", IEEE, 2018, pp. 186-190.
Plinge A., et al., "Enhanced Immersion for Binaural Audio Reproduction of Ambisonics in Six-Degrees-of-Freedom: The Effect of Added Distance Information", 5th International Conference on Spatial Audio ICSA, Sep. 2019, 9 Pages.
Poletti M.A., "Three-Dimensional Surround Sound Systems Based on Spherical Harmonics", The Journal of the Audio Engineering Society, vol. 53, No. 11, Nov. 2005, pp. 1004-1025.
Quain J., "Cars will Talk to One Another. Exactly How is Less Certain", Wheels, Mar. 9, 2017, 2 pages, https://nyti.ms/2mq8oLJ.
Schonefeld V., "Spherical Harmonics", Jul. 1, 2005, XP002599101, 25 Pages, Accessed online [Jul. 9, 2013] at URL:http://heim.c-otto.de/~volker/prosem_paper.pdf.
Sen D., et al., "RM1-HOA Working Draft Text", 107. MPEG Meeting, Jan. 13, 2014-Jan. 17, 2014, San Jose, (Motion Picture Expert Group or ISO/IEC JTC1/SC29/WG11), No. M31827, Jan. 11, 2014 (Jan. 11, 2014), XP030060280, 83 Pages, p. 11, paragraph 5.2.4-paragraph 5.2.5 p. 16, paragraph 6.1.10-p. 17; Figure 4 p. 18, paragraph 6.3-p. 22, Paragraph 6.3.2.2 p. 64, paragraph B.1-p. 66, Paragraph B.2.1; figures B.1, B.2 p. 70, paragraph B.2.1.3-p. 71 p. 74, paragraph B.2.4.1-p. 75, Paragraph B.2.4.2.
Sen D., et al., "Technical Description of the Qualcomm's HoA Coding Technology for Phase II", 109th MPEG Meeting, Jul. 7, 2014-Jul. 11, 2014, Sapporo, (Motion Picture Expert Group or ISO/IEC JTC1/SC29/WG11), No. M34104, Jul. 2, 2014 (Jul. 2, 2014), XP030062477, 4 Pages, figure 1.
Tylka et al., "Fundamentals of a Parametric Method for Virtual Navigation Within an Array of Ambisonics Microphones", Journal of the Audio Engineering Society, vol. 68, No. 3, Mar. 2020, pp. 120-137.
Tylka J.G., et al., "Comparison of Techniques for Binaural Navigation of Higher-Order Ambisonic Soundfields", AES 139 Convention Paper: 9421, 3D Audio and Applied Acoustics Laboratory, Princeton University, 2015, 1 page.
Tylka J.G., et al., "Soundfield Navigation using an Array of Higher-Order Ambisonics Microphones", AES International Conference on Audio for Virtual and Augmented Reality, 3D Audio and Applied Acoustics (3D3A) Laboratory, Princeton University, Sep. 30, 2016, pp. 1-22.
Yang G., "Cellular V2X Making Progress and Auto Industry Engagement Needed", Infotainment and Telematics, Strategy Analytics, Sep. 2017, pp. 1-8.
Zheng X., "Soundfield Navigation: Separation Compression and Transmission", School of Electrical, Computer, and Telecommunications Engineering, University of Wollongong, 2013, 254 Pages.
First Toyota cars to include V2V and V2I communication by the end of 2015, available at • http://sites.ieee.org/connected-vehicles/2015/09/30/first-toyota-cars-to-include-v2v-and-v2i-communication-bythe-end-of-2015, Sep. 30, 2015, 4 Pages.
Sorensen, J., "A Proposed Communications Architecture for Connected Vehicles," available at https://terranautix.files.wordpress.com/2013/02/dsrc-cell_diagram.jpg, Feb. 7, 2013, 1 Page.
Untitled, accessed on Jun. 10, 2019, available at https://g.foolcdn.com/image/?url=https%3A%2F%2Fg.foolcdn.com%2Feditorial%2Fimages%2F440323%2Fself-driving-car-software-hud.jpg&h=630&w=1200&op=resize, 1 Page.
Alamy stock photo, untitled, accessed on Jun. 10, 2019, available at http://c8.alamy.com/comp/J6BJ49/smart-car-hud-concept-empty-cockpit-in-vehicle-and-self-driving-mode-J6BJ49.jpg, 1 Page.

* cited by examiner

ADAPTING AUDIO STREAMS FOR RENDERING

This application claims the benefit of U.S. Provisional Application No. 62/870,584, entitled "ADAPTING AUDIO STREAMS FOR RENDERING," filed Jul. 3, 2019, the entire contents of which are hereby incorporated in their entirety as if set forth fully herein.

TECHNICAL FIELD

This disclosure relates to processing of audio data.

BACKGROUND

There are a number of contexts in which rendering of audio data may not be suited to particular audio data. For example, some vehicles or other types of devices (such as extended reality—XR—devices, which may refer to virtual reality—VR—devices, augmented reality—AR—devices, and/or mixed reality—MR—devices) may only feature renderers that support certain formats due to processing, memory, power, or other constraints. Audio streams are increasingly being provided in a variety of formats that may not be suitable for the vehicles and/or XR devices, thereby limiting the audio experience in these contexts.

SUMMARY

This disclosure relates generally to adapting audio streams for rendering.

In one example, various aspects of the techniques are directed to a device configured to play one or more of a plurality of audio streams, the device comprising: a memory configured to store a plurality of audio streams, each of the plurality of audio streams representative of a soundfield and include one or more sub-streams; and one or more processors coupled to the memory, and configured to: determine, based on the plurality of audio streams, a total number of the one or more sub-streams for all of the plurality of audio streams; adapt, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio streams including a reduced total number of the one or more sub-streams that is equal to or less than the render threshold; apply the renderer to the adapted plurality of audio streams to obtain the one or more speaker feeds; and output the one or more speaker feeds to one or more speakers.

In another example, various aspects of the techniques are directed to a method of playing one or more of a plurality of audio streams, the method comprising: storing, by one or more processors, a plurality of audio streams, each of the plurality of audio streams representative of a soundfield and include one or more sub-streams; determining, by the one or more processors and based on the plurality of audio streams, a total number of the one or more sub-streams for all of the plurality of audio streams; adapting, by the one or more processors and when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold; applying, by the one or more processors, the renderer to the adapted plurality of audio streams to obtain the one or more speaker feeds; and outputting, by the one or more processors, the one or more speaker feeds to one or more speakers.

In another example, various aspects of the techniques are directed to a device configured to play one or more of a plurality of audio streams, the device comprising: means for storing a plurality of audio streams, each of the plurality of audio streams representative of a soundfield and include one or more sub-streams; means for determining, based on the plurality of audio streams, a total number of the one or more sub-streams for all of the plurality of audio streams; means for adapting, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold; means for applying the renderer to the adapted plurality of audio streams to obtain the one or more speaker feeds; and means for outputting the one or more speaker feeds to one or more speakers.

In another example, various aspects of the techniques are directed to a non-transitory computer-readable storage medium having stored thereon instructions that, when executed, cause one or more processors to: store a plurality of audio streams, each of the plurality of audio streams representative of a soundfield and include one or more sub-streams; determine, based on the plurality of audio streams, a total number of the one or more sub-streams for all of the plurality of audio streams; adapt, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold; apply the renderer to the adapted plurality of audio streams to obtain the one or more speaker feeds; and output the one or more speaker feeds to one or more speakers.

In another example, various aspects of the techniques are directed to a device configured to play one or more of a plurality of audio streams, the device comprising: a memory configured to store the plurality of audio streams and corresponding audio metadata, each of the plurality of audio streams representative of a soundfield, and the audio metadata includes origination coordinates at which each of the corresponding one of the plurality of audio streams originates; and one or more processors coupled to the memory, and configured to: determine, based on current coordinates of the device relative to the origination coordinates corresponding to one or more of the plurality of audio streams, a direction of arrival for each of the one or more of the plurality of audio streams; render, based on each of the directions of arrival, each of the one or more of the plurality of audio streams to one or more speaker feeds that spatialize the one or more of the plurality of audio streams to appear to arrive from each of the directions of arrival; and output the one or more speaker feeds to reproduce one or more of the soundfields represented by the one or more of the plurality of audio streams.

In another example, various aspects of the techniques are directed to a method of playing one or more of a plurality of audio streams, the device comprising: storing, by a memory, the plurality of audio streams and corresponding audio metadata, each of the plurality of audio streams representative of a soundfield, and the audio metadata includes origination coordinates at which each of the corresponding one of the plurality of audio streams originates; and determining, by one or more processors and based on current coordinates of the device relative to the origination coordinates corresponding to one or more of the plurality of audio streams, a direction of arrival for each of the one or more of the plurality of audio streams; rendering, by the one or more processors and based on each of the directions of arrival, each of the one or more of the plurality of audio streams to one or more speaker feeds that spatialize the one or more of the plurality of audio streams to appear to arrive from each of the directions of arrival; and outputting, by the one or more processors, the one or more speaker feeds to reproduce one or more of the soundfields represented by the one or more of the plurality of audio streams.

In another example, various aspects of the techniques are directed to a device configured to play one or more of a plurality of audio streams, the device comprising: means for storing the plurality of audio streams and corresponding audio metadata, each of the plurality of audio streams representative of a soundfield, and the audio metadata includes origination coordinates at which each of the corresponding one of the plurality of audio streams originates; and means for determining, based on current coordinates of the device relative to the origination coordinates corresponding to one or more of the plurality of audio streams, a direction of arrival for each of the one or more of the plurality of audio streams; means for rendering, based on each of the directions of arrival, each of the one or more of the plurality of audio streams to one or more speaker feeds that spatialize the one or more of the plurality of audio streams to appear to arrive from each of the directions of arrival; and means for outputting the one or more speaker feeds to reproduce one or more of the soundfields represented by the one or more of the plurality of audio streams.

In another example, various aspects of the techniques are directed to a non-transitory computer-readable storage medium having stored thereon instructions that, when executed, cause one or more processors to: store a plurality of audio streams and corresponding audio metadata, each of the plurality of audio streams representative of a soundfield, and the audio metadata includes origination coordinates at which each of the corresponding one of the plurality of audio streams originates; and determine, based on current coordinates of the device relative to the origination coordinates corresponding to one or more of the plurality of audio streams, a direction of arrival for each of the one or more of the plurality of audio streams; render, based on each of the directions of arrival, each of the one or more of the plurality of audio streams to one or more speaker feeds that spatialize the one or more of the plurality of audio streams to appear to arrive from each of the directions of arrival; and output the one or more speaker feeds to reproduce one or more of the soundfields represented by the one or more of the plurality of audio streams.

The details of one or more examples of this disclosure are set forth in the accompanying drawings and the description below. Other features, objects, and advantages of various aspects of the techniques will be apparent from the description and drawings, and from the claims.

BRIEF DESCRIPTION OF DRAWINGS

FIGS. 2D-2K are diagrams illustrating example operations of application of privacy settings by the source device and/or content consumer device shown in the examples of FIGS. 1A and 1B.

DETAILED DESCRIPTION

Figure 1A:
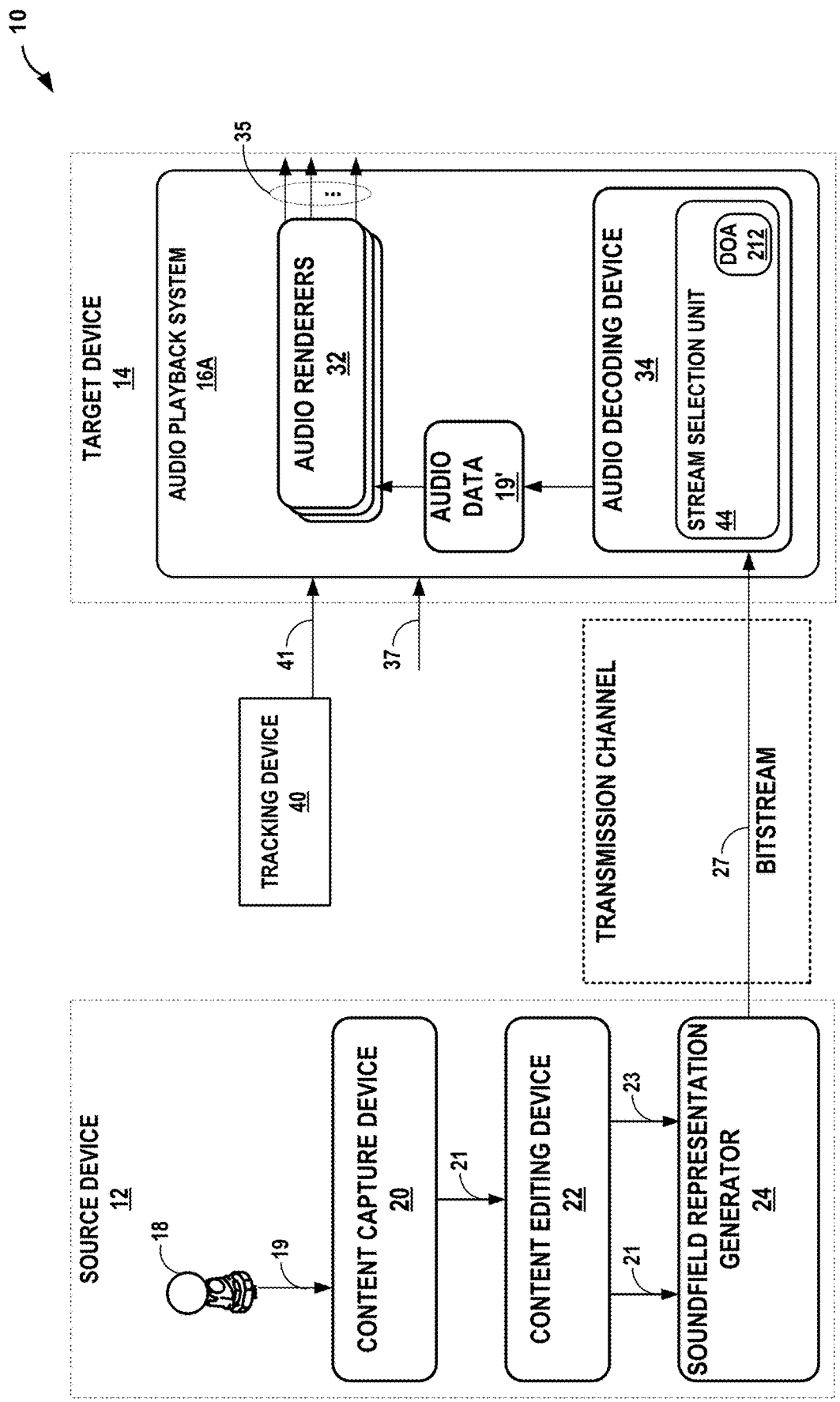
FIGS. 1A and 1B are diagrams illustrating a systems that may perform various aspects of the techniques described in this disclosure.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include metadata identifying a location of the audio object relative to a listener or other point of reference in the soundfield, such that the audio object may be rendered to one or more speaker channels for playback in an effort to recreate the soundfield. The techniques described in this disclosure may apply to any of the foregoing formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty}\left[4\pi \sum_{n=0}^{\infty} j_n(kr_r) \sum_{m=-n}^{n} A_n^m(k) Y_n^m(\theta_r, \varphi_r)\right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r,\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (i.e., $S(\omega, r_r, \theta_r, \theta_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

With the growth of connectivity (e.g., cellular and other wireless forms of communication), the ability to capture and stream media content is growing, enabling live streaming or other forms of streaming by nearly anyone with a mobile device (or other types of devices). As such, a mobile device may capture a soundfield using one of the representations discussed above, and generate an audio stream, which the mobile device may send to anyone that wants to listen. In certain contexts, the audio stream may convey useful information or merely provide entertainment (e.g., music, etc.).

One area in which audio streaming may provide benefits is in the context of vehicles. Vehicle to anything (V2X) communication may enable a device, such as a mobile phone, to interface with a vehicle to stream audio data. In some contexts, the vehicle headunit may obtain the audio streams and reproduce, via one or more speakers, the soundfields represented by the audio streams. In other contexts, the mobile device may output speaker feeds, which the vehicle obtains and uses to reproduce the soundfields. In any event, V2X communication may allow vehicles to communicate with mobile devices or even other vehicles to obtain audio streams.

The vehicle may perform inter-vehicle communication via the V2X protocol to communicate audio streams between vehicles. In some examples, the audio streams may represent spoken words by an occupant of a first vehicle that a second vehicle may play such that an occupant of the second vehicle may hear the spoken words. The spoken words may be commands representative of a future action of the occupant of the first vehicle (e.g., "passing on the left"). In other examples, the audio streams may represent audio streams of entertainment (e.g., streaming music) that the first vehicle shares with the second vehicle.

Another area in which audio streaming may provide benefits is in extended reality (XR). XR devices may include virtual reality (VR) devices, augmented reality (AR) devices, and mixed reality (MR) devices. XR devices may retrieve and render the audio streams to enable various operations, such as virtual attendance of events, parties, sporting functions, conferences, etc., teleportation (which enables a user to view or experience another persons experience, such as becoming a co-pilot in a vehicle, etc.), remote surgery, and the like.

However, vehicles and some XR devices may only be able to render a certain number of sub-streams included in the audio streams. When attempting to render multiple audio streams or some particular kind of audio data represented by the audio stream (such as ambisonic audio data having a large number of coefficients for each sample), the device may not be able to render all of the sub-streams of all of the audio streams. That is, there are processor, memory or other physical hardware limitations (e.g., bandwidth) that may prevent existing devices from retrieving and processing all available sub-streams of the audio streams, particularly as the audio streams may require significant bandwidth and processing resources in certain contexts (such as ambisonic coefficients corresponding to spherical basis functions of higher, e.g., third, fourth, fifth, sixth, etc., orders).

In accordance with various aspects of the techniques, a device (e.g., mobile handset, vehicle, vehicle headunit, and/or XR device) may operate in a systematic way to adaptively select a subset of the plurality of audio streams and/or sub-streams. The device may include any audio streams identified by user presents but otherwise remove, form the audio streams, any audio streams that originate from distant locations (as the audio stream may include audio metadata defining an origination location for spatialized rendering purposes as described in more detail below), any higher order ambisonic coefficients (through order reduction), and any streams having a private designation or other privacy setting set. In this manner, various sub-streams associated with the audio streams may be removed to accommodate rendering constraints of the device, thereby enabling the device to render nearly any different type of audio stream and improving operation of the device itself.

Figure 1B:
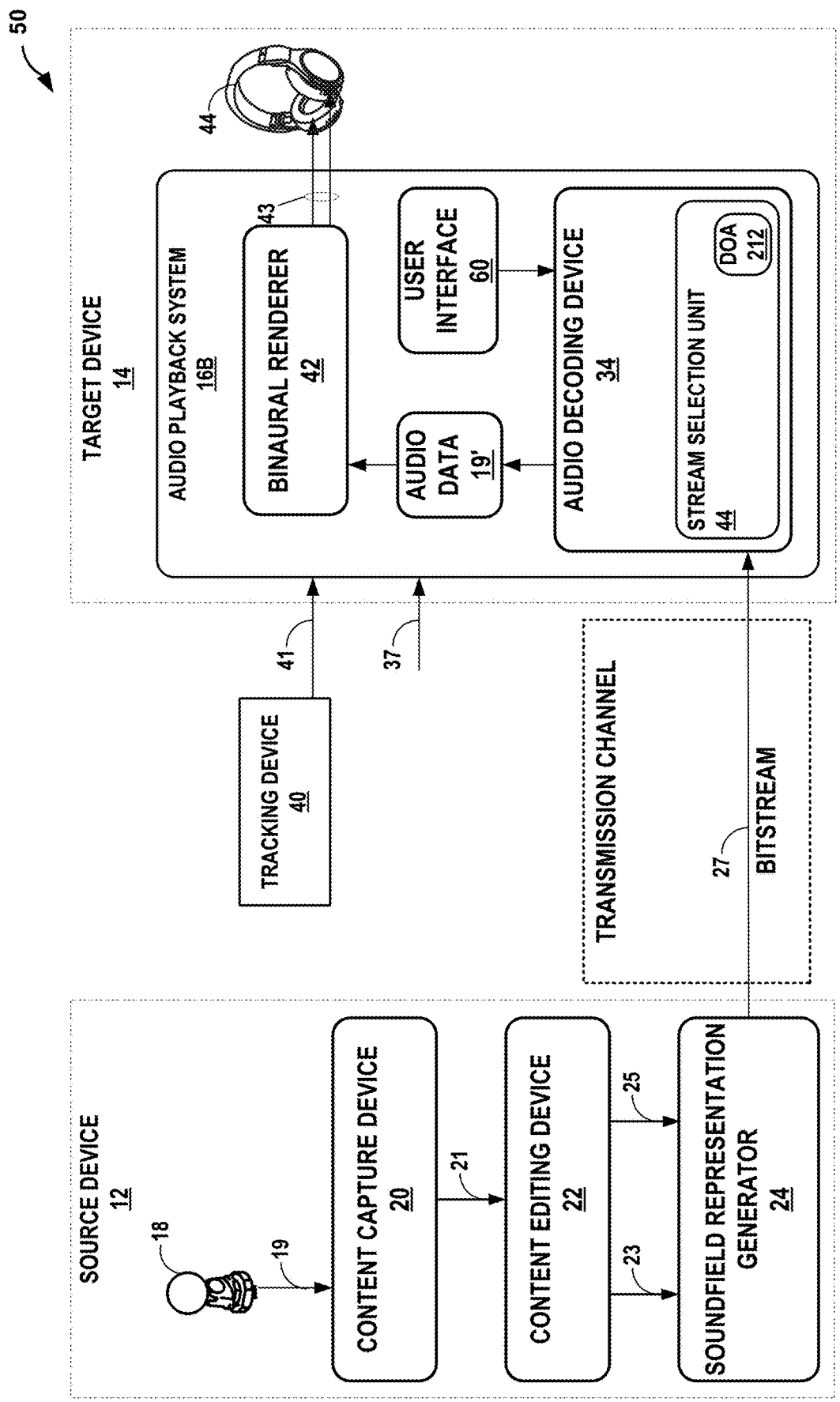

FIGS. 1A and 1B are diagrams illustrating a system that may perform various aspects of the techniques described in this disclosure. As shown in the example of FIG. 1A, system 10 includes a source device 12 and a target device 14. While described in the context of the source device 12 and the target device 14, the techniques may be implemented in any context in which any representation of a soundfield is encoded to form a bitstream or, in other words, an audio stream representative of the audio data. Moreover, the source device 12 may represent any form of computing device capable of generating the representation of a soundfield, and is generally described herein in the context of being a vehicle headunit. Likewise, the target device 14 may represent any form of computing device capable of implementing rendering techniques described in this disclosure as well as audio playback, and is generally described herein in the context of being a vehicle.

The source device 12 may be an entity that may generate audio content for consumption by operators of the target device 14. In some scenarios, the source device 12 generates audio content in conjunction with video content. The source device 12 includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter content 21 received from content capture device 20, including the audio data 19. The content editing device 22 may output edited content 23 and associated metadata 25 to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19 and metadata 25, provided by the content editing device 22 to generate one or more bitstreams 25. In the example of FIG. 1A, which focuses on the audio data 19, the soundfield representation generator 24 may generate one or more representations of the same soundfield represented by the audio data 19 to obtain a bitstream 27 that includes the representations of the soundfield and the audio metadata 25.

For instance, to generate the different representations of the soundfield using ambisonic coefficients (which again is one example of the audio data 19), the soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 2019/0007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 and the soundfield representation generator 24, the content capture device 20 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

The content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or first order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

As described above, the source device 12 may represent a vehicle. Examples of a vehicle include a bicycle, a moped, a motorcycle, an automobile (including autonomous automobiles), an airplane (including autonomous airplanes), farm equipment, construction equipment, military vehicles (e.g., tanks, transport vehicles, etc.), drones or other remotely operated aerial vehicles, helicopters, quadcopters, trains, boats, or any other type of transportation capable of conveying occupants from one location to another location. In the context of the vehicle, the target device 12 may not represent the entirety of the vehicle but only a computing system of the vehicle, such as a headunit configured to interface with one or more audio elements (e.g., a microphone) to capture a soundfield represented by the audio streams 27.

Although described with respect to a vehicle, the source device 12 may represent a device in communication with any of the above example vehicles such that the source device 12 is effectively operating as part of the vehicle. For example, the source device 12 may represent a smartphone or other mobile handset in communication (e.g., wireless communication) with the vehicle via a PAN protocol, such as Bluetooth® or other wireless or wired communication protocol. In this instance, the source device 12 may represent any form of computing device configured to communicate with the vehicle, including a mobile handset (including a so-called smartphone), a laptop, an XR device, a gaming system (e.g., a portable gaming system), or any other computing device.

Further, the target device 14 may be operated by an individual, and may represent a vehicle, such as the vehicle 14 shown in the example of FIGS. 3A-3F. Although described with respect to a vehicle, the target device 14 may represent other types of devices, such as an augmented reality (AR) client device, a mixed reality (MR) client device (or other XR client device), a standard computer, a headset, headphones, a mobile device (including a so-called smartphone), or any other device capable of reproducing a soundfield based on audio streams. As shown in the example of FIG. 1A, the target device 14 includes an audio playback system 16A, which may refer to any form of audio playback system capable of rendering the audio data for playback as mono or multi-channel audio content.

While shown in FIG. 1A as being directly transmitted to the target device 14, the source device 12 may output the bitstream 27 to an intermediate device positioned between the source device 12 and the target device 14. The intermediate device may store the bitstream 27 for later delivery to the target device 14, which may request the bitstream 27. The intermediate device may comprise a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the target device 14, requesting the bitstream 27.

Alternatively, the source device 12 may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the target device 14 includes the audio playback system 16A. The audio playback system 16A may represent any system capable of playing back mono and/or multi-channel audio data. The audio playback system 16A may include a number of different renderers 32. The renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16A may further include an audio decoding device 34. The audio decoding device 24 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that in some examples, may form the full first (or higher) order ambisonic representation or a subset thereof that forms an MOA representation of the same soundfield, decompositions thereof, such as a predominant audio signal, ambient ambisonic coefficients, and the vector based signal (which may refer to a multi-dimensional spherical harmonic vector having a number of elements that represent spatial characteristics of a corresponding predominant audio signal) described in the MPEG-H 3D Audio Coding Standard, or other forms of scene-based audio data.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19', but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause the transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds 19' may refer to other types of rendering, such as rendering incorporated directly into the decoding of the audio data 35 from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations thereof of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to determine current coordinates of the target device 14. The tracking device 40 may represent one or more sensors (e.g., a camera—including a depth camera, a gyroscope, a magnetometer, an accelerometer, light emitting diodes—LEDs, a GPS unit, etc.) configured to track current coordinates of the target device 14. The audio playback system 16A may adapt, based on the tracking information 41, the audio renderers 32 such that the speaker feeds 35 reflect changes in current coordinates relative to originating coordinates set forth in the metadata 23 of the bitstreams 27 (which may represent one or more audio streams, and as such may be referred to as audio streams 27).

As described above, the target device 14 may represent a vehicle. Examples of a vehicle include a bicycle, a moped, a motorcycle, an automobile (including autonomous automobiles), an airplane (including autonomous airplanes), farm equipment, construction equipment, military vehicles (e.g., tanks, transport vehicles, etc.), drones or other remotely operated aerial vehicles, helicopters, quadcopters, trains, boats, or any other type of transportation capable of conveying occupants from one location to another location. In the context of the vehicle, the target device 14 may not represent the entirety of the vehicle but only a computing system of the vehicle, such as a headunit configured to interface with one or more speakers to reproduce a soundfield represented by the audio streams 27.

Although described with respect to a vehicle, the target device 14 may represent a device in communication with any of the above example vehicles such that the target device 14 is effectively operating as part of the vehicle. For example, the target device 14 may represent a smartphone or other mobile handset in communication (e.g., wireless communication) with the vehicle via a PAN protocol, such as Bluetooth® or other wireless or wired communication protocol. In this instance, the target device 14 may represent any form of computing device configured to communicate with the vehicle, including a mobile handset (including a so-called smartphone), a laptop, an XR device, a gaming system (e.g., a portable gaming system), or any other computing device.

With the growth of connectivity (e.g., cellular and other wireless forms of communication), the ability to capture and stream media content is growing, enabling live streaming or other forms of streaming by nearly anyone with a mobile device (or other types of devices). As such, a mobile device may capture a soundfield using one of the representations discussed above, and generate an audio stream, which the mobile device may send to anyone that wants to listen. In certain contexts, the audio stream may convey useful information or merely provide entertainment (e.g., music, etc.).

One area in which audio streaming may provide benefits is in the context of vehicles. Vehicle to anything (V2X) communication may enable a device, such as a mobile phone, to interface with a vehicle to stream audio data. In some contexts, the vehicle headunit may obtain the audio streams and reproduce, via one or more speakers, the soundfields represented by the audio streams. In other contexts, the mobile device may output speaker feeds, which the vehicle obtains and uses to reproduce the soundfields. In any event, V2X communication may allow vehicles to communicate with mobile devices or even other vehicles to obtain audio streams.

The vehicle 12 may perform inter-vehicle communication via the V2X protocol to communicate audio streams between vehicles 12 and 14. In some examples, the audio streams may represent spoken words by an occupant of a first vehicle 12 that a second vehicle 14 may play such that an occupant of the second vehicle 14 may hear the spoken words. The spoken words may be commands representative of a future course of action of the occupant of the first vehicle 12 (e.g., "passing on the left"). In other examples, the audio streams may represent audio streams of entertainment (e.g., streaming music) that the first vehicle 12 shares with the second vehicle 14 via the wireless connections 200 (including wireless connections 200A-200D) shown in the examples of FIGS. 3A-3F.

Another area in which audio streaming may provide benefits is in extended reality (XR). XR devices may include virtual reality (VR) devices, augmented reality (AR) devices, and mixed reality (MR) devices. XR devices may retrieve and render the audio streams to enable various operations, such as virtual attendance of events, parties, sporting functions, conferences, etc., teleportation (which enables a user to view or experience another persons experience, such as becoming a co-pilot in a vehicle, etc.), remote surgery, and the like.

However, vehicles and some XR devices may only be able to render a certain number of sub-streams included in the audio streams. When attempting to render multiple audio streams or some particular kind of audio data represented by the audio stream (such as ambisonic audio data having a large number of coefficients for each sample), the device may not be able to render all of the sub-streams of all of the audio streams. That is, there are processor, memory or other physical hardware limitations (e.g., bandwidth) that may prevent existing devices from retrieving and processing all available sub-streams of the audio streams, particularly as the audio streams may require significant bandwidth and processing resources in certain contexts (such as ambisonic coefficients corresponding to spherical basis functions of higher, e.g., third, fourth, fifth, sixth, etc., orders).

In accordance with various aspects of the techniques, the target device 14 (where examples of the target device 14 include mobile handset, vehicle, vehicle headunit, and/or XR device) may operate in a systematic way to adaptively select a subset of the plurality of audio streams 19'. The target device 14 may include any audio streams 27 identified by user presets (in the audio streams 19') but otherwise remove, from the audio streams 27, any audio streams that originate from distant locations (as the audio stream may include audio metadata defining an origination location for spatialized rendering purposes as described in more detail below), any higher order ambisonic coefficients (through order reduction, thereby reducing a number of inputs to the audio renderers 32), and any audio streams 27 having a private designation or other privacy setting set. In this manner, various associated with the audio streams may be removed to accommodate rendering constraints of the device, thereby enabling the device to render nearly any different type of audio stream and improving operation of the device itself.

Figure 3A:
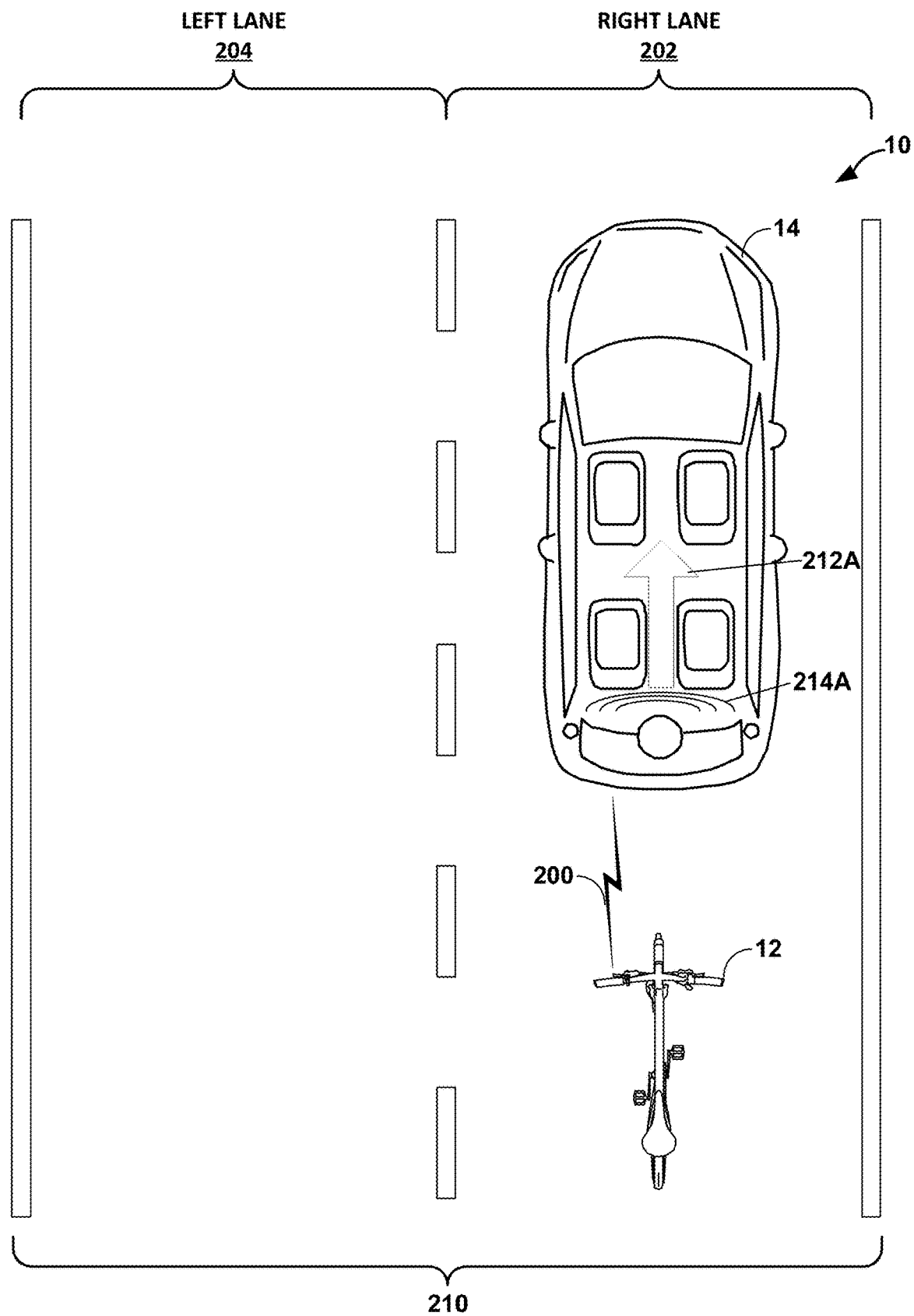
FIGS. 3A-3F are diagrams illustrating, in more detail, example systems shown in FIG. 1A and FIG. 1B that may perform various aspects of the techniques described in this disclosure.

Furthermore, the audio decoding device 34 may communicate with the source device 12 via a wireless connection, such as the wireless connection 200 shown in the example of FIG. 3A. The operator of the source device 12 may interface with the source device 12 to capture audio data (which are assumed for purposes of illustration to be words spoken by the operator.

The source device 12 may include a microphone 18 or other audio capture device configured to capture the audio data 19 and generate, based on the audio data 19, an audio stream 27. The soundfield representation generator 24 may generate the audio stream 27 along with audio metadata, the audio metadata including origination coordinates (e.g., global positioning system—GPS-coordinates) at which the corresponding audio stream 27 originates. The soundfield representation generator 24 may output, via the wireless connection 200, the audio stream 27 to the target device 14.

The audio decoding device 34 may receive the audio stream 27 (which includes the audio metadata), storing the audio stream 27. The target device 14 may determine, based on current coordinates of the target device 14 represented by the tracking information 41 relative to the origination coordinates corresponding to the audio stream 27, a direction of arrival (DoA) 212 for the audio stream 27. The target device 14 may determine that the audio stream 27 is arriving from directly behind the target device 14 and traveling to the front of the target device 14 (as denoted by the arrow).

The audio playback system 16A may invoke audio renderers 32 to render, based on the direction of arrival 212, the audio stream 27 to appear to arrive from the direction of arrival 212, thereby generating speaker feeds to simulate a soundfield captured by the source device 12 and arriving from, as an example, directly behind the target device 14. The audio renderers 32 may, in this example, generate back right and back left speaker feeds in the example of FIG. 1A, outputting the back right and back left speaker feeds to the back right and back left speakers of the target device 14 (which are not shown for ease of illustration purposes) to reproduce the soundfield 214A represented by the audio stream 27.

In this example, it is assumed that the rider of the source device 12 captures audio data of the rider issuing a command to let the target device 14 know that the rider will be "passing on the left." Although described below with respect to spoken words, the source device 12 may offer one or more audio streams, including pre-recorded audio streams, live audio streams, or any other type of audio stream.

As it is assumed to be operating autonomously (e.g., a computing device is in control of the target device 14 and issues instructions that result in the computing device steering, accelerating, braking and otherwise operating the target device 14 without manual intervention), the target device 14 may analyze the audio stream 27 to extract the command indicative of the course of action, and operate, based on the command parsed from the audio stream 27, the target device 14 to avoid merging into or otherwise impacting operation of the source device 12. That is, the target device 14 may autonomously adjust, based on the command or other spoken words, operation of the target device 14.

Figure 2A:
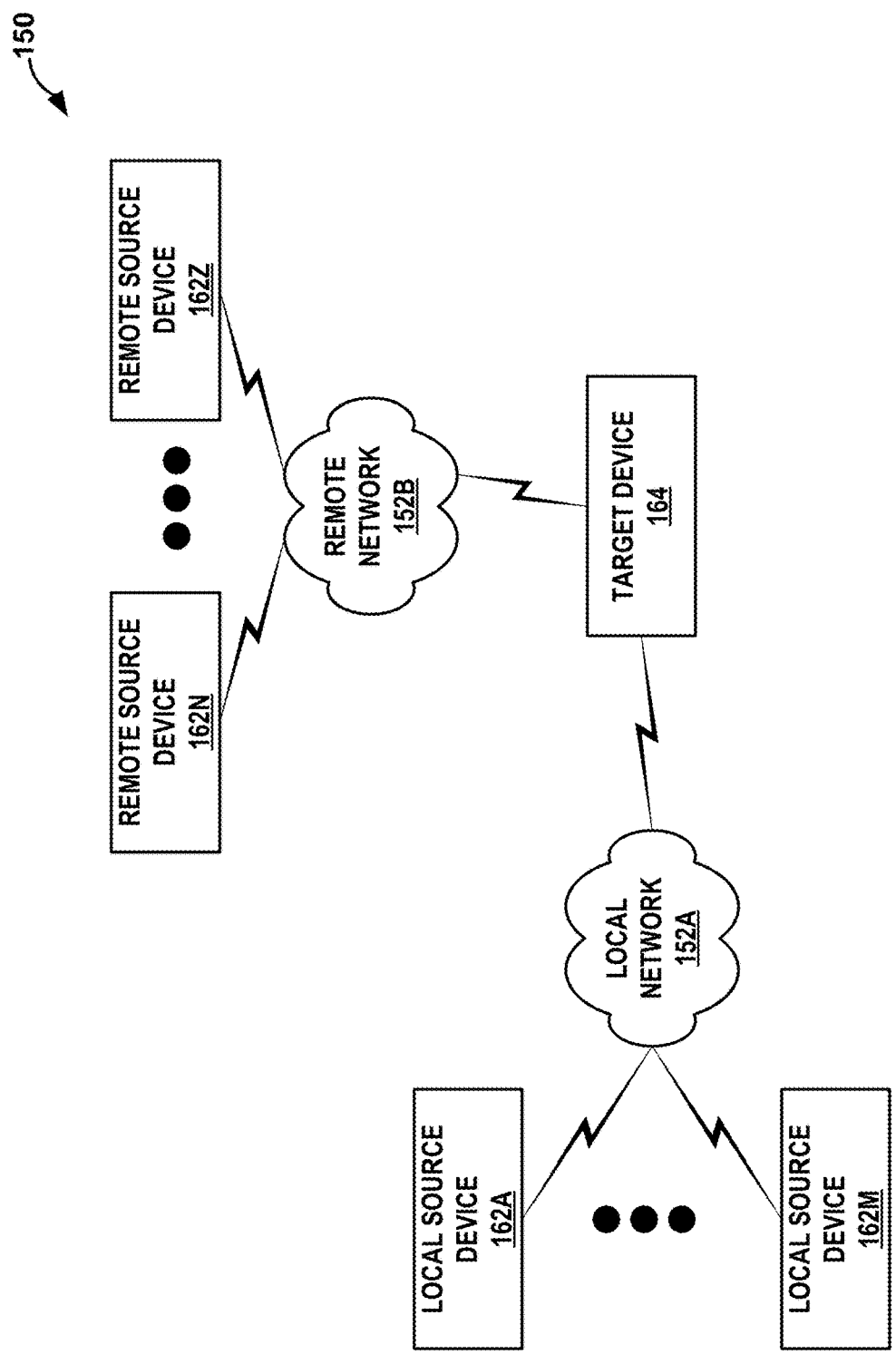
FIG. 2A is a block diagram illustrating, in more detail, an example of the system shown in the example of FIGS. 1A and 1B.

FIG. 2A is a block diagram illustrating, in more detail, an example of the system shown in the example of FIGS. 1A and 1B. As shown in the example of FIG. 2A, system 150 includes a local networks 152A and a remote network 152B. The local network 152A may represent a local network of interconnected devices capable of locally streaming audio (as one or more audio streams 27 referring back to the example of FIG. 1A) in accordance with a local streaming protocol, including a $5^{th}$ generation (5G) cellular protocol, a WiFi protocol, a PAN protocol (such as Bluetooth®), or any other wireless protocol capable of interconnecting devices.

The remote network 152B may represent a publicly accessible, packet-based network, such as the Internet, or a private network that operates in accordance with various layer two, layer three, and so on networking protocols. The remote network 152B may include a number of interconnected networking devices, including routers, switches, hubs, etc. for communicating packets in accordance with the networking protocols to communicate audio data (as the audio streams 27, again referring back to the example of FIG. 1A).

As further shown in the example of FIG. 2A, the system 150 includes local source devices 162A-162M ("local source devices 162") and remote source devices 162N-162Z ("remote source devices 162"). The local source devices 162 and remote source devices 162 ("source devices 162") may each represent an example of the source device 12 described above with respect to the example of FIG. 1A. The local source devices 162 may wirelessly connect to the local network 152A to communicate with other devices wireless connected to local network 152A, including a target device 164. Likewise, the remote source devices 162 may wirelessly connect to the local network 152A to communicate with other devices wireless connected to local network 152A, including a target device 164. The target device 164 may represent one example of the target device 14 described above with respect to the example of FIG. 1A.

In operation, the target device 164 may obtain the audio streams 27 from one or more of the local source devices 162 and the remote source devices 162. The target device 164 may obtain the local source devices 162 in accordance with a vehicle to anything (V2X) protocol, such as a cellular-V2X (C-V2X) protocol.

As such, this disclosure envisions refinements to the way that a device allows for communication or audible experience, with a someone else or some other device, based on initiating target object selection sent to the selected target object using a direct channel communication or peer to peer connection, V2X, or C-V2X communication system.

For example, a first device for communicating with a second device, may include one or more processors configured to detect a selection of at least one target object external to the first device, and initiate a channel of communication between the first device and a second device associated with the at least one target object external to the first device. Whether a selection of the at least one target object external to the first device, or the initiation of the channel of communication between the first device and the second device associated with the at least one target object external to the first device, is performed first, may not be material. It may depend on the context or situation, whether a channel is already established, and the initiation of the channel of communication takes place, or whether the initiation of the channel of communication is based off of the detection of the selection of the at least one target object external to the first device.

For example, the channel of communication between the first device and the second device may have already been established prior to the detection of the selection of at least one target object external to the device. It may also be possible that the initiation of the channel of the communication between the first device and the second device was in response to the detection of the selection.

In addition, the one or more processors in the first device may be configured to receive audio packets, from the second device, as a result of the channel of communication between the at least one target object external to the first device and the second device. Subsequently, after the audio packets are received, the one or more processors may be configured to decode the audio packets, received from the second device, to generate an audio signal, and output the audio signal based on the selection of the at least one target object external to the first device. It is possible that the first device and the second device may be a first vehicle and a second vehicle. This disclosure has different examples illustrating vehicle's, but many of the techniques described are also applicable to other devices. Namely, the two devices may be headsets including: mixed reality headsets, Head-Mounted-Display, Virtual Reality (VR) headsets, Augmented Reality (AR) headsets, or the like.

The audio signal may be reproduced by one or more loudspeakers coupled to the first device. If the first device is a vehicle, the loudspeakers may be in the cabin of the vehicle. If the first device is a headset, the loudspeakers may reproduce a binauralized version of the audio signal.

Based on the selection of the target object, communication, using a C-V2X or V2X system, or other communication system, between the one or more target objects and the first device may be performed. The second device, i.e., a headset or vehicle may have a person or persons speaking or playing music associated with the second device. The speech or music emanating from inside the second vehicle or emanating from the second headset may be compressed using an audio/speech codec and produce audio packets. An audio/speech codec may be two separate codecs, e.g., an audio codec, or may be a speech codec. Alternatively, one codec may have the ability to compress audio and speech.

The target device 164 may obtain the audio streams 19' from the local source devices 162 to support a variety of different contexts, such as where people are at a party, concert, convention or other event. In some examples, the audio playback device 164 may obtain the audio streams 19' in support of XR contexts or experiences in which a user of the target device 164 participates in the event through an XR device, mobile device (including a so-called smartphone) and the like. Additional vehicular contexts are described below with respect to the examples of FIGS. 3A-3F. The remaining discussion with respect to FIGS. 2A-2C focuses on XR experiences, but the techniques should not be limited to these XR experiences and may be expanded to vehicular experiences or any other suitable experience where audio streaming occurs in a manner of which some audio renderers 32 may be unable to support.

Assuming the target device 164 may include an audio playback device similar to the audio playback device 16A of the target device 14 (as well as the other functional components), the audio playback device 16A may also obtain the audio streams 27 from the remote source devices 162 via the networking protocols, and possibly using a dynamic adaptive streaming over hypertext transfer protocol (HTTP) (DASH). More information regarding DASH can be found in International Standard ISO/IEC 23009-1, entitled "Information technology—Dynamic adaptive streaming over HTTP (DASH)—Part 1: Media presentation description and segment formats," second edition, dated 2014 May 15.

In any event, the audio playback system 16A may invoke the audio decoding device 34 to decode the audio streams 27 to the audio streams 19', some of which may have audio metadata (such as the audio streams 19' from the local source devices 162, where the audio streams 19' from the remote source devices 162 may not include metadata).

However, as noted above, the audio renderers 32 may be unable to decode all of the sub-streams of each of the audio streams 19'. Each of the sub-streams may represent a single object of channel-based audio data, a single channel of channel-based audio data, or a single ambisonic coefficient of ambisonic audio data corresponding to a single spherical basis function (or, in other words, scene-based audio data).

In any event, to illustrate how the audio renderers 32 may be unable to fully render the audio streams 19', a single audio stream representative of sixth order ambisonic audio data may include 49 sub-streams, one for each of the ambisonic coefficients corresponding to each of the 49 spherical basis functions. The audio renderers 32 may, in some examples, only support 8 sub-streams (e.g., for rendering 7.1 channel audio data). As such, the stream selection unit 44 (shown in the example of FIG. 1A) may reduce the number of sub-streams in a number of different ways, as discussed below in more detail with respect to FIGS. 2B and 2C.

Figure 2B:
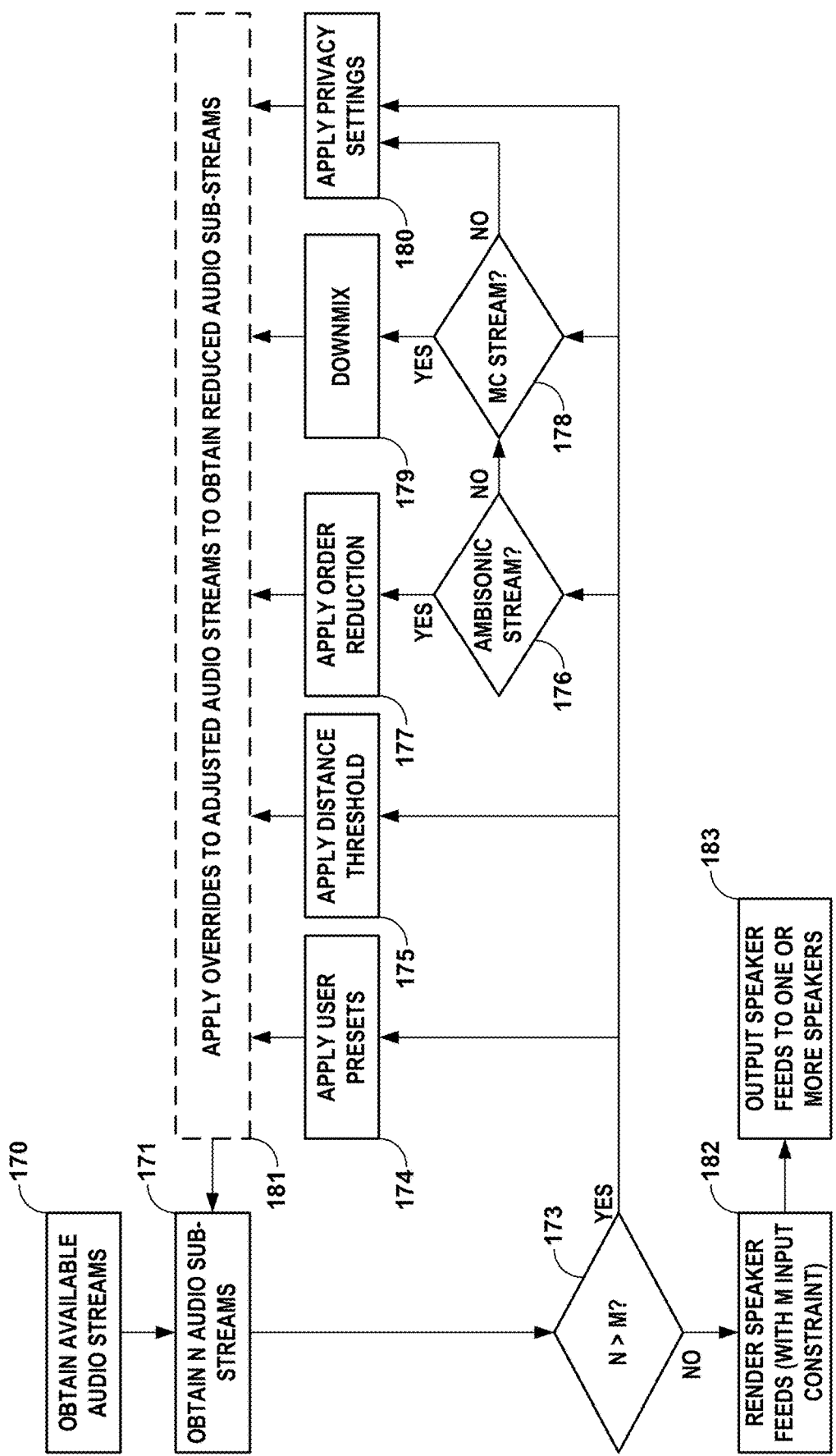
FIG. 2B is a flowchart illustrating example operation of the stream selection unit in performing various aspects of the techniques described in this disclosure.

FIG. 2B is a flowchart illustrating example operation of the stream selection unit in performing various aspects of the techniques described in this disclosure. The audio decoding device 34 may first decode the audio streams 27 to obtain available audio steams 19' (which is another way to refer to the audio streams 19') (170). The audio decoding device 34 may output the audio streams 19' as N audio sub-streams (and as such, the audio streams 19' may also be referred to as audio sub-streams 19') where the variable N, denotes a total number of the audio sub-streams 19'. As such, the audio decoding device 34 may obtain N audio sub-streams 19' (171).

The stream selection unit 44 may next determine, based on the audio sub-streams 19' a total number, e.g., N, of the one or more sub-streams 19' for all the plurality of audio streams 19'. The stream selection unit 44 may compare the total number (N) to a render threshold (represented in FIG. 2B as "M") (173). The render threshold (M) may be indicative of a total number of sub-streams the audio renderers 32 support when rendering the audio streams 19' to one or more speaker feeds 35. When the total number (N) is greater than the render threshold (M) ("YES" 173), the stream selection unit 44 may adapt the audio streams 19' to decrease the number of the sub-streams 19' and obtain an adapted audio streams including a reduced total number of the sub-streams 19' that is equal to or less than the renderer threshold (M).

The stream selection unit 44 may adapt the audio streams 19' in a number of different ways. In one example, the stream selection unit 44 may apply user presets to the audio streams 19' (174). The audio presets may identify one or more preferred audio streams of the audio streams 19'. The stream selection unit 44 may refrain, based on the user preset, from removing one or more of the audio streams 19' when obtaining the adapted audio streams.

In another example, the stream selection unit 44 may apply a distance threshold (175). The distance threshold may represent a threshold that defines a maximum distance (relative to the target device 164) from the target device 164 an audio stream may originate and be a candidate for rendering. The audio streams 19' may as noted above each include audio metadata, the audio metadata including originating location information identifying an originating location from which the audio stream originates. The stream selection unit 44 may adapt, based on the originating location information, the audio streams 19' to decrease the total number of the one or more sub-streams 19' and obtain the adapted audio streams.

As another example, the stream selection unit 44 may determine a type of audio data specified in the audio sub-streams 19' and adapt, based on the type of audio data, the audio streams 19' to decrease the total number of the audio sub-streams 19' and thereby obtain the adapted audio streams. As shown in the example of FIG. 2B, the stream selection unit 44 may determine that the type of audio data indicates that the audio data is ambisonic audio data (or, in other words, an ambisonic stream) (176). When the type of audio data indicates that the audio data is ambisonic audio data ("YES" 176), the stream selection unit 44 may apply or perform order reduction with respect to the ambisonic audio data to obtain the adapted audio streams (177). As each coefficient corresponding to the same spherical basis function is represented by a separate sub-stream, order reduction may eliminate higher order coefficients (associated with higher order spherical basis functions), thereby reducing the number of audio sub-streams 19'.

When the type of audio data indicates that the audio data is not ambisonic audio data ("NO" 176), the stream selection unit 44 may determine whether the type of audio data indicates that the audio data is a multi-channel (MC) stream (178). When the type of audio data indicates that the audio data is a MC stream ("YES" 178), the stream selection unit 44 may downmix the MC stream 19' to reduce a number of channels of the MC stream 19' (e.g., 5.1 channel audio data down to stereo audio data or mono audio data or, as another example, 7.1 channel audio data down to 5.1, stereo or mono audio data) (179). In this way, the stream selection unit 44 may perform downmixing with respect to the channel-based audio data to obtain the adapted audio streams.

When the type of audio data indicates that the audio data is not a MC stream ("NO" 178), the stream selection unit 44 may apply privacy settings to the audio sub-streams to remove any of the audio streams 19' marked as private or restricted (180). The stream selection unit 44 may apply the privacy settings, in some examples, regardless of the determination made with respect to the type of the audio data. As such, the stream selection unit 44 may adapt, based on the privacy settings, the plurality of audio streams to remove one or more of the audio streams 19' (and all of the associated audio sub-streams 19') and obtain the adapted audio streams.

In any event, the stream selection unit 44 may, in one example, apply overrides to the adjusted audio sub-streams to obtain reduced audio sub-streams (181). The overrides may indicate that less audio streams 19' are desired by the user or otherwise indicate a particular one or more of the audio streams 19' are to be selected for rendering. However, the application of the overrides is optional in most circumstances and as such is denoted as a dash-lined box. As such, the adjusted audio streams may be the same as the reduced audio streams in some examples.

The stream selection unit 44 may next determine whether the adjusted/reduced audio streams 19' include a total number of sub-streams (N) than the renderer threshold (M) (173). Assuming that the total number of sub-streams (N) is less than the renderer threshold, the stream selection output the reduced audio sub-streams ("NO" 173), the stream selection unit 44 may output the audio sub-streams 19' as the adjusted audio sub-streams, where the audio renderers 32 may now render, based on the adjusted/reduced audio sub-streams 19', one or more speaker feeds 35 (where the renderer 32 has an M input constraint equal to the renderer threshold M) (182). The audio renderer 32 may output the speaker feeds 35 to one or more speakers (183).

In some examples, the adapted audio streams includes at least one audio stream representative of channel-based audio data, and the renderer comprises a six degrees of freedom renderer 32 to perform 6DOF rendering as described above. In this example, the stream selection unit 44 may obtain tracking information 41 representative of movement of the device 14 and modify, based on the tracking information 41 and prior to applying the six degrees of freedom renderer 32, the six degrees of freedom renderer 32 to reflect the movement of the device.

In these and other examples, the adapted audio streams includes at least one audio stream representative of ambisonic audio data, and again the renderer 32 comprises a six degrees of freedom renderer 32. In this example, the stream selection unit 44 may obtain tracking information 41 representative of movement of the device 14 and modify, based on the tracking information 41 and prior to applying the six degrees of freedom renderer 32, the six degrees of freedom renderer 32 to reflect the movement of the device.

In examples where 6DOF rendering is performed, the audio renderer 32 may have a lower render threshold as 6DOF rendering may consume significant resources (e.g., processor, memory, bandwidth, etc.). As such, the stream selection unit 44 may reduce the render threshold to be lower than the M input constraint. For example, multi-channel audio data and/or ambisonics audio data with 6DOF rendering may not be possible with available bandwidth, which may increase the likelihood of the stream selection unit 44 performing order reduction and/or downmixing.

Figure 2C:
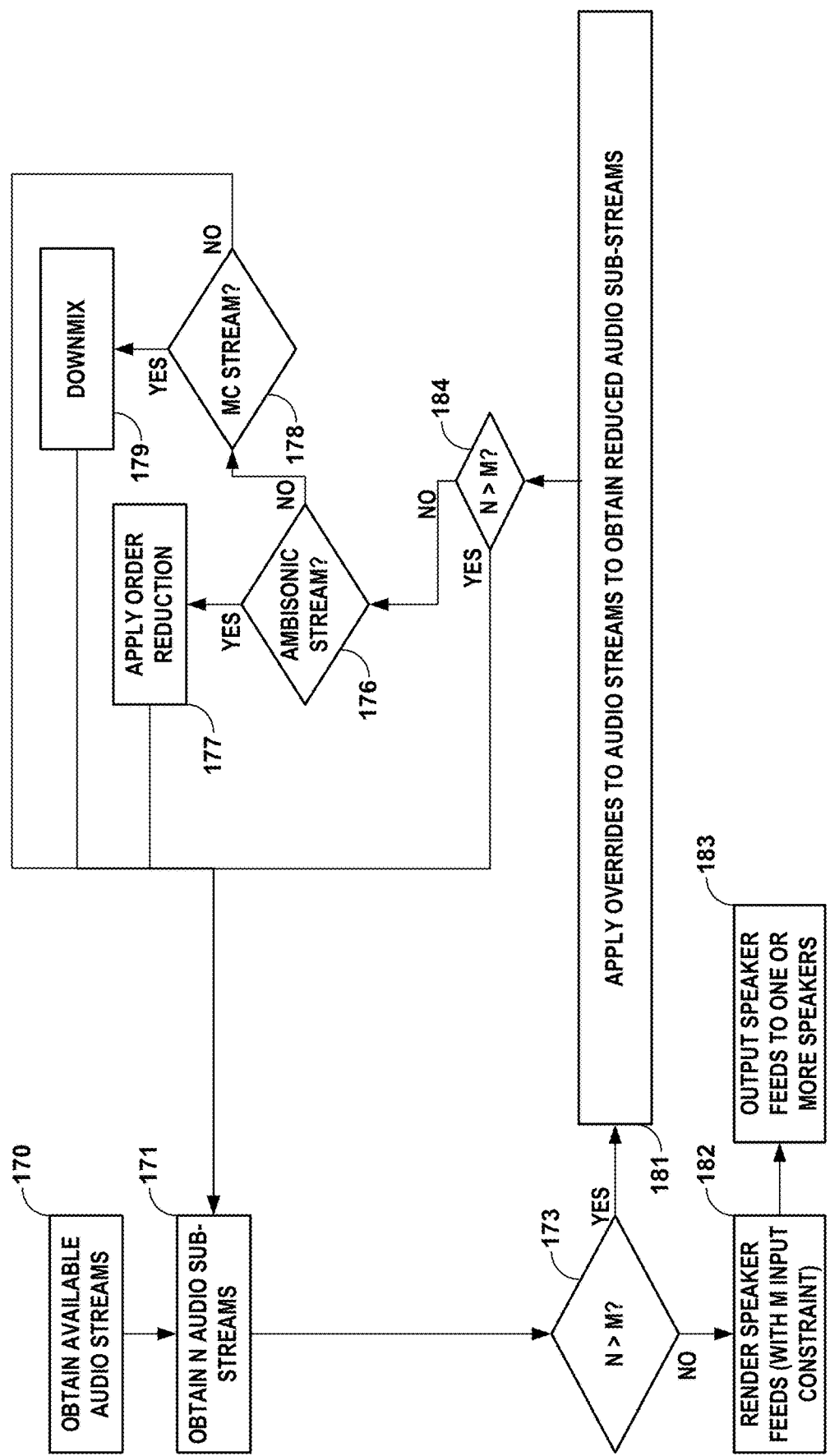
FIG. 2C is a flowchart illustrating, in more detail, additional example operation of the stream selection unit shown in the example of FIG. 2A in accordance with various aspects of the techniques described in this disclosure.

FIG. 2C is a flowchart illustrating, in more detail, additional example operation of the stream selection unit shown in the example of FIG. 2A in accordance with various aspects of the techniques described in this disclosure. The additional example operation of the stream selection unit shown in the example of FIG. 2C is similar to the example operation of the stream selection unit shown in the example of FIG. 2B, except that application of the overrides is no longer optional and occurs responsive to determining that the total number (N) of the sub-streams 19' is greater than the render threshold (M).

The stream selection unit 44 may apply the overrides to the audio streams 19' to select the preferred audio streams of the audio streams 19'. When the total number of the audio sub-streams of the preferred audio streams still exceeds the threshold M ("YES" 184), the stream selection unit 44 may perform the ambisonic stream determination followed by either application of order reduction (177) or a determination of whether the audio data is a MC stream (178). When determined to be an MC stream, the stream selection unit 44 may perform downmixing (178). When determined not to be an MC stream, the stream selection unit 44 merely outputs the original audio stream.

In some examples, both of the example operations described above with respect to FIGS. 2B and 2C are performed in an iterative matter, or responsive to new audio streams being retrieved. Accordingly, the techniques may iteratively perform sub-stream reduction to meet the M input constraint of the audio renderer 32.

In this way, the stream selection unit 44 may process audio streams representative of mono, stereo, multi-channel (e.g., 5.1 channel or 7.1 channel), and/or ambisonic audio data (e.g., of fourth or sixth order).

FIGS. 2D-2K are diagrams illustrating example operations of application of privacy settings by the source device and/or content consumer device shown in the examples of FIGS. 1A and 1B. The following discussion of FIGS. 2D-2K provide additional detail with regard to application of privacy settings as discussed above with respect to FIG. 2B. In some use cases, it may be desirable to be able to control which of the plurality of audio streams generated by the source device 12 are available for playback by the content consumer device 14.

For example, audio from certain capture devices of the content capture devices 20 may contain sensitive information and/or the audio from certain capture devices of the content capture devices 20 may not be meant for exclusive access (e.g., unrestricted access by all users). It may be desirable to restrict access to audio from certain capture devices of the content capture devices 20 based on the type of information captured by the content capture device 20 and/or based on the location of physical zone in which the content capture device 20 resides.

Figure 2D:
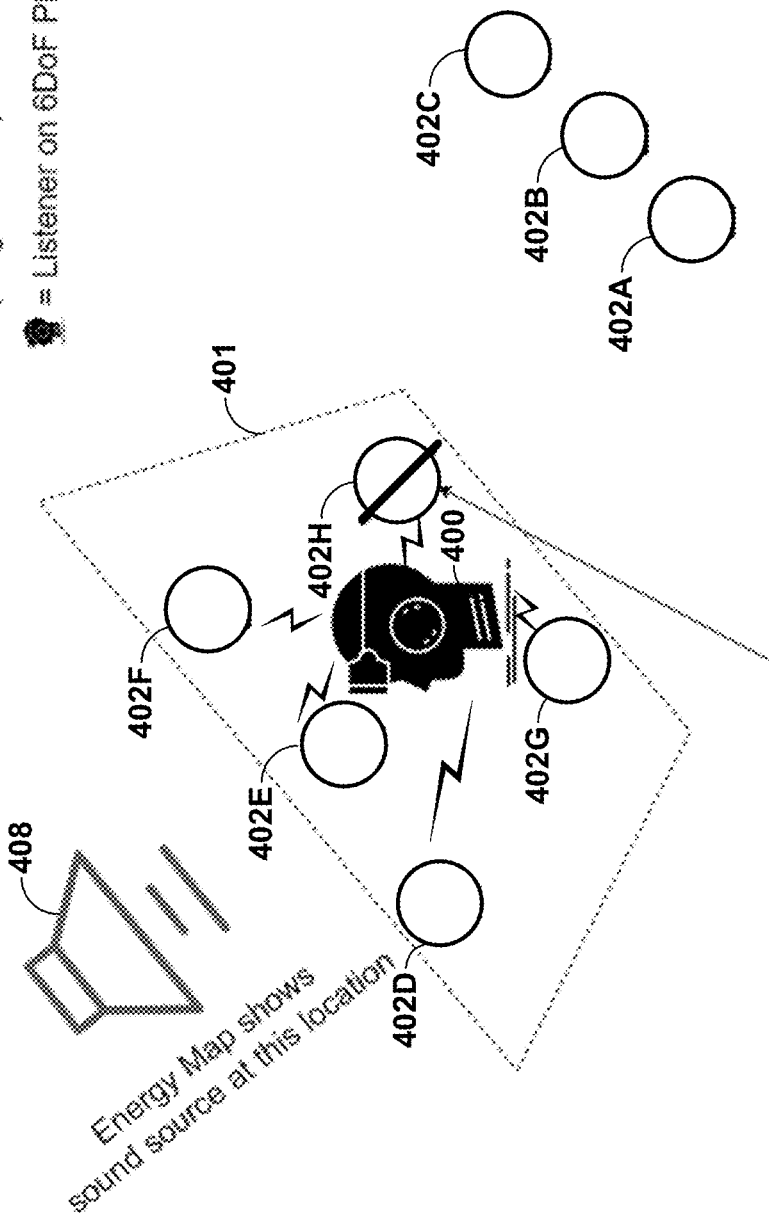

As shown in the example of FIG. 2D, the stream selection unit 44 may determine that the VLI 45B indicates that the content consumer device 14 (shown as the VR device 400) is at virtual location 401. The VR device 400 may be a listener on a 6DoF playback system. The stream selection unit 44 may next determine the CLI 45A for one or more of audio elements 402A-402H (which may represent audio streams captured by microphones, including the microphone 18 shown in FIG. 1A, as well as other types of capture devices, including microphone arrays, clusters of microphones, other XR devices, mobile phones—including so-called smartphones—and the like). Furthermore, audio streams 402A-402H may include synthetic audio generated via computer or other audio output devices that is synthetically generated.

As described above, the stream selection unit 44 may obtain the audio streams 27. The stream selection unit 44 may interface with audio elements 402A-402H and/or with source device 12 to obtain the audio streams 27. In some examples, the stream selection unit 44 may interact with an interface (such as a receiver, a transmitter and/or a transceiver) to obtain the audio streams 27 in accordance with a fifth generation (5G) cellular standard, a personal area network (PAN), such as Bluetooth™, or some other open-source, proprietary or standardized communication protocol. Wireless communication of the audio streams is denoted as a lightning bolt in the examples of FIG. 2A, where the selected audio stream 19' is shown as being communication from the selected one or more of the audio elements 402 and/or source device 12 to the VR device 400.

In the example of FIG. 2D, the VR device 400 is at location 401, which is in the vicinity of an audio source 408. Using the techniques described above, and in greater detail below, the VR device 400 may use energy maps to determine that audio source 408 is at the location 401. FIG. 2D shows the audio elements 402D-402H at the location 401. The audio elements 402A-402C are not in the vicinity of the VR device 400.

In one example of the disclosure, the source device 12 may be configured to generate audio metadata including privacy restrictions for the plurality of audio streams. For example, as shown in FIG. 2D, the source device 12 may be configured to generate audio metadata that indicates that the audio stream associated with the audio element 402H is restricted for the user of the VR device 400 (or any other content consumer device). The source device 12 may transmit the audio metadata to the VR device 400 (or any other content consumer device).

The VR device 400 may be configured to receive the plurality of audio streams and corresponding audio metadata and store them in a memory. Each of the audio streams is representative of a soundfield, and the audio metadata including includes restrictions for one or more of the plurality of audio streams. The VR device 400 may be configured determine one or more audio streams from the audio metadata based on the privacy restrictions. For example, the VR device 400 may be configured to determine audio streams that are able to be played back based on the privacy restrictions. The VR device 400 may then generate the corresponding soundfields based on the one or more audio streams. Likewise, the VR device 400 may be configured to determine one or more restricted audio streams (e.g., the audio stream associated with the audio element 402H) from the audio metadata based on the privacy restrictions, and not generate the corresponding soundfields for the one or more restricted audio streams.

Figure 2E:
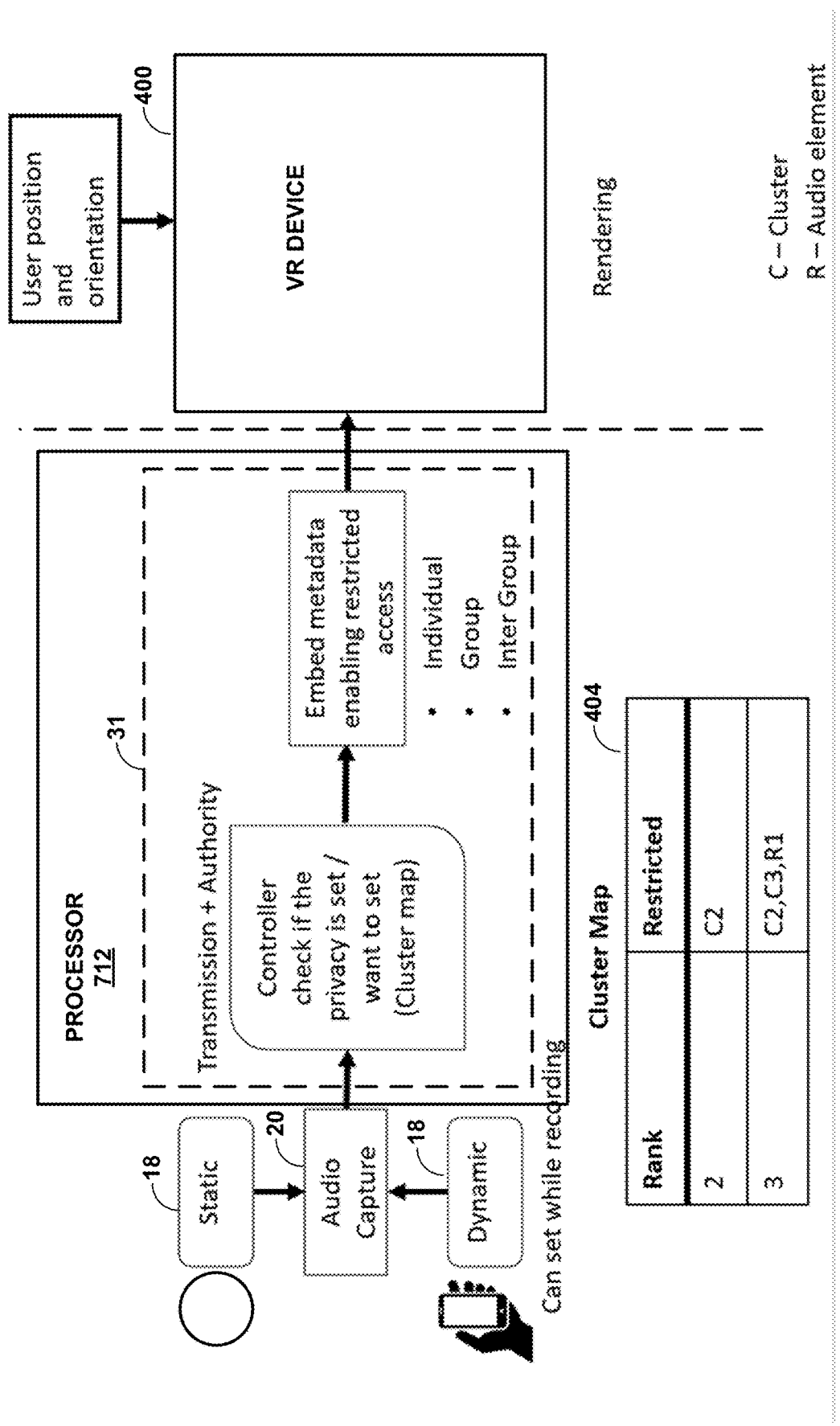

FIG. 2E is a block diagram illustrating the operation of the controller 31 in one example of the disclosure. In one example, the controller 31 may be implemented as a processor 712. The processor 712 is described in more detail below with reference to FIG. 7. As described above with reference to FIG. 1A, the source device 12 may capture audio data using the content capture device 20. The content capture device 20 may capture audio data from the audio element 18. The audio element 18 may include static sources, such as static single microphones or clusters of microphones. The microphones 18 may be live sources. Alternatively or in addition, the audio element 18 may include dynamic audio sources (e.g., dynamic in terms of use and/or position), such as mobile phones. In some examples, dynamic audio sources may be synthetic audio sources. The audio streams may come from single, physically spaced audio sources, or from clusters of audio sources in a single physical location.

In some examples, it may be beneficial to group audio sources that are located physically close to each other into a cluster, as each individual audio source in a physically co-located cluster may sense some or all of the audio as each of the other audio sources in the cluster. As such, in some examples of the disclosure, the controller 31 may be configured to toggle audio streams from a cluster of audio sources (marked C in FIG. 2E), as well to toggle audio streams from individual audio sources/elements (marked R in FIG. 2E). In this context, toggle may refer to marking an audio stream or groups of audio streams as unrestricted (e.g., able to be decoded and/or played) or restricted (e.g., not able to be decoded and/or played). A privacy toggle of on (e.g., restricted) indicates the VR device should mute and/or generally not decode or playback the audio stream. A privacy toggle of off (e.g., unrestricted or common access) indicates that any user may decode and playback the audio stream. In this way, the audio engineer or the content creator may grant exclusive access to certain audio sources for non-restricted users or based on hierarchical privacy setting ranks.

As shown in FIG. 2E, the controller 31 may be configured to receive and/or access the plurality of audio streams captured by the content capture device 20. The controller 31 may be configured to check if there are any privacy settings associated with the audio streams. That is, the controller 31 may be configured to determine one or more unrestricted audio streams and one or more restricted audio streams from the plurality of audio streams.

In some examples, a content creator may be configured to set privacy settings at each audio source or cluster of audio sources. In other examples, the controller 31 may be configured to determine if privacy settings are desired by the set for the plurality of audio streams, such as through explicit instructions. In one example, the controller 31 may receive a cluster map that include the audio metadata 404 that indicates the privacy restrictions for one or more audio sources or clusters of audio sources. In one example, the privacy restrictions indicate if one or more of the plurality of audio streams are restricted or unrestricted. In other examples, the privacy restrictions only indicate audio streams that are restricted. As will be explained in more detail, the privacy restrictions may restrict individual audio sources, groups (clusters) of audio sources, or indicate restrictions between audio sources (inter group restrictions).

In the example of FIG. 2E, the audio metadata 404 further includes respective privacy restrictions for the audio streams indicating if one or more of the plurality of audio streams are restricted or unrestricted for each of a plurality of privacy settings ranks. The audio metadata 404 includes two privacy setting ranks. Of course, more or fewer privacy setting ranks may be used. The audio metadata 404 of FIG. 2E only indicates what clusters of audio sources or individual audio sources are restricted for a particular privacy setting rank. The VR device 400 may determine that any audio streams from audio sources not listed as restricted in the metadata 404 may be unrestricted (i.e., may be played). The VR device 400 may determine that any audio streams from audio sources listed as restricted in the metadata 404 may not be played. In other examples, the audio metadata 404 may indicate both unrestricted and restricted audio sources/streams per privacy setting rank.

The controller 31 may be configured to embed the audio metadata 404 into either the bitstream 27 and/or the side channel 33 (see FIG. 1A) and transmit the audio metadata to the VR device 400 or any other content consumer device, including the content consumer device 14 of FIG. 1A and FIG. 1B. In addition, in some examples, the controller 31 may be configured to generate a privacy setting rank of a plurality of privacy setting ranks for the VR device 400 and transmit the privacy setting rank to the VR device 400.

As described above, the controller 31 may be part of any number of types of devices, including a server, a network-connected server (e.g., cloud server), a content capture device, and/or a mobile handset. The controller 31 may be configured to transmit the plurality of audio streams over a wireless link, including a 5G air interface, and/or a personal area network, such as a Bluetooth interface.

In some examples, when the controller 31 is configured to send the plurality of audio streams to VR device 400 (e.g., in a so-called online mode), the controller 31 may be configured to not transmit any audio streams to the VR device 400 that are marked as restricted in the audio metadata 404. The controller 31 may still transmit the audio metadata 404 to the VR device 400 so that the VR device 400 may determine which audio streams are being received. In other examples, the controller 31 may not transmit the audio streams to the VR device 400. Instead, in some examples, the VR device 400 may receive audio streams directly from one or more audio sources. In these examples, the VR device 400 still receives the audio metadata 404 from the controller (or directly from the audio source). The VR device 400 would then determine the unrestricted and restricted audio streams from the audio metadata 404 and the privacy setting rank of the VR device 400, and would refrain from decoding and/or playing back any audio streams marked as unrestricted (e.g., based on the privacy setting rank).

In view of the above, in one example, the VR device 400 may be configured to receive a privacy setting rank of the plurality of privacy setting ranks, decode the audio metadata 404, and access the respective privacy restrictions indicating if one or more of the plurality of audio streams are restricted or unrestricted corresponding to the received privacy setting rank. The VR device 400 may be configured to receive the plurality of audio streams over a wireless link, such as a 5G air interface, and/or a Bluetooth interface. As described above, the VR device 400 may be an extended reality headset. In this example, the VR device 400 may include a head-mounted display configured to present a displayed world. In other examples, the VR device 400 may be a mobile handset.

In other examples of the disclosure, the VR device 400 may be configured to further perform the energy mapping techniques of this disclosure in conjunction with the audio metadata privacy restrictions described above. In this example, the audio metadata further includes capture location information representative of a capture location in a displayed world at which the corresponding one of the plurality of audio streams was captured. The VR device 400 may be further configured to determine location information representative of a location of the device in the displayed world, select, based on the location information and the capture location information, a subset of the plurality of audio streams, the subset of the plurality of audio streams excluding at least one of the plurality of audio streams, and generate, based on the subset of the plurality of audio streams, the corresponding soundfields.

Figure 2F:
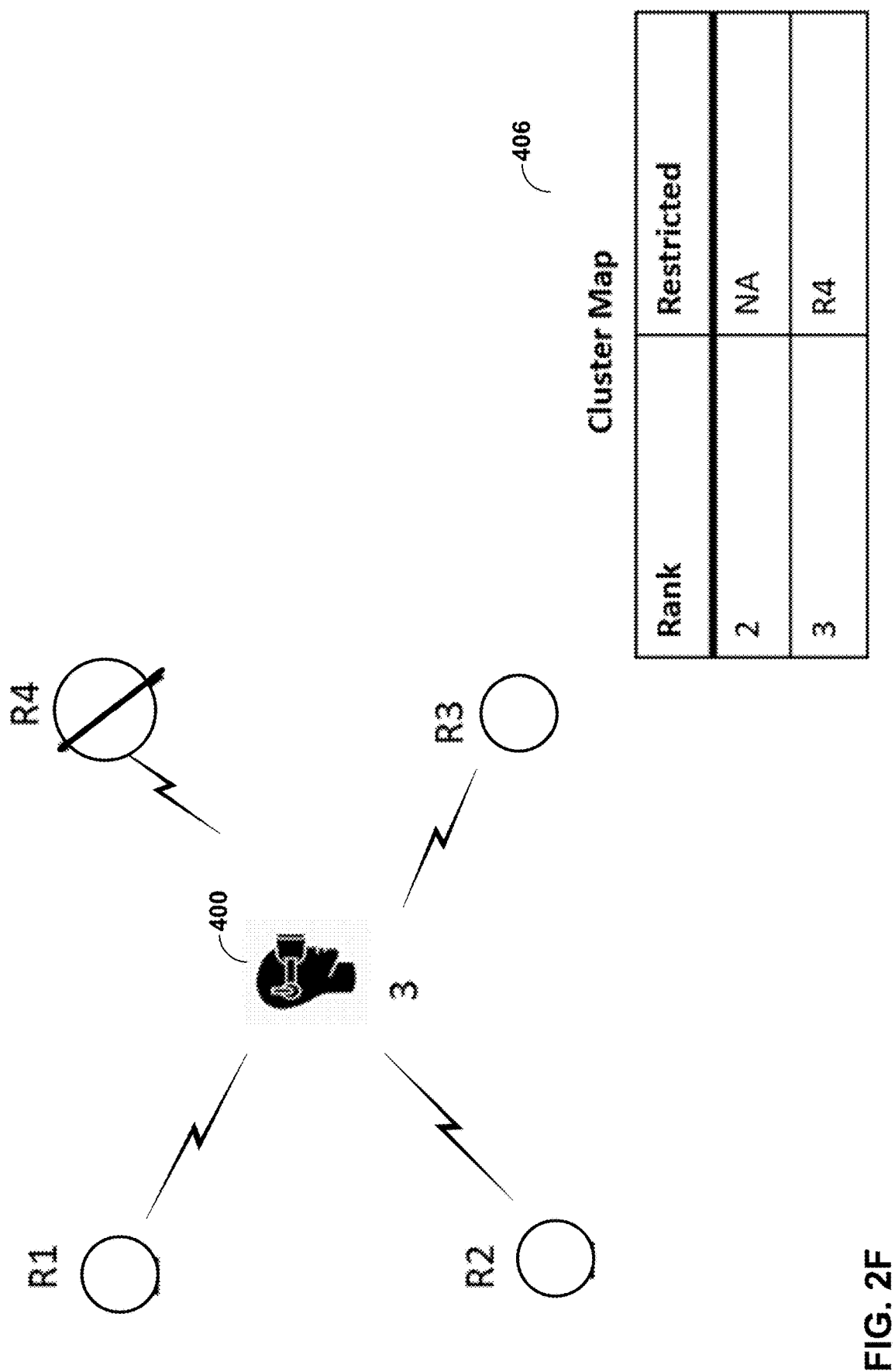

FIG. 2F is a conceptual diagram illustrating an example where a single audio source (R4) is marked as restricted in the audio metadata 406. In this example, the controller 31 may be configured to generate the audio metadata 406 to include privacy restrictions indicating if audio streams from a first audio capture device (e.g., R4) are restricted or unrestricted. The VR device 400 receives a privacy setting rank of 3. The VR device 400 may then determine that audio source R4 is restricted from the privacy setting rank 3 column of the audio metadata 406. Accordingly, the VR device 400 will refrain from decoding and/or playing back audio streams from audio source R4. The example of FIG. 2F may be applicable where audio sources are physical spread enough to the point that individual toggling of individual audio sources is effective. The audio engineer or content creator may choose to toggle (i.e., indicate as unrestricted or restricted) certain audio elements based on a physical spread.

Figure 2G:
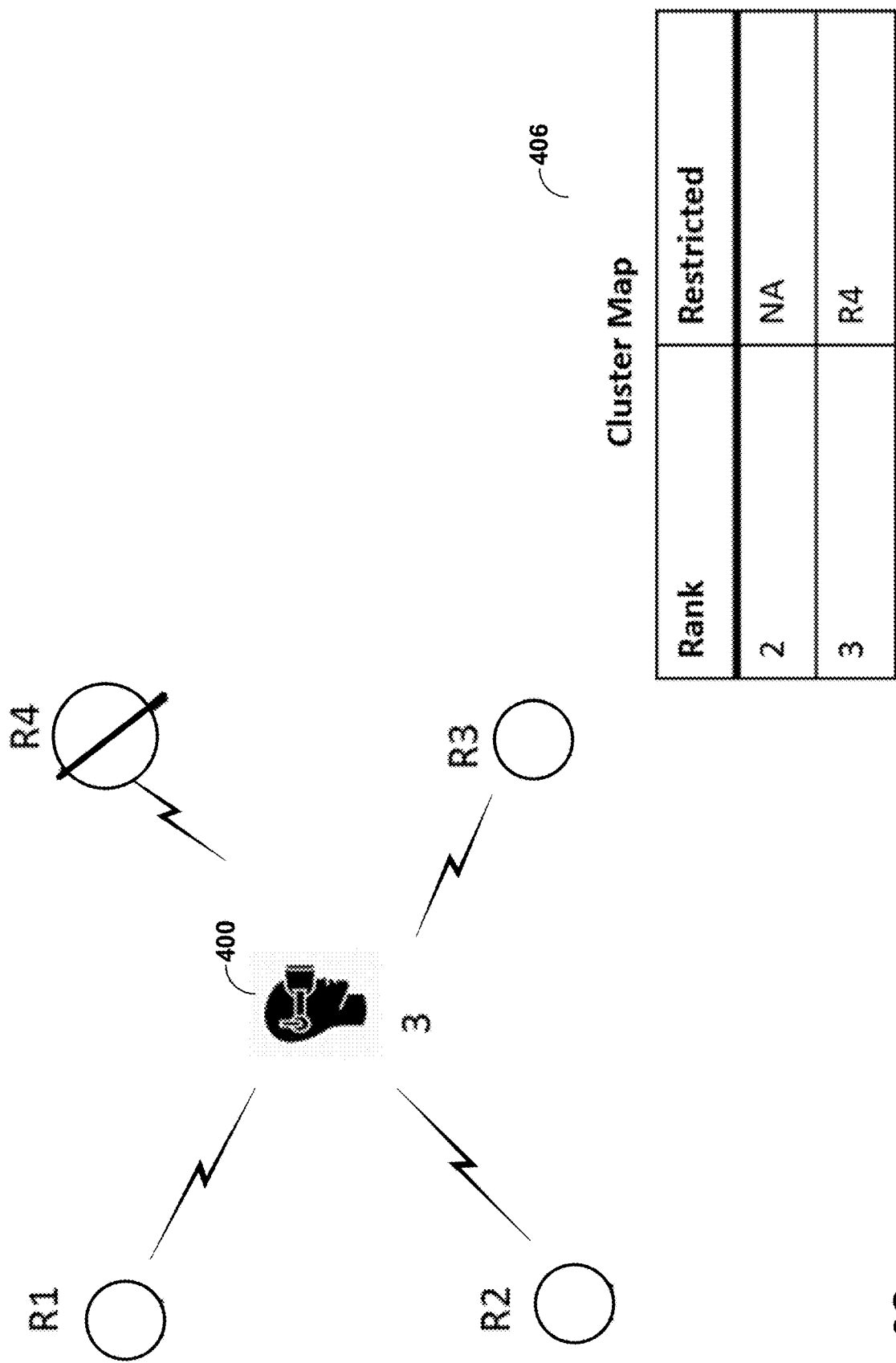

FIG. 2G is a conceptual diagram illustrating an example where a cluster of audio sources (C1) is marked as restricted in the audio metadata 408. In this example, the controller 31 may be configured to generate the audio metadata 408 to include privacy restrictions indicating if audio streams from a first cluster of audio capture devices (e.g., C1) are restricted or unrestricted. The VR device 400 receives a privacy setting rank of 3. The VR device 400 may then determine that cluster of audio sources C1 is restricted from the privacy setting rank 3 column of the audio metadata 408. Accordingly, the VR device 400 will refrain from decoding and/or playing back audio streams from cluster of audio sources C1. The example of FIG. 2G may be applicable where audio sources are densely packed or clustered in a physical location, such that individual toggling of individual audio sources is ineffective. In some examples, a single audio source within a cluster may be designated as a master audio source, and toggling the privacy restriction for the master audio source affects all other audio sources within the cluster. Audio sources belonging to a cluster may be determined using a vicinity (e.g., distance) threshold.

Figure 2H:
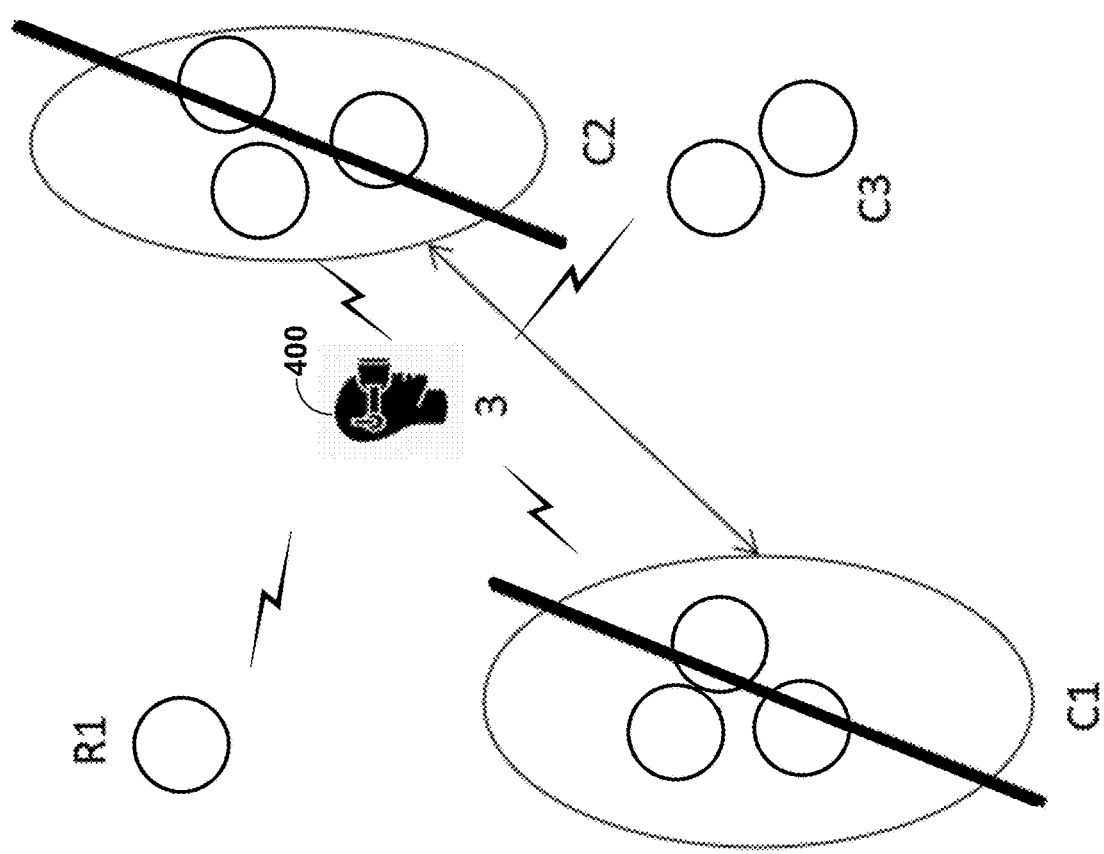
Figure 21:
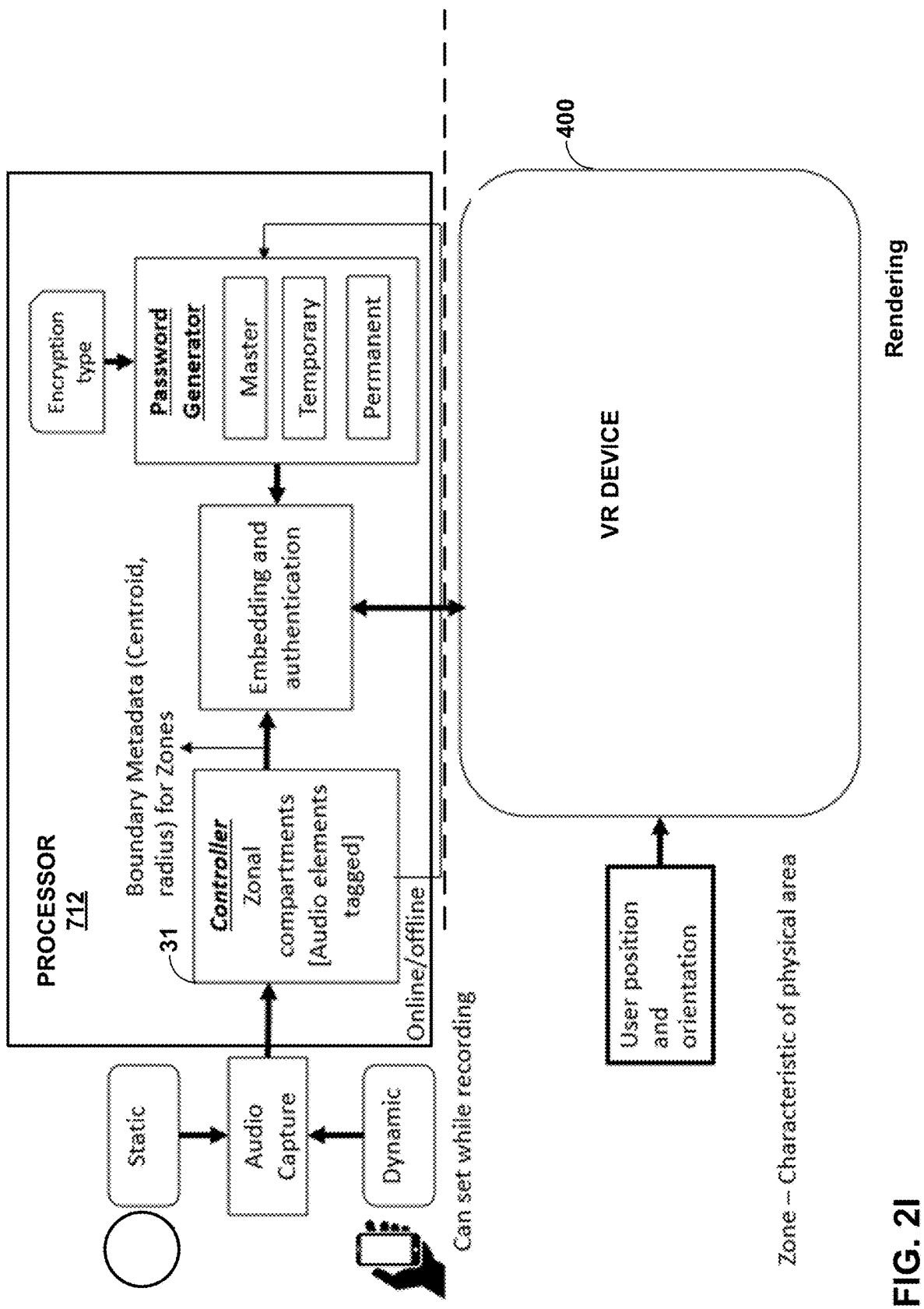

FIG. 2H is a conceptual diagram illustrating an example where a cluster of audio sources (C1) is marked as restricted in the audio metadata 410. In addition, the metadata 410 further includes a child column. Any audio sources in the child column inherit the privacy restrictions marked from the restricted column of the audio metadata 410. As such, cluster of audio sources C2 is also marked as restricted. In this way, certain audio sources or clusters of audio sources can be interdependent and the controller 31 need only toggle a single cluster or audio source to effect multiple clusters or audio sources.

In this example, the controller 31 may be configured to generate the audio metadata 410 to include information indicating that audio streams from a second cluster of audio capture devices (e.g., C2) share the same privacy restrictions as the first cluster of audio capture devices (e.g., C1). The VR device 400 receives a privacy setting rank of 3. The VR device 400 may then determine that cluster of audio sources C1 and C2 are restricted from the privacy setting rank 3 column of the audio metadata 410. Accordingly, the VR device 400 will refrain from decoding and/or playing back audio streams from cluster of audio sources C1 and C2.

In other examples of the disclosure, the source device 12 and the content consumer device 14 may use password-based techniques to restrict certain audio streams from being decoded and/or played back. The password-based techniques described below may be used alone, or in conjunction with the privacy-based audio metadata techniques described above with reference to FIGS. 2D-2H.

FIG. 2I is a block diagram illustrating the operation of the controller 31 in one example of the disclosure. In one example, the controller 31 may be implemented as a processor 712. The processor 712 is described in more detail below with reference to FIG. 7. As described above with reference to FIG. 1A, the source device 12 may capture audio data using the content capture device 20. The content capture device 20 may capture audio data from the microphones 18. The microphones 18 may include static sources, such as static single microphones or clusters of microphones. The microphones 18 may be live sources. Alternatively or in addition, the microphones 18 may include dynamic audio sources (e.g., dynamic in terms of use and/or position), such as mobile phones. In some examples, dynamic audio sources may be synthetic audio sources. The audio streams may come from single, physically spaced audio sources, or from clusters of audio sources in a single physical location.

In some examples, it may be beneficial to group audio sources that are located physically close to each other into a cluster or zone, as each individual audio source in a physically co-located cluster may sense some or all of the audio as each of the other audio sources in the same physical zone. As such, in some examples of the disclosure, the controller 31 may be configured to mask, null, and/or toggle audio streams from a zone of audio sources. In this context, masking a zone may refer to adjusting the audio gain of the zone down. Nulling a zone may refer to silencing audio coming from the zone (e.g., using beamforming). Toggling a zone may refer to marking an audio stream or groups of audio streams as unrestricted (e.g., able to be decoded and/or played) or restricted (e.g., not able to be decoded and/or played). A privacy toggle of on (e.g., restricted) indicates the VR device should mute and/or generally not decode or playback the audio stream. A privacy toggle of off (e.g., unrestricted or common access) indicates that any user may decode and playback the audio stream. In this way, the audio engineer or the content creator may grant exclusive access to certain audio sources for non-restricted users or based on hierarchical privacy setting ranks.

As shown in FIG. 2I, the controller 31 may be configured to receive and/or access the plurality of audio streams captured by the content capture device 20. The controller 31 may be configured to compartmentalize the audio streams into certain zones by the physical locations of the audio sources. In some examples, the controller 31 may tag (e.g., generate metadata) that indicates to which zone a particular audio source belongs. The controller 31 may further generate boundary metadata for the zone, including a centroid location and a radius.

In some examples, a content creator may be configured to set privacy settings at each audio source or cluster/zones of audio sources. In other examples, the controller 31 may be configured to determine if privacy settings are desired by the set for the plurality of audio streams, such as through explicit instructions received by the controller 31. Based on the privacy settings for the zones, the controller 31 may cause a password generator to generate a password for particular privacy settings of the zones. In some examples the controller 31 may encrypt the password according to an encryption type (e.g., Advanced Encryption Standard, Rivest-Shamir-Adleman (RSA) encryption, etc.).

The controller 31 may be configured to embed the password into either the bitstream 27 and/or the side channel 33 (see FIG. 1A) and transmit the password to the VR device 400 or any other content consumer device, including the content consumer device 14 of FIG. 1A and FIG. 1B. The VR device 400 may be configured to receive the password from controller 31 (or from another source) and send the password back to the controller 31 when requesting audio streams. The embedding and authentication block of the controller 31 embeds individual passwords generated for zones or audio sources with the audio streams and metadata retrieved by the controller 31. The embedding and authentication block of the controller 31 also performs authentication based on the password provided by the VR device 400. In one example, the controller 31 may be configured to only send unrestricted audio streams to the VR device 400 based on the authenticated password. In other examples, the controller device 31 may be configured to send one or more of audio streams to VR device 400 along with instructions on how the audio streams should be masked, silenced, and/or toggled As described above, the privacy settings may include one or more of masking a zone, nulling a zone, or toggling a zone as restricted or unrestricted. In one example, toggling the zones indicates if one or more of the plurality of audio streams are restricted or unrestricted. In other examples, toggling the privacy restrictions only indicates audio streams that are restricted.

In one example of the disclosure, the controller 31 may be configured to store a plurality of audio streams, each of the audio streams representative of a soundfield, and generate one or more of the plurality of audio streams based on privacy restrictions associated with a password. In one example, the controller 31 may be configured to transmit the one or more of the plurality of audio streams to a content consumer device.

In one example of the disclosure, the password is a master password associated with unrestricted privacy restrictions. In this example, the controller 31 may be configured to generate each of the plurality of audio streams. The master password may be a password for a super user/administrator. The master password gives unrestricted access to all audio streams in their entirety.

In another example of the disclosure, the password is a permanent password associated with conditional privacy restrictions. In this example, the controller 31 may be configured to generate the one or more of the plurality of audio streams based on the conditional privacy restrictions, wherein the conditional privacy restrictions indicate if one or more of the plurality of audio streams are restricted or unrestricted. In one example, the controller 31 may be configured to generate audio metadata (such as the audio metadata described above) that further includes respective conditional privacy restrictions indicating if one or more of the plurality of audio streams are restricted or unrestricted based on the permanent password. As will be described below, the conditional privacy restrictions may include masking (e.g., as indicated by a gain value), nulling, and/or toggling. In one example, the permanent password remains valid until reset. The controller 31 may generate the permanent password for individual zones and/or audio sources.

In another example of the disclosure, the password is a temporary password associated with conditional privacy restrictions. In this example, the controller 31 may be configured to generate the one or more of the plurality of audio streams based on the conditional privacy restrictions, wherein the conditional privacy restrictions rights indicate if one or more of the plurality of audio streams are restricted or unrestricted. In one example, the controller 31 may be configured to generate audio metadata (such as the audio metadata described above) that further includes respective conditional privacy restrictions indicating if one or more of the plurality of audio streams are restricted or unrestricted based on the temporary password. As will be described below, the conditional privacy restrictions may include masking (e.g., as indicated by a gain value), nulling, and/or toggling. In one example, the permanent password remains valid until reset. In one example, the temporary password remains valid for a fixed duration and expires after the fixed duration. The controller 31 may automatically invalidate the temporary password after the duration expires.

In one example, the privacy restrictions include respective gain values associated with respective audio streams of the one or more of the plurality of audio streams. In another example, the privacy restrictions include respective nulling indications associated with respective audio streams of the one or more of the plurality of audio streams. In another example, the privacy restrictions include respective toggling indications associated with respective audio streams of the one or more of the plurality of audio streams.

The VR device 400 may be configured to store the plurality of audio streams, each of the audio streams representative of a soundfield, receive one or more of the plurality of audio streams based on privacy restrictions associated with a password, and generate the corresponding soundfields based on the one or more of the plurality of audio streams. In one example, the VR device 400 sends the password to the controller 31.

In one example, the password is a master password associated with unrestricted privacy restrictions, and the VR device 400 may be configured to receive each of the plurality of audio streams.

In another example, the password is a permanent password associated with conditional privacy restrictions, and the VR device 400 may be configured to receive the one or more of the plurality of audio streams based on the conditional privacy restrictions, wherein the conditional privacy restrictions indicate if one or more of the plurality of audio streams are restricted or unrestricted. The VR device 400 may be further configured to receive audio metadata that further includes respective conditional privacy restrictions indicating if one or more of the plurality of audio streams are restricted or unrestricted based on the permanent password.

In another example, the password is a temporary password associated with conditional privacy restrictions, and the VR device 400 may be configured to receive the one or more of the plurality of audio streams based on the conditional privacy restrictions, wherein the conditional privacy restrictions rights indicate if one or more of the plurality of audio streams are restricted or unrestricted. The VR device 400 may be further configured to receive audio metadata that further includes respective conditional privacy restrictions indicating if one or more of the plurality of audio streams are restricted or unrestricted based on the temporary password.

In one example, the VR device 400 may be configured to receive the password from a host (e.g., the controller 31). In another example, the VR device 400 may be configured to receive the password from a source other than the host.

Figure 2J:
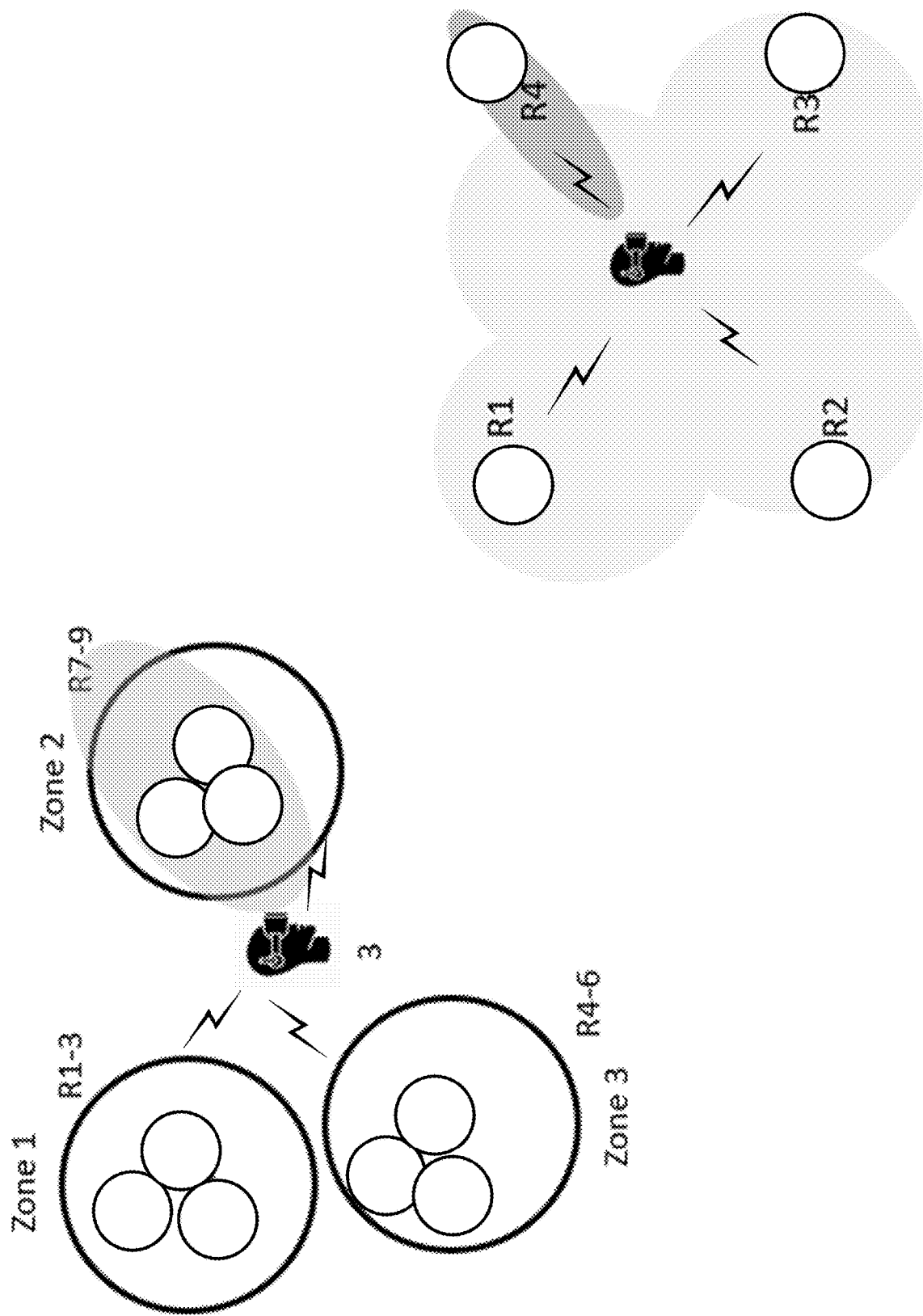

FIG. 2J is a diagram showing examples of masking and nulling zones and/or individual audio sources. In scenario 420, the VR device 400 was issued a password that is associated with the privacy restriction of masking zone 2 (audio sources R7-R9). In this example, the VR device 400 further receives gain values for zone 2 to apply when playing back audio streams from zone 2. In scenario 430, the VR device 400 was issued a password that is associated with the privacy restriction of nulling audio source R4. In this example, the VR device 400 may completely mute the audio stream from audio source R4 (e.g., through beamforming or applying a zero gain).

Figure 2K:
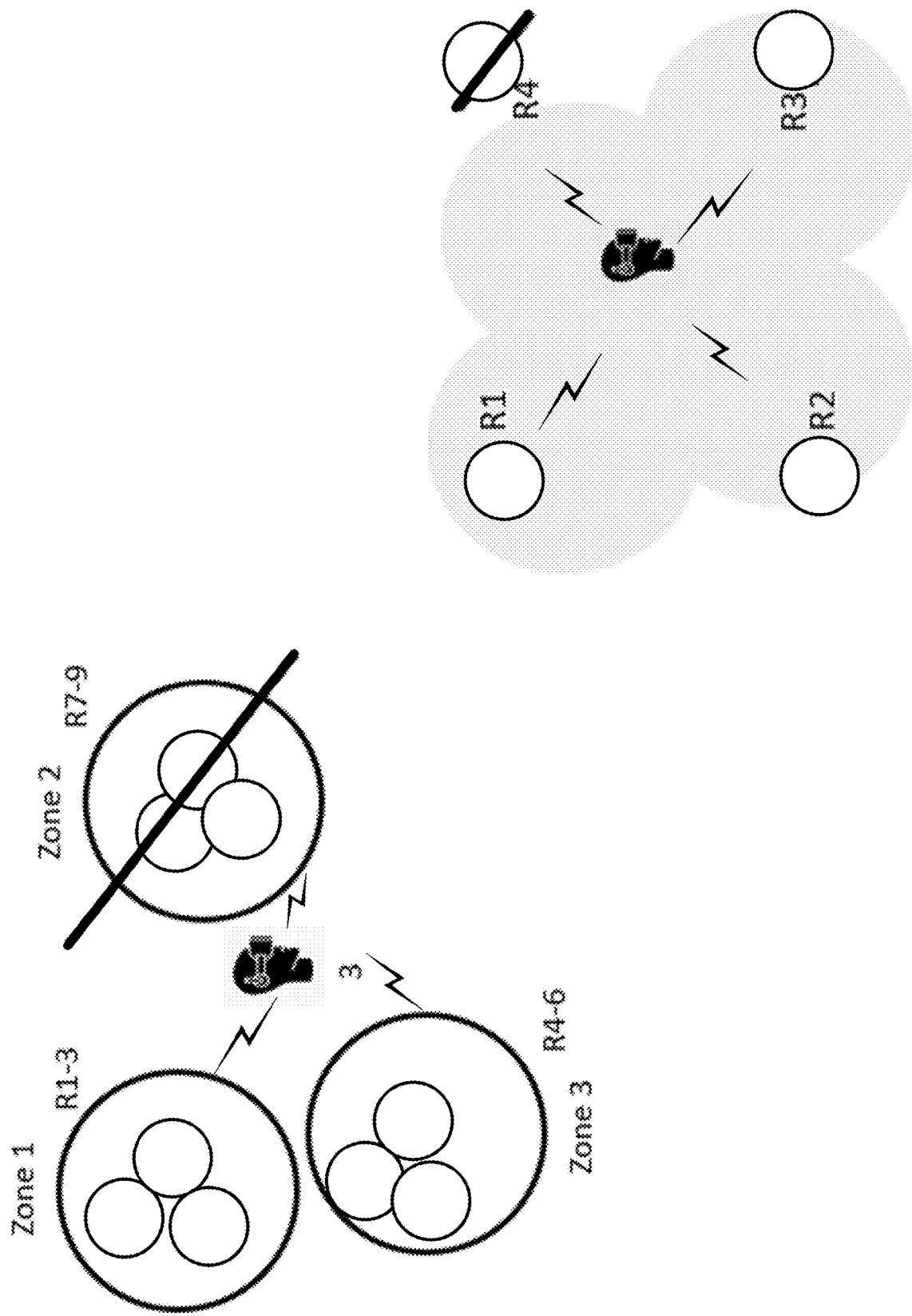

FIG. 2K is a diagram showing examples of toggling zones and/or individual audio sources. In scenario 440, the VR device 400 was issued a password that is associated with the privacy restriction of toggling zone 2 (audio sources R7-R9) to restricted. In this example, the VR device 400 refrains from decoding and/or playing back audio streams from zone 2. In scenario 450, the VR device 400 was issued a password that is associated with the privacy restriction of toggling audio source R4. In this example, the VR device 400 refrains from decoding and/or playing back audio streams from audio source R4.

FIGS. 3A-3F are diagrams illustrating systems that may perform various aspects of the techniques described in this disclosure. Referring first to the example of FIG. 3A, a system 10 includes a source device 12 and a target device 14. The source device 12 is shown as a bicycle 12 that is in communication via a wireless connection 200 with the target device 14, which is shown for purposes of example as a vehicle. Although described with respect to the bicycle 12 and the vehicle 14, the techniques may be performed by any type of device capable of wireless communication, including a mobile handset device (including a so-called "smartphone"), a watch (including so-called "smartwatches"), a laptop, a headunit (including so-called "infotainment systems"), and the like.

The bicycle 12 and the vehicle 14 may be manually operated or may be autonomously operated. For purposes of explanation, the bicycle 12 is assumed to be manually operated by a rider (which is not shown in the example of FIG. 3A for ease of illustration purposes) and the vehicle 14 is assumed to be autonomously operated.

As shown in the example of FIG. 3A, the vehicle 14 is autonomously operating by driving in a right lane 202 of a road 210, which has the right lane 202 and a left lane 204. The vehicle 14 may, when the bicycle 12 is sufficiently close (within some threshold proximity or distance), establish the wireless connection 200 with the bicycle 12. Alternatively, the bicycle 12 may, when the vehicle 14 is sufficiently close (within the threshold proximity or distance), establish the wireless connection 200. Regardless of which of the devices 12/14 initiates the wireless connection 200, the wireless connection 200 may be established in accordance with a fifth generation (5G) cellular standard, a personal area network (PAN) protocol, such as Bluetooth®, or any other wireless communication protocol (including WiFi™ protocols) and the like. The wireless connection 200 may conform to a vehicle to anything (V2X) protocol, including a so-called cellular V2X (C-V2X) protocol.

In any event, the vehicle 14 may communicate with the bicycle 12 via the wireless connection 200. The rider (which again is not shown in the example of FIG. 3A for ease of illustration purposes) of the bicycle 12 may interface with a source device (which is assumed for ease of illustration to be integrated into the bicycle 12 and as such the bicycle 12 may be referred to as the source device 12) to capture audio data (which are assumed for purposes of illustration to be words spoken by the rider of the bicycle 12. Although assumed as being integrated into the bicycle 12, the source device 12 may be separate from the bicycle and may represent one or more of the devices described above with respect to the example of FIG. 1A.

The bicycle 12 may include a microphone or other audio capture device configured to capture the audio data and generate, based on the audio data, an audio stream. The bicycle 12 may generate the audio stream along with audio metadata, the audio metadata including origination coordinates (e.g., global positioning system—GPS-coordinates) at which the corresponding audio stream originates. The bicycle 12 may output, via the wireless connection 200, the audio stream to the vehicle 14.

The vehicle 14 may receive the audio stream and the audio metadata, storing the audio stream along with the audio metadata. The vehicle 14 may determine, based on current coordinates of the vehicle 14 relative to the origination coordinates corresponding to the audio stream, a direction of arrival 212A for the audio stream. The vehicle 14 may determine, in the example of FIG. 3A, that the audio stream is arriving from directly behind the vehicle 14 and traveling to the front of the vehicle 14 (as denoted by the arrow).

The vehicle 14 may next render, based on the direction of arrival 212A, the audio stream to appear to arrive from the direction of arrival 212A, thereby generating speaker feeds to simulate a soundfield captured by the bicycle 12 and arriving from directly behind the vehicle 14. The vehicle 14 may, in this example, generate back right and back left speaker feeds in the example of FIG. 3A, outputting the back right and back left speaker feeds to the back right and back left speakers of the vehicle 14 (which are not shown for ease of illustration purposes) to reproduce the soundfield 214A represented by the audio stream.

In the example of FIG. 3A, it is assumed that the rider of the bicycle 12 captures audio data of the rider issuing a command to let the vehicle 14 know that the rider will be "passing on the left." Although described below with respect to spoken words, the bicycle 12A may offer one or more audio streams, including pre-recorded audio streams, live audio streams, or any other type of audio stream.

As it is assumed to be operating autonomously (e.g., a computing device is in control of the vehicle 14 and issues instructions that result in the computing device steering, accelerating, braking and otherwise operating the vehicle 14 without manual intervention), the vehicle 14 may analyze the audio stream to extract the command, and operate, based on the command parsed from the audio stream, the vehicle 14 to avoid merging into or otherwise impacting operation of the bicycle 12. That is, the vehicle 14 may autonomously adjust, based on the command or other spoken words, operation of the vehicle 14.

Figure 3B:
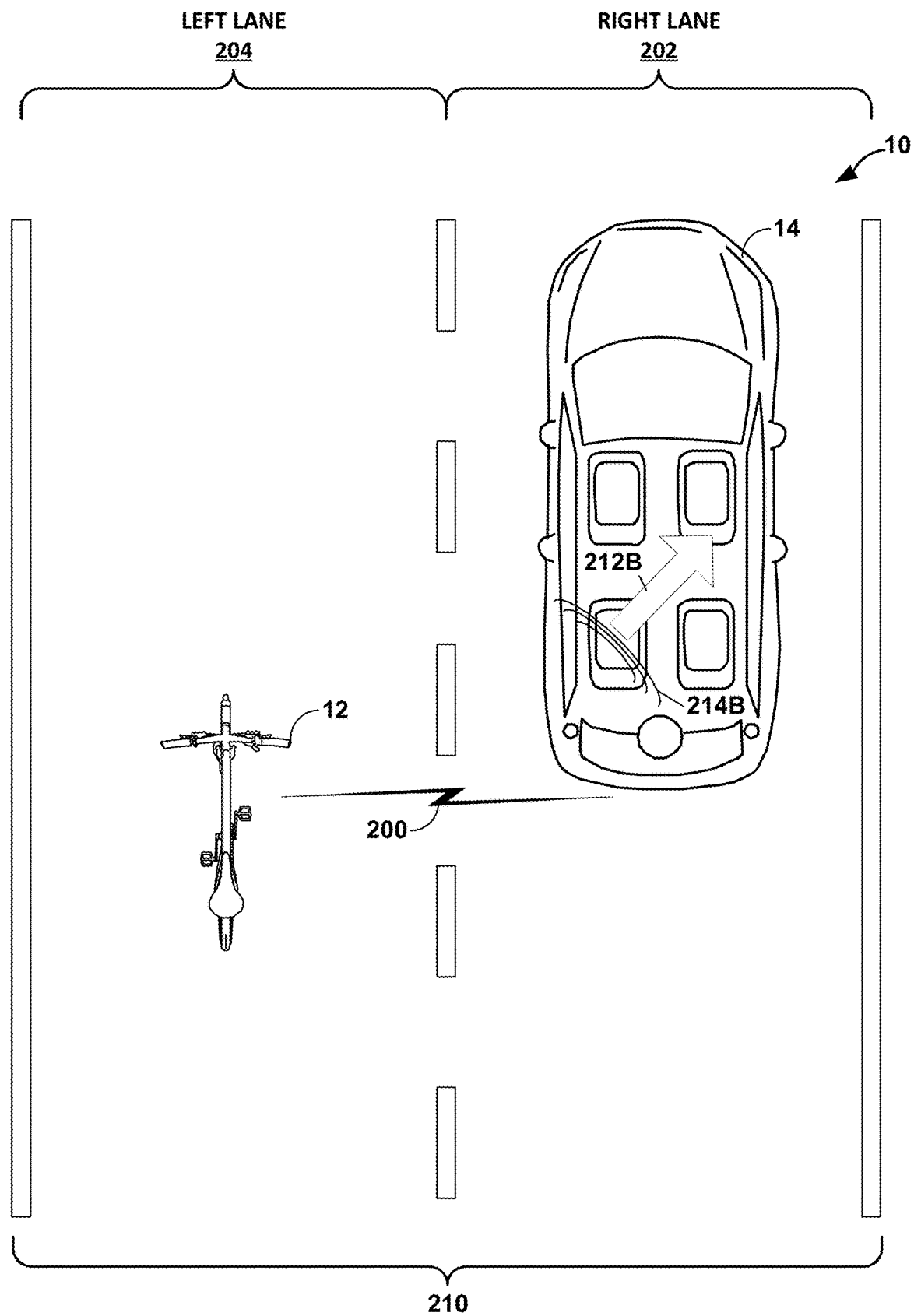

Referring next to the example of FIG. 3B, the bicycle 12 has begun passing the vehicle 14 by moving over into the left lane 204 of the road 210. Assuming the bicycle 12 continues to provide the audio stream to the vehicle 14 via the wireless connection 200, the bicycle 12 may continue to update the audio metadata for the audio stream to denote the updated origination coordinates that indicate the bicycle is in the left lane 204 next to the vehicle 14. Based on the updated origination coordinates and the current coordinates of the vehicle 14, the vehicle 14 may determine a direction of arrival 212B. The vehicle 14 may render, based on the direction of arrival 212B, the speaker feeds that spatialize the audio stream to appear to arrive from the direction of arrival 212B. The vehicle 14 may, in this example, render a back left speaker feed from the audio stream and output the back left speaker feed to the back left speaker to reproduce the soundfield 214B to reflect the new direction of arrival 212B.

Figure 3C:
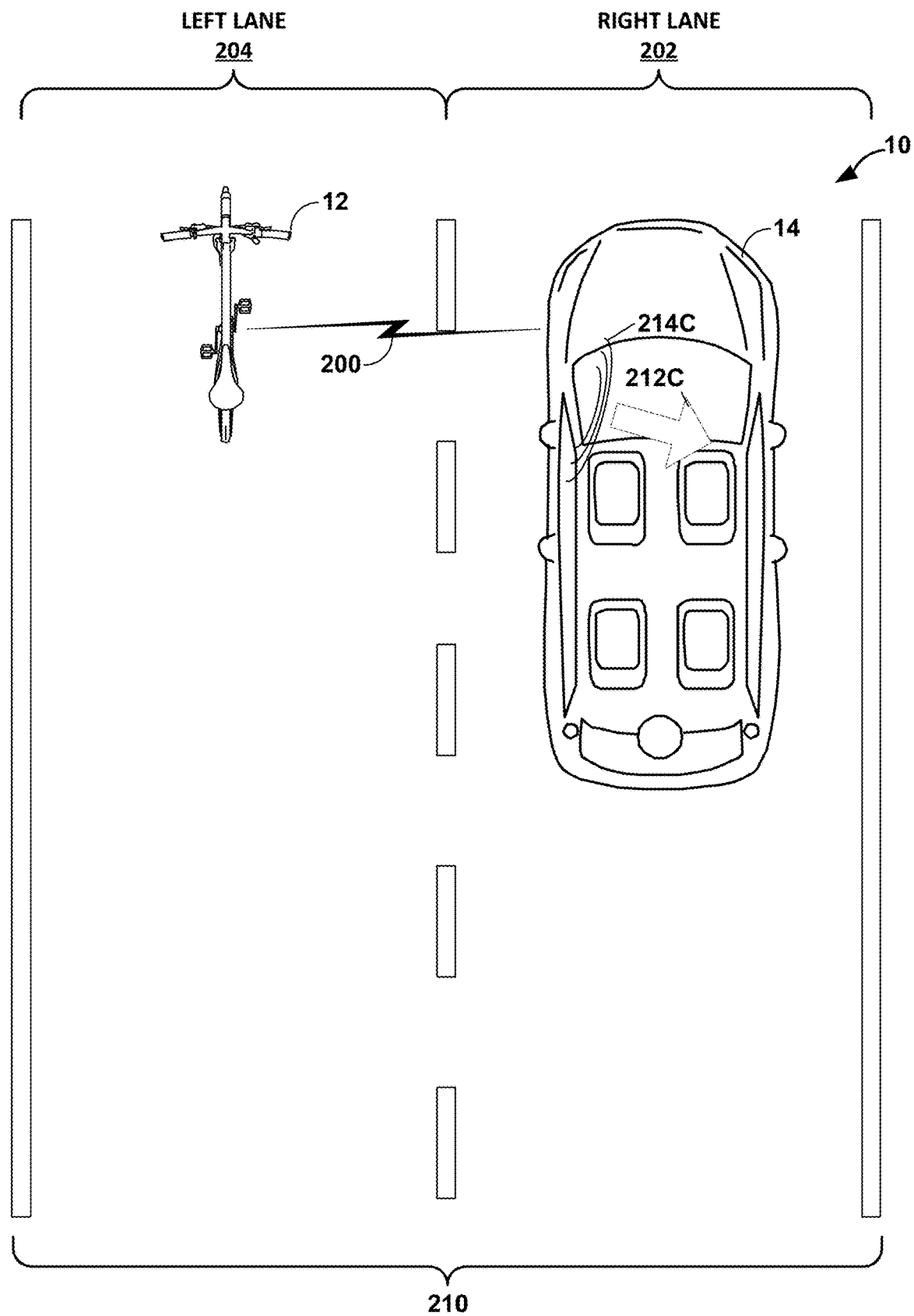

Referring next to the example of FIG. 3C, the bicycle 12 has mostly passed the vehicle 14 in the left lane 204 of the road 210. Assuming the bicycle 12 continues to provide the audio stream to the vehicle 14 via the wireless connection 200, the bicycle 12 may continue to update the audio metadata for the audio stream to denote the updated origination coordinates that indicate the bicycle is in the left lane 204 nearly passed the vehicle 14. Based on the updated origination coordinates and the current coordinates of the vehicle 14, the vehicle 14 may determine a direction of arrival 212C. The vehicle 14 may render, based on the direction of arrival 212C, the speaker feeds that spatialize the audio stream to appear to arrive from the direction of arrival 212C. The vehicle 14 may, in this example, render a front left speaker feed from the audio stream and output the front left speaker feed to the front left speaker to reproduce the soundfield 214C to reflect the new direction of arrival 212C.

Figure 3D:
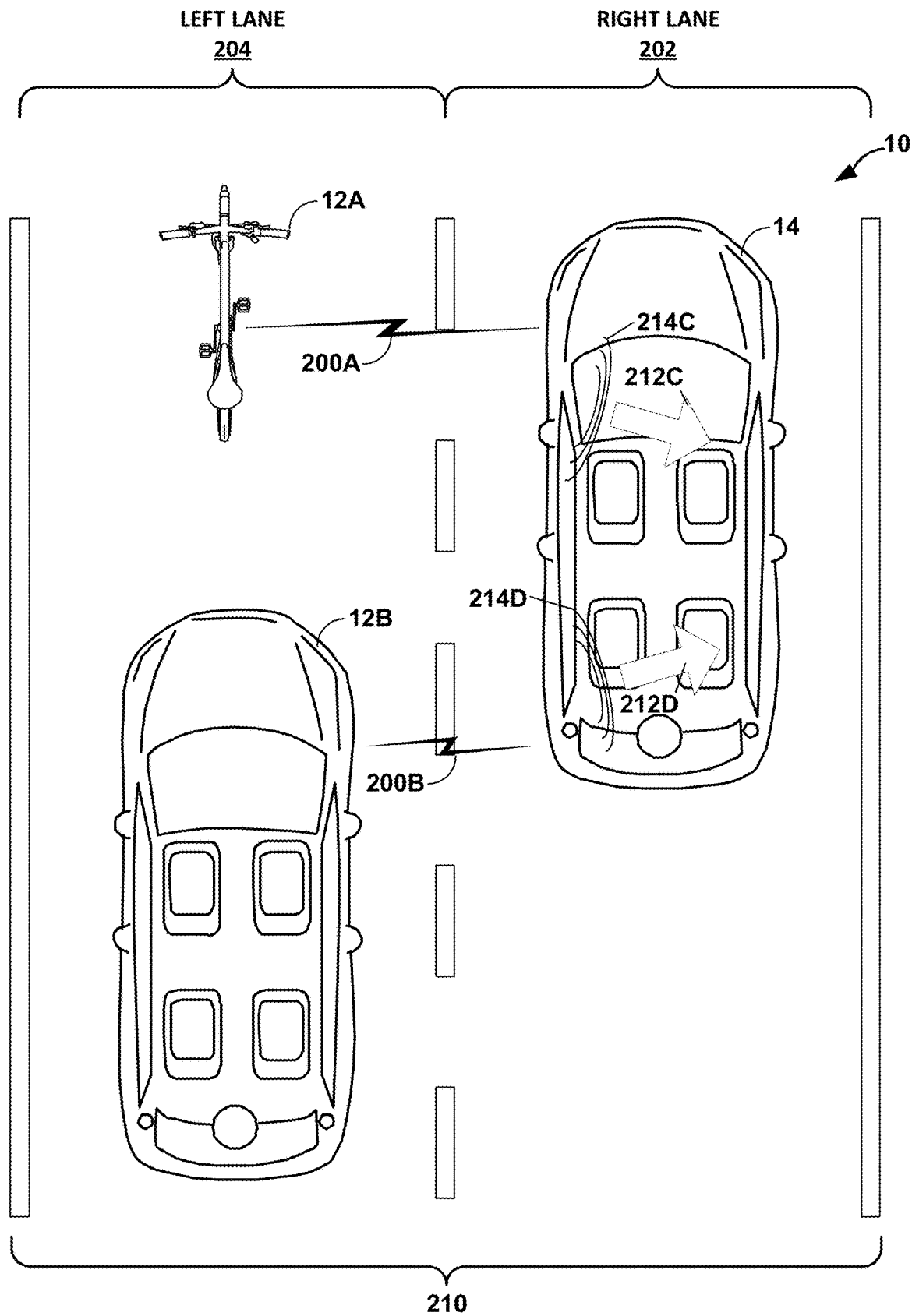

Referring next to the example of FIG. 3D, another vehicle may arrive, whereupon the vehicle 14 may establish another wireless connection 200B (where the original wireless connection 200 with the bicycle 12 is denoted as the wireless connection 200A and the original bicycle 12 is denoted as the bicycle 12A). The additional vehicle may act as another source device 12B, and as such, the additional vehicle may be denoted as the vehicle 12B, as it is assumed that the source device 12B is integrated within the vehicle 12B (e.g., as a vehicle headunit). Although assumed as being integrated into the vehicle 12B, the source device 12B may be separate from the vehicle and may represent one or more of the devices described above with respect to the example of FIG. 1A.

In any event, the vehicle 12B may offer one or more audio streams, including pre-recorded audio streams, live audio streams, or any other type of audio stream. The vehicle 12B may output the audio streams along with corresponding audio metadata including an originating location (or, in other words, origination coordinates) from which the audio streams are to appear to originate. The vehicle 12B may output the audio streams along with the corresponding audio metadata via the wireless connection 200B, which may be similar to the wireless connection 200 described above (and the wireless connection 200A as now denoted in the example of FIG. 3D.

The vehicle 14 may receive, via the wireless connection 200B, the audio streams and the corresponding audio metadata. The vehicle 14 may present via the integrated source device (which may include a display) indications that the audio streams are available. An operator of the vehicle 14 may select one of the indications to initiate playback of a corresponding one of the audio streams, whereupon the vehicle 14 may determine, based on the corresponding originating location (e.g., GPS coordinates specifying the current location of the vehicle 12B) set forth in the audio metadata and the current coordinates of the vehicle 14, another direction of arrival 212D reflective of the location of the vehicle 12B relative to the location of the vehicle 14.

The vehicle 14 may render, based on the direction of arrival 212D, the selected one of the audio streams to generate one or more speaker feeds, where in this instance the vehicle 14 may render a back left speaker feed to reflect the location of the vehicle 12B relative to the location of the vehicle 14. As such, the vehicle 14 may render the back left speaker feed to spatialize the selected one of the audio streams. The vehicle 14 may output the back left speaker feed to the back left speaker to reproduce soundfield 214D represented by the selected one of the audio streams.

Figure 3E:
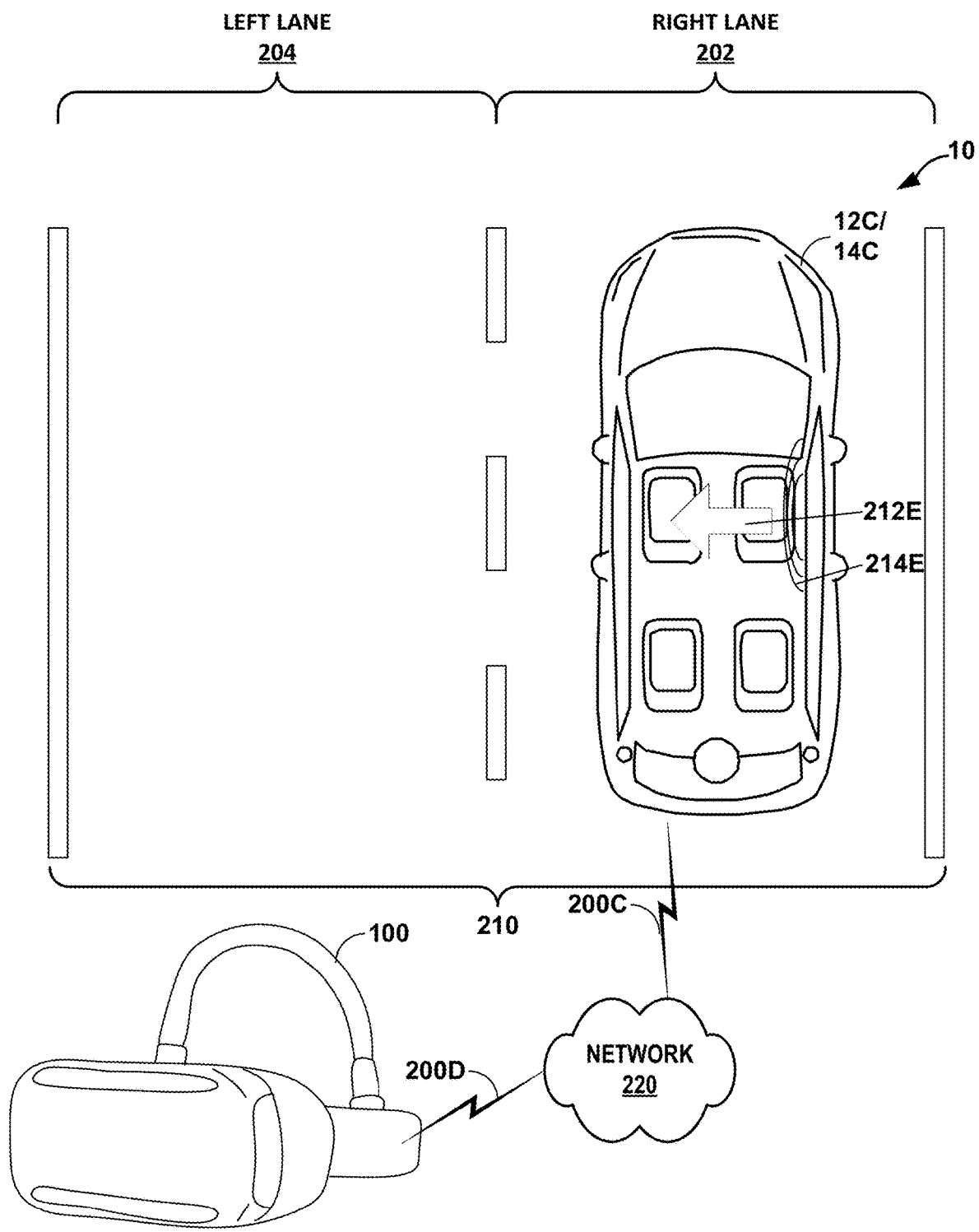
Figure 3F:
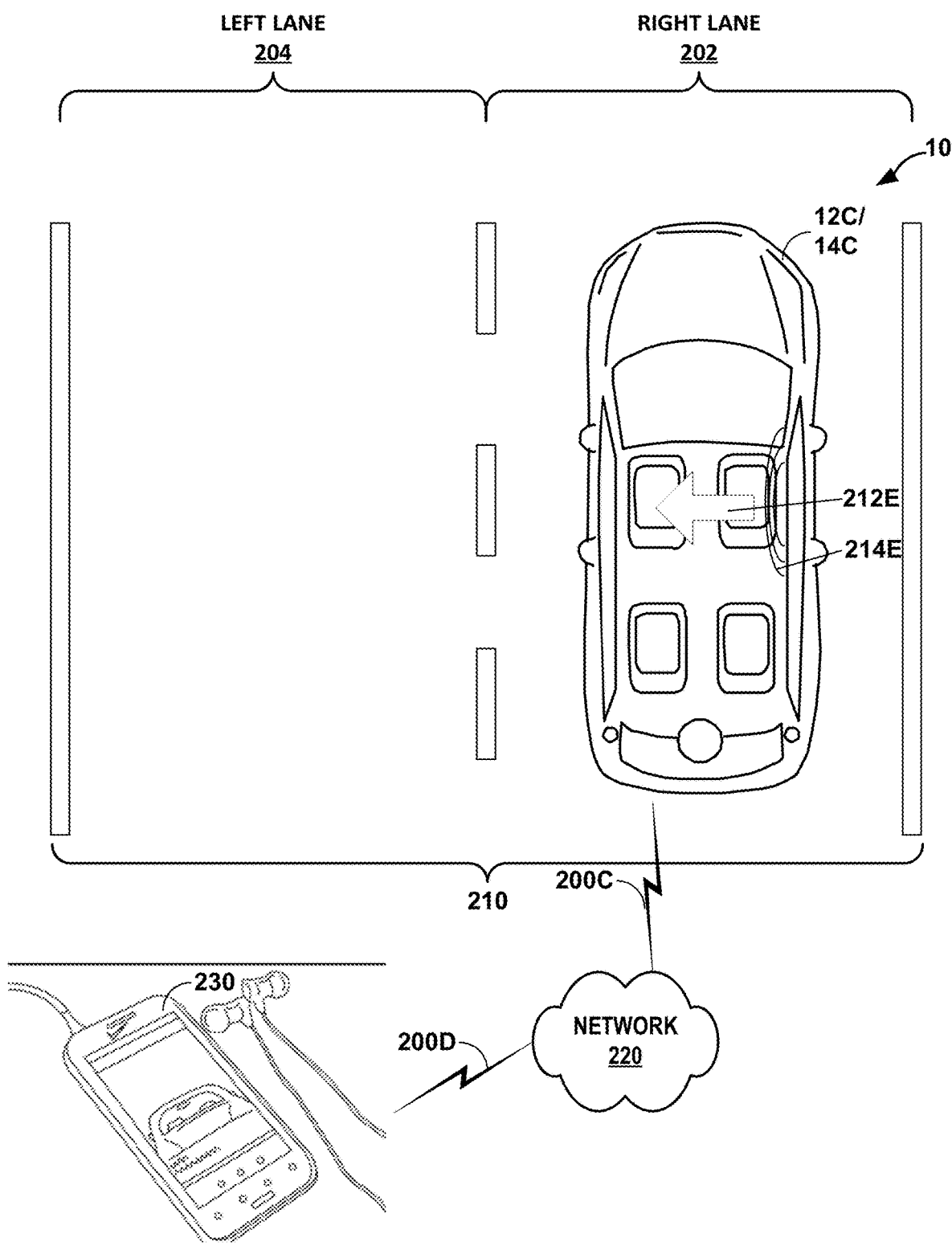

In the example of FIG. 3E, the vehicle 12C may operate as a source device (and may be referred to as a "source device 12C"), providing immersive video and/or audio via a wireless connection 200C with a network 220. The network 220 may include a public network (such as the Internet) or a private network in which a collection of computing devices (including possibly routers, switches, hubs, and the like) interconnect to facilitate communication of packets of data between one another. The vehicle 12C may provide video and audio to enable an extended reality (XR) device 100 to view and/or listen to the environment in which the vehicle 12C operates, providing what may be referred to as a "race car experience" that allows the user of the XR headset 100 (which is another way to refer to the XR device 100) to experience riding in the vehicle 12C.

In some instances, the XR device 100 may transmit an audio stream back to the vehicle 12C, whereupon the vehicle 12C operates as a target device (hence the "12C/14C" numerals identifying the vehicle 12C/14C). The XR device 100 may include audio metadata specifying the front right passenger seat (or any other passenger seat) as the originating location. The vehicle 14C may receive the audio stream from the XR device 100, determine the direction of arrival 212E based on the originating location associated with the audio stream, and render, based on the direction of arrival 12E, the audio stream to one or more speaker feeds that spatialize the audio stream to emulate audio from the XR device 100 as if the user of the XR device 100 was sitting in the front right passenger seat of the vehicle 14C.

This may allow the operator of the vehicle 14C to hear the user of the XR device 100 as if the user of the XR device 100 was sitting in the front right passenger seat acting as a co-pilot. In this example, the vehicle 14C may render a front right speaker feed and output the front right speaker feed to a front right speaker in order to reproduce soundfield 214E represented by the audio stream sent by the XR device 100. Although described with respect to the XR device 100, the techniques may be performed with respect to any device, such as a mobile phone 230 shown in the example of FIG. 3F.

Moreover, although described with respect to V2X protocols, the techniques may retrieve audio streams from non-V2X connections, such as those described above with respect to the network 220, the XR device 100, and the mobile phone 230. The vehicle 14C may retrieve audio streams from the Internet or other public or private network represented by the network 220. The vehicle 14C may obtain these audio streams using a dynamic adaptive streaming over hypertext transfer protocol (HTTP) (DASH).

Figure 4:
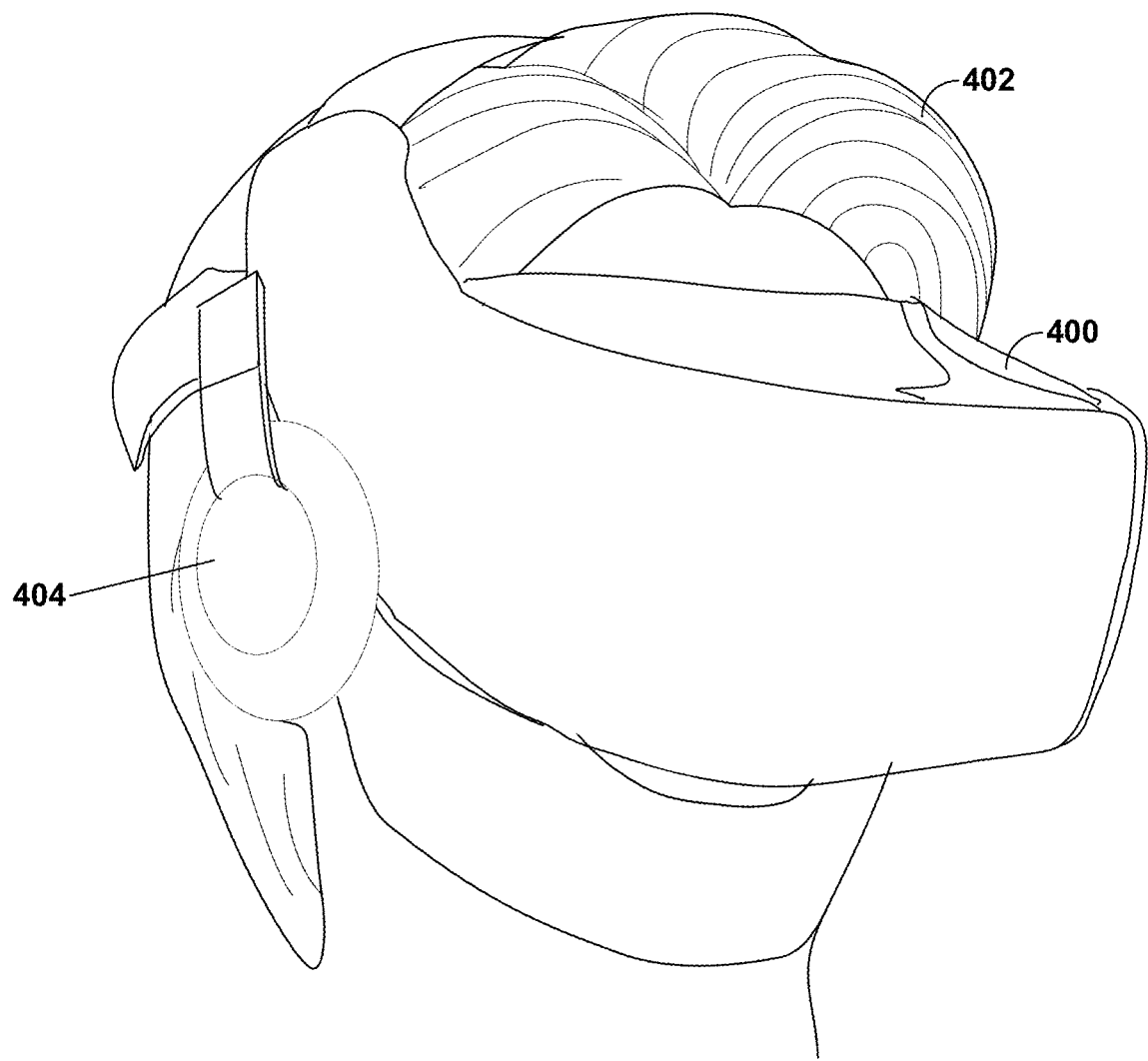
FIG. 4 is a diagram illustrating an example of a VR device worn by a user.

FIG. 4 is a diagram illustrating an example of a VR device 400 worn by a user 402. The VR device 400 is coupled to, or otherwise includes, headphones 404, which may reproduce a soundfield represented by the audio data 19' through playback of the speaker feeds 35. The speaker feeds 35 may represent an analog or digital signal capable of causing a membrane within the transducers of headphones 104 to vibrate at various frequencies, where such process is commonly referred to as driving the headphones 104.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may include a tracking device (e.g., the tracking device 40) that is configured to track head movement of the user 402, and adapt the video data shown via the VR headset 400 to account for the head movements, providing an immersive experience in which the user 402 may experience a displayed world shown in the video data in visual three dimensions. The displayed world may refer to a virtual world (in which all of the world is simulated), an augmented world (in which portions of the world are augmented by virtual objects), or a physical world (in which a real world image is virtually navigated).

While VR (and other forms of AR and/or MR) may allow the user 402 to reside in the virtual world visually, often the VR headset 400 may lack the capability to place the user in the displayed world audibly. In other words, the VR system (which may include a computer responsible for rendering the video data and audio data—that is not shown in the example of FIG. 2 for ease of illustration purposes, and the VR headset 400) may be unable to support full three-dimension immersion audibly (and in some instances realistically in a manner that reflects the displayed scene presented to the user via the VR headset 400).

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 402 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world proving a VR-lite-type experience (e.g., holding up the device and rotating or translating the device to view different portions of the displayed world).

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 capable of performing binaural rendering using one or more head-related transfer functions HRTFs or the other functions capable of rendering to left and right speaker feeds 43.

The audio playback system 16B may output the left and right speaker feeds 43 to headphones 44, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 44 may couple wirelessly or via wired connection to the additional wearable devices.

Additionally, the headphones 44 may couple to the audio playback system 16B via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 44 may recreate, based on the left and right speaker feeds 43, the soundfield represented by the audio data 19'. The headphones 44 may include a left headphone speaker and a right headphone speaker which are powered (or, in other words, driven) by the corresponding left and right speaker feeds 43.

Figure 5:
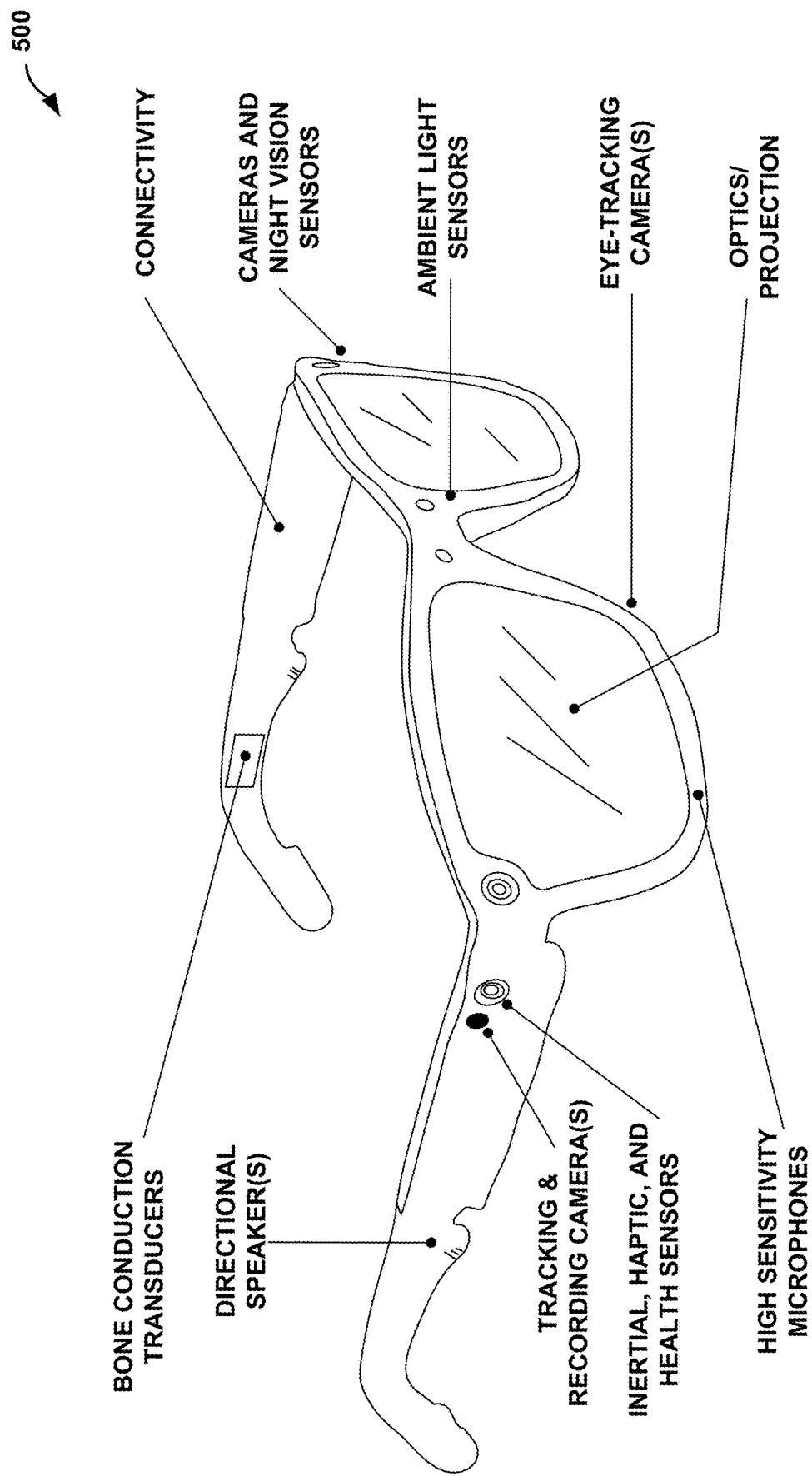
FIG. 5 is a diagram illustrating an example of a wearable device that may operate in accordance with various aspect of the techniques described in this disclosure.

FIG. 5 is a diagram illustrating an example of a wearable device 500 that may operate in accordance with various aspect of the techniques described in this disclosure. In various examples, the wearable device 500 may represent a VR headset (such as the VR headset 100 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 500, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, Bluetooth, etc. The wearable device 500 also includes one or more ambient light sensors, and bone conduction transducers. In some instances, the wearable device 500 may also include one or more passive and/or active cameras with fisheye lenses and/or telephoto lenses. Although not shown in FIG. 5, the wearable device 500 also may include one or more light emitting diode (LED) lights. In some examples, the LED light(s) may be referred to as "ultra bright" LED light(s). The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 5, wearable device 500 may include other types of sensors for detecting translational distance.

Although described with respect to particular examples of wearable devices, such as the VR device 500 discussed above with respect to the examples of FIG. 2 and other devices set forth in the examples of FIGS. 1A and 1B, a person of ordinary skill in the art would appreciate that descriptions related to FIGS. 1A, 1B, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 6A:
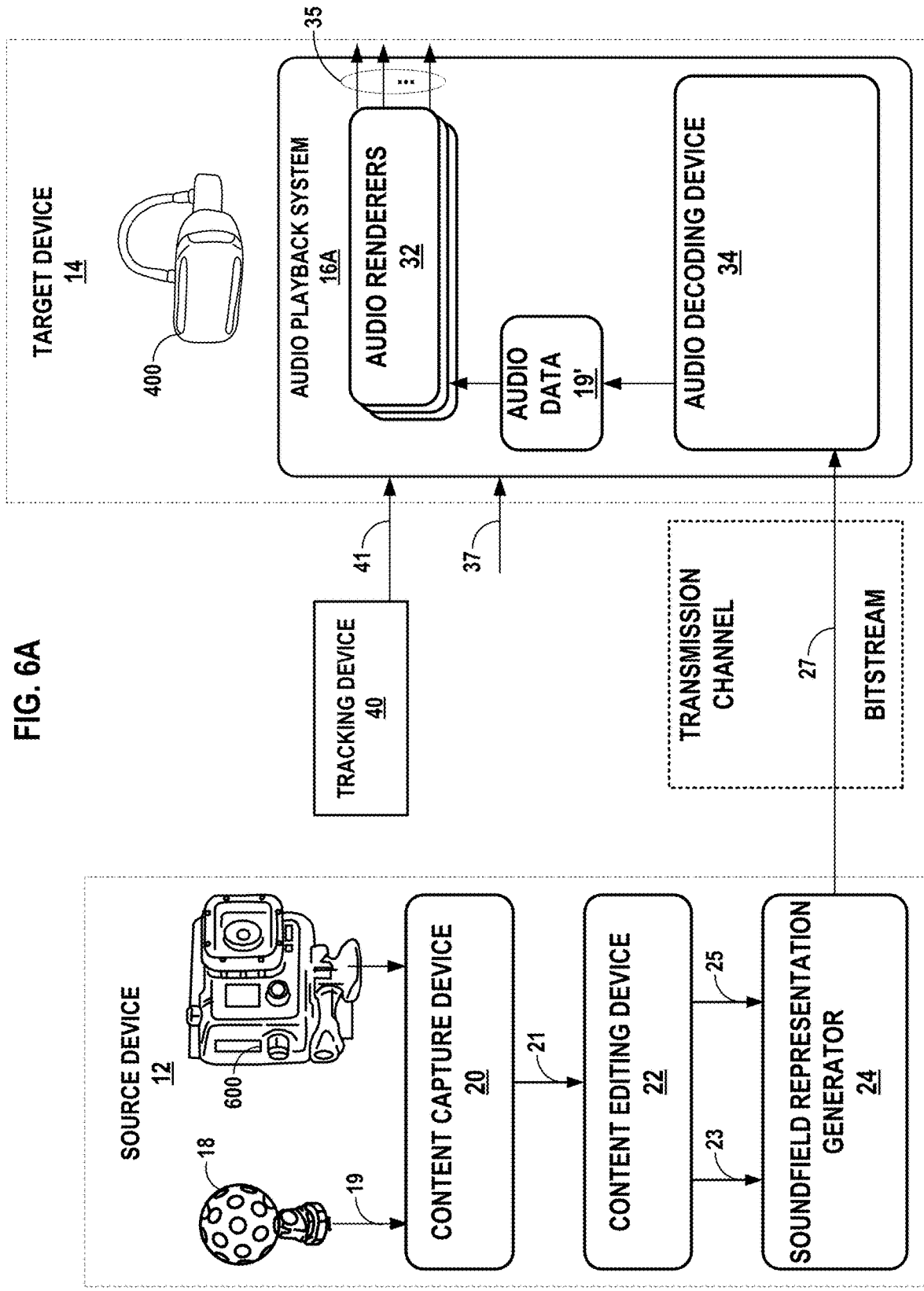
FIGS. 6A and 6B are diagrams illustrating other example systems that may perform various aspects of the techniques described in this disclosure.
Figure 6B:
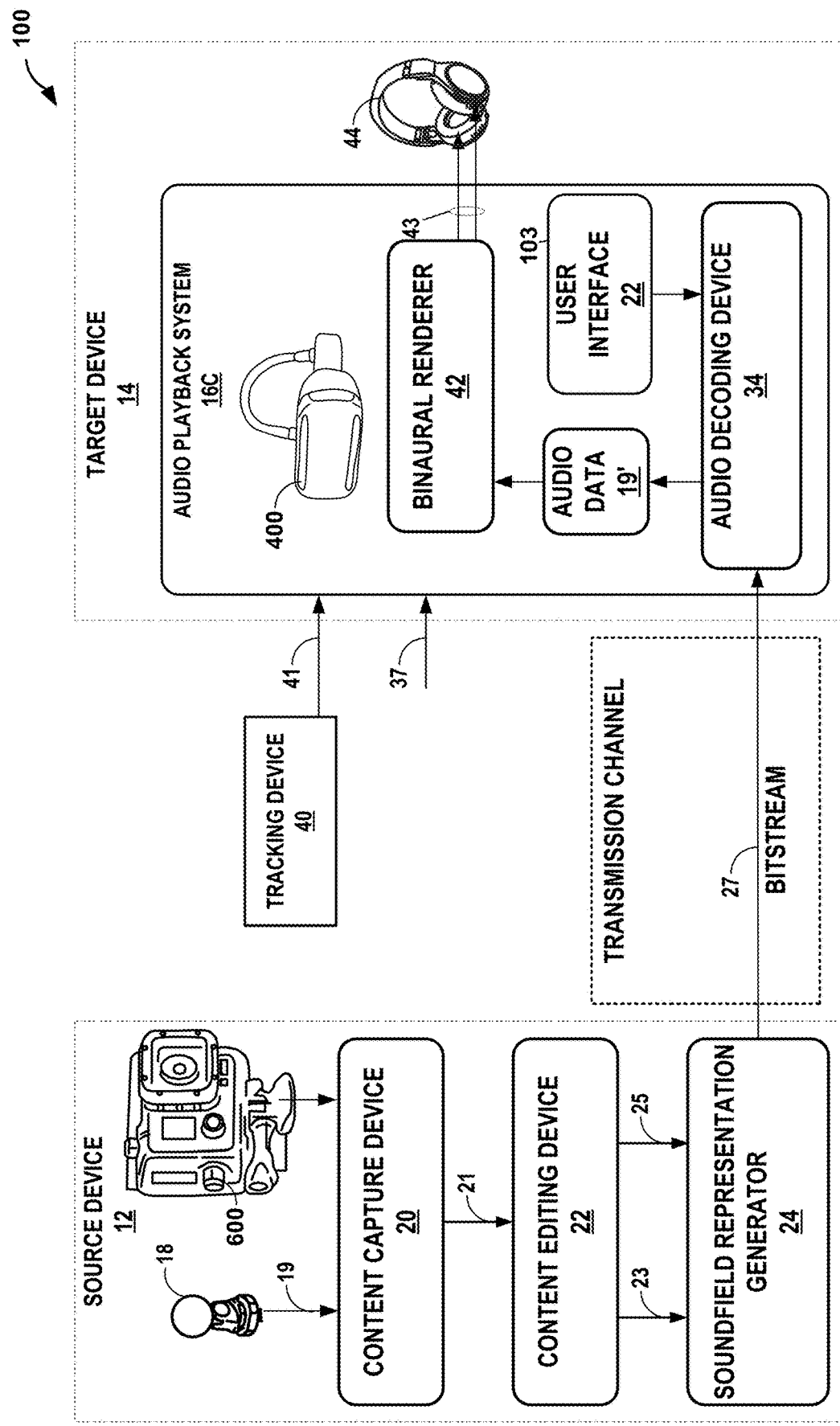

FIGS. 6A and 6B are diagrams illustrating example systems that may perform various aspects of the techniques described in this disclosure. FIG. 6A illustrates an example in which the source device 12 further includes a camera 600. The camera 600 may be configured to capture video data, and provide the captured raw video data to the content capture device 20. The content capture device 20 may provide the video data to another component of the source device 12, for further processing into viewport-divided portions.

In the example of FIG. 6A, the content consumer device 14 also includes the wearable device 400. It will be understood that, in various implementations, the wearable device 100 may be included in, or externally coupled to, the content consumer device 14. The wearable device 400 includes display hardware and speaker hardware for outputting video data (e.g., as associated with various viewports) and for rendering audio data.

FIG. 6B illustrates an example in which the audio renderers 32 shown in FIG. 6A are replaced with a binaural renderer 42 capable of performing binaural rendering using one or more HRTFs or the other functions capable of rendering to left and right speaker feeds 43. The audio playback system 16C may output the left and right speaker feeds 43 to headphones 44.

The headphones 44 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 44 may recreate, based on the left and right speaker feeds 43, the soundfield represented by the audio data 19'. The headphones 44 may include a left headphone speaker and a right headphone speaker which are powered (or, in other words, driven) by the corresponding left and right speaker feeds 43.

Figure 7:
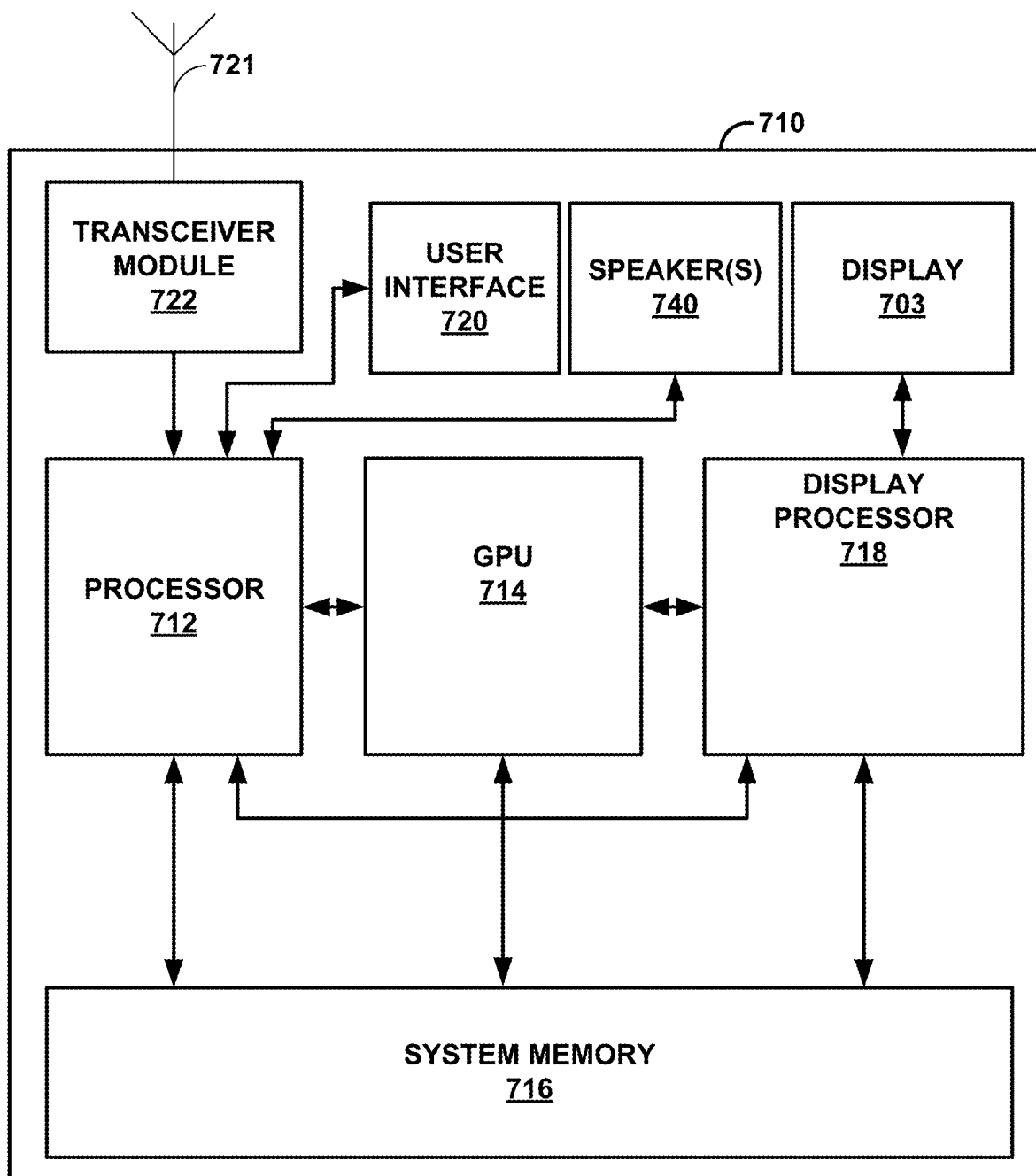
FIG. 7 is a block diagram illustrating example components of one or more of the source device and the content consumer device shown in the example of FIG. 1.

FIG. 7 is a block diagram illustrating example components of one or more of the source device and the content consumer device shown in the example of FIG. 1. In the example of FIG. 7, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 712 is a mobile device, the display processor 718 is a mobile display processor (MDP). In some examples, such as examples where the source device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (i.e., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the source device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (i.e., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may comprise one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the source device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the content consumer device 12 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, a person area network (PAN) protocol, such as Bluetooth™, or other open-source, proprietary, or other communication standard. That is, the transceiver module 722 may represent a separate transmitter, a separate receiver, both a separate transmitter and a separate receiver, or a combined transmitter and receiver. The antenna 721 and the transceiver 722 may be configured to receive encoded audio data. Likewise, the antenna 721 and the transceiver 722 may be configured to transmit encoded audio data.

Figure 8A:
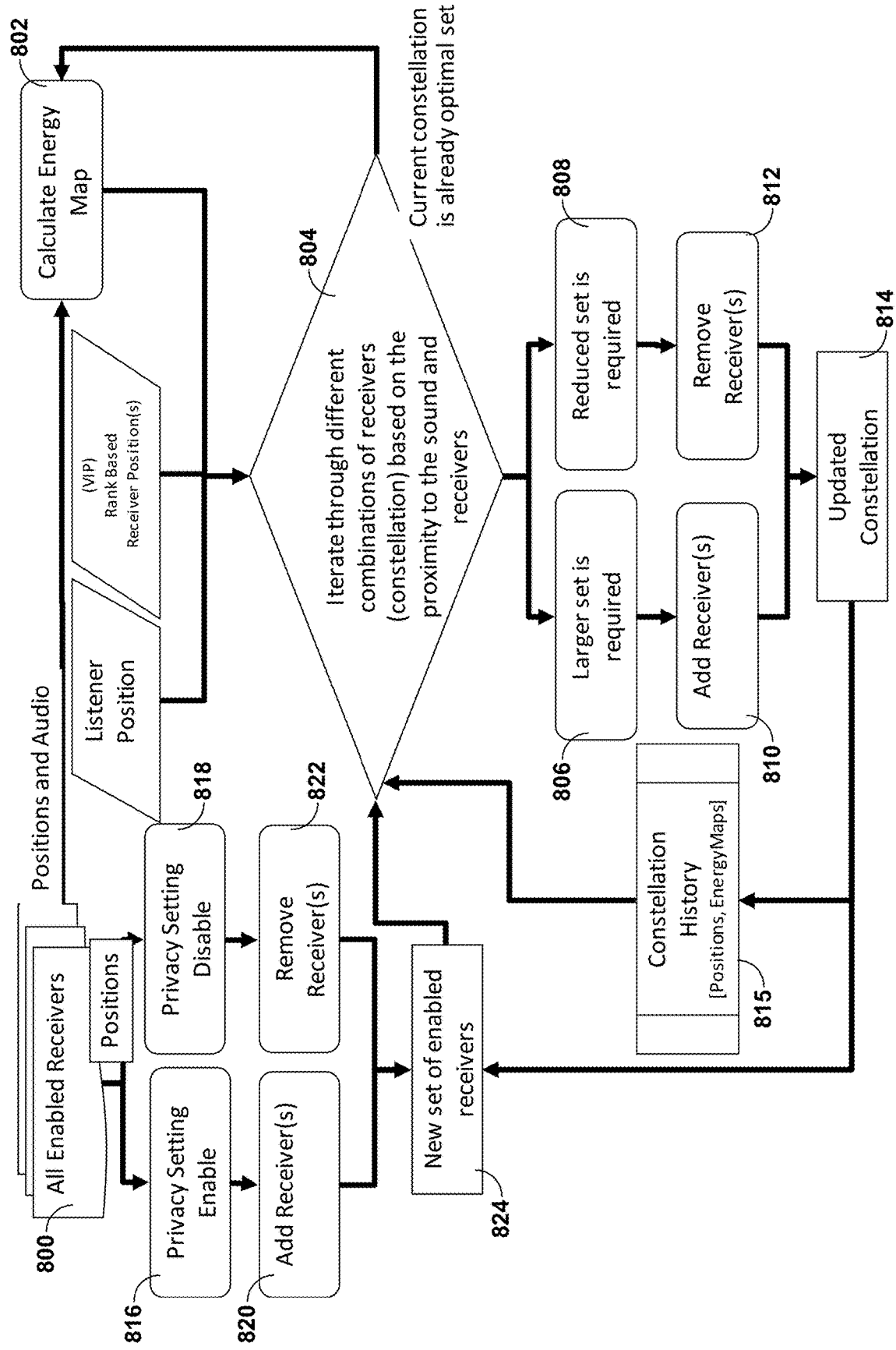
FIGS. 8A-8C are flowchart illustrating example operation of the stream selection unit shown in the examples of FIGS. 1A and 1B in performing various aspects of the stream selection techniques.
Figure 8B:
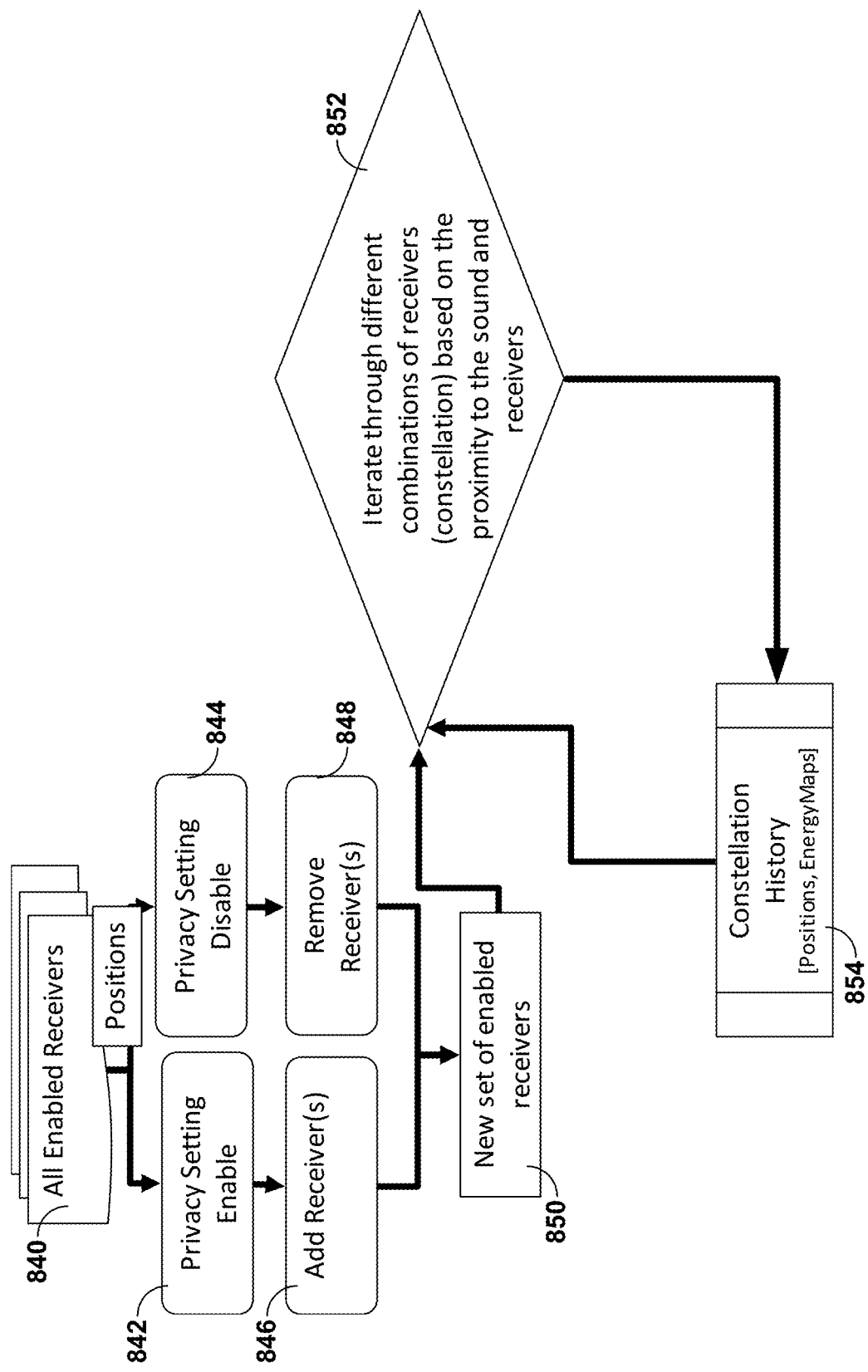
Figure 8C:
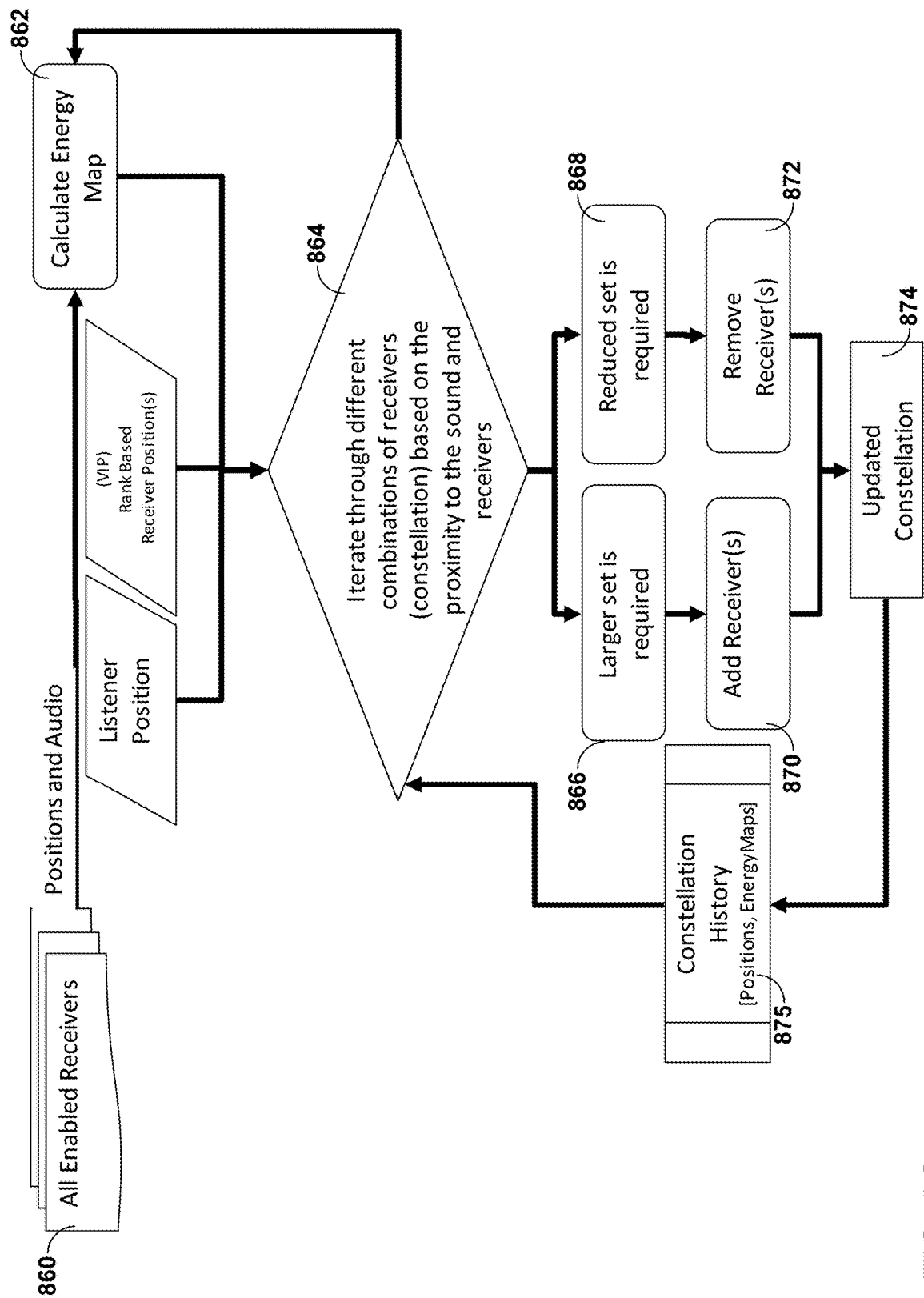

FIG. 8A-8C are flowcharts illustrating example operation of the stream selection unit shown in the examples of FIGS. 1A and 1B in performing various aspects of the stream selection techniques. Referring first to the example of FIG. 8A, the stream selection unit 44 may obtain audio stream 27 from all enabled receivers (which is another way to refer to microphones, such as the microphone 18), where the audio streams 27 may include corresponding audio metadata, such as the CLI 45A (800). The stream selection unit 44 may perform the energy analysis with respect to each of the audio streams 27 to calculate a respective energy map (802).

The stream selection unit 44 may next iterate through difference combinations of the receivers (defined in the CM 47) based on proximity to the audio source 308 (as defined by audio source distance 306A and/or 306B) and the receivers (as defined by the proximity distances discussed above) (804). As shown in FIG. 8A, the receivers may be ranked or otherwise associated with different access rights. The stream selection unit 44 may iterate, based on the listener position (which is another way to refer to the "virtual location") represented by the VLI 45B, and the receiver positions represented by the CLI 45A, in the manner described above to identify whether a larger subset of the audio streams 27 or a reduced subset of the audio streams 27 is required (806, 808).

When a larger subset of the audio streams 27 is required, the stream selection unit 44 may add receivers, or in other words, additional audio streams to the audio streams 19' (810). When a reduced subset of the audio streams 27 is required, the stream selection unit 44 may remove receivers or in other words existing audio stream from the audio streams 19' (812).

In some examples, the stream selection unit 44 may determine that the current constellation of receivers is an optimal set (or, in other words, that the existing audio streams 19' is to remain the same as the selection process described herein results in the same audio streams 19') (804). However, when audio streams are added or removed from the audio streams 19', the stream selection unit 44 may update the CM 47 (814), generating a constellation history (815).

In addition, the stream selection unit 44 may determine whether privacy settings enable or disable addition of the receivers (where the privacy settings may refer to digital access rights that limit access to one or more of the audio streams 27, e.g., by way of a password, an authorization level or rank, a time, etc.) (816, 818). When privacy settings enable addition of a receiver, the stream selection unit 44 may add receivers to the updated CM 47 (which refers to addition of audio streams to the audio streams 19') (820). When privacy settings disable addition of a receiver, the stream selection unit 44 may remove receivers from the updated CM 47 (which refers to removal of audio streams from the audio streams 19') (822). In this manner, the stream selection unit 44 may identify a new set of enabled receivers (824).

The stream selection unit 44 may iterate in this fashion and update various inputs according to any given frequency. For example, the stream selection unit 44 may update privacy settings at a user interface rate (meaning, updates are driven by way of updates entered via the user interface). The stream selection unit 44, as another example, may update positions at sensor rate (meaning that as positions are changed through movement of the receiver). The stream selection unit 44 may further update the energy maps at an audio frame rate (meaning that the energy maps are updated each frame).

Referring next to the example of FIG. 8B, the stream selection unit 44 may operate in the manner described above with respect to FIG. 8A, except the stream selection unit 44 may not base the determination of the CM 47 on energy maps. As such, the stream selection unit 44 may obtain audio stream 27 from all enabled receivers (which is another way to refer to microphones, such as the microphone 18), where the audio streams 27 may include corresponding audio metadata, such as the CLI 45A (840). The stream selection unit 44 may determine whether privacy settings enable or disable addition of the receivers (where the privacy settings may refer to digital access rights that limit access to one or more of the audio streams 27, e.g., by way of a password, an authorization level or rank, a time, etc.) (842, 844).

When privacy settings enable addition of a receiver, the stream selection unit 44 may add receivers to the updated CM 47 (which refers to addition of audio streams to the audio streams 19') (846). When privacy settings disable addition of a receiver, the stream selection unit 44 may remove receivers from the updated CM 47 (which refers to removal of audio streams from the audio streams 19') (848). In this manner, the stream selection unit 44 may identify a new set of enabled receivers (850). The stream selection unit 44 may iterate through the different combinations of receivers in the CM 47 to determine the constellation map history (854), which is representative of the audio streams 19'.

The stream selection unit 44 may iterate in this fashion and update various inputs according to any given frequency. For example, the stream selection unit 44 may update privacy settings at a user interface rate (meaning, updates are driven by way of updates entered via the user interface). The stream selection unit 44, as another example, may update positions at sensor rate (meaning that as positions are changed through movement of the receiver).

Referring next to the example of FIG. 8C, the stream selection unit 44 may operate in the manner described above with respect to FIG. 8A, except the stream selection unit 44 may not base the determination of the CM 47 enabled receivers. As such, the stream selection unit 44 may obtain audio stream 27 from all enabled receivers (which is another way to refer to microphones, such as the microphone 18), where the audio streams 27 may include corresponding audio metadata, such as the CLI 45A (860). The stream selection unit 44 may perform the energy analysis with respect to each of the audio streams 27 to calculate a respective energy map (862).

The stream selection unit 44 may next iterate through difference combinations of the receivers (defined in the CM 47) based on proximity to the audio source 308 (as defined by audio source distance 306A and/or 306B) and the receivers (as defined by the proximity distances discussed above) (864). As shown in FIG. 4C, the receivers may be ranked or otherwise associated with different access rights. The stream selection unit 44 may iterate, based on the listener position (which again is another way to refer to the "virtual location" discussed above) represented by the VLI 45B, and the receiver positions represented by the CLI 45A, in the manner described above to identify whether a larger subset of the audio streams 27 or a reduced subset of the audio streams 27 is required (866, 868).

When a larger subset of the audio streams 27 is required, the stream selection unit 44 may add receivers, or in other words, additional audio streams to the audio streams 19' (870). When a reduced subset of the audio streams 27 is required, the stream selection unit 44 may remove receivers or in other words existing audio stream from the audio streams 19' (872).

In some examples, the stream selection unit 44 may determine that the current constellation of receivers is an optimal set (or, in other words, that the existing audio streams 19' is to remain the same as the selection process described herein results in the same audio streams 19') (864). However, when audio streams are added or removed from the audio streams 19', the stream selection unit 44 may update the CM 47 (874), generating a constellation history (875).

The stream selection unit 44 may iterate in this fashion and update various inputs according to any given frequency. For example, the stream selection unit 44, as another example, may update positions at sensor rate (meaning that as positions are changed through movement of the receiver). The stream selection unit 44 may further update the energy maps at an audio frame rate (meaning that the energy maps are updated each frame).

Figure 9:
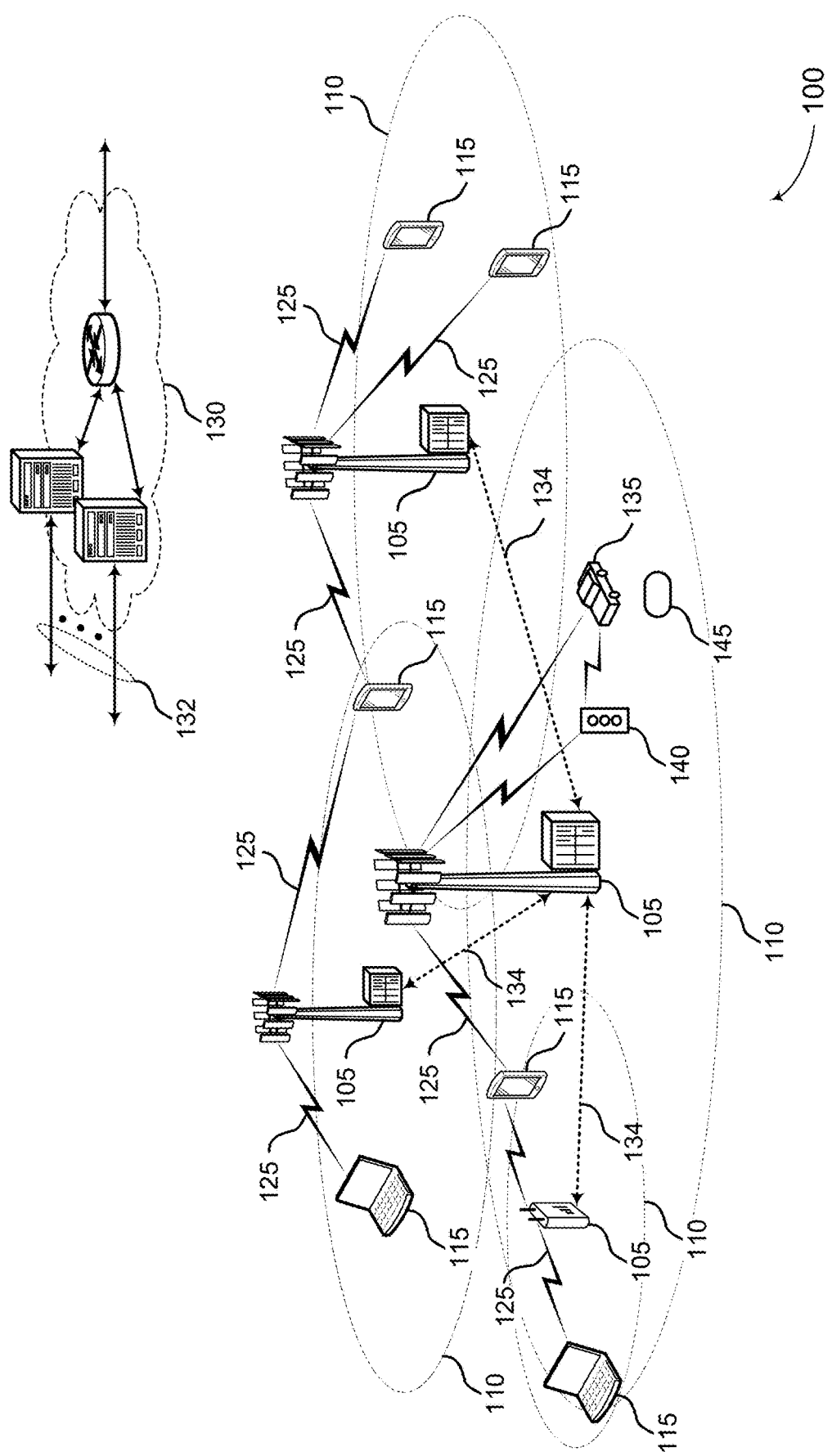
FIG. 9 illustrates an example of a wireless communications system that supports privacy restrictions in accordance with aspects of the present disclosure.

FIG. 9 illustrates an example of a wireless communications system 100 that supports privacy restrictions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, an synthesized audio stream may be an audio stream that that was stored in memory or was previously created or synthesized. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio metadata indicating privacy restrictions and/or password-based privacy data to toggle, mask, and/or null various audio streams and/or audio sources as will be described in more detail below.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105.

Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In this respect, various aspects of the techniques may enable the following clauses:

Clause 1A. A device configured to play one or more of a plurality of audio streams, the device comprising: a memory configured to store a plurality of audio streams, each of the plurality of audio streams representative of a soundfield and include one or more sub-streams; and one or more processors coupled to the memory, and configured to: determine, based on the plurality of audio streams, a total number of the one or more sub-streams for all of the plurality of audio streams; adapt, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio streams including a reduced total number of the one or more sub-streams that is equal to or less than the render threshold; apply the renderer to the adapted plurality of audio streams to obtain the one or more speaker feeds; and output the one or more speaker feeds to one or more speakers.

Clause 2A. The device of clause 1A, wherein the one or more processors are further configured to refrain, based on a user preset, from removing one or more of the plurality of audio streams when obtaining the adapted plurality of audio streams.

Clause 3A. The device of any combination of clauses 1A and 2A, wherein the audio stream includes audio metadata, the audio metadata including originating location information identifying an originating location from which the audio stream originates, and wherein the one or more processors are configured to adapt, based on the originating location information, the plurality of audio streams to decrease the total number of the one or more sub-streams and obtain the adapted plurality of audio streams.

Clause 4A. The device of any combination of clauses 1A-3A, wherein the one or more processors are configured to adapt, based on a type of audio data specified in the one or more sub-streams, the plurality of audio streams to decrease the total number of the one or more sub-streams and obtain the adapted plurality of audio streams.

Clause 5A. The device of clause 4A, wherein the type of audio data indicates that the audio data includes ambisonic audio data, and wherein the one or more processors are configured to perform order reduction with respect to the ambisonic audio data to obtain the adapted plurality of audio streams.

Clause 6A. The device of clause 4A, wherein the type of audio data indicates that the audio data includes channel-based audio data, and wherein the one or more processors are configured to perform downmixing with respect to the channel-based audio data to obtain the adapted plurality of audio streams.

Clause 7A. The device of any combination of clauses 1A-6A, wherein the one or more processors are configured to adapt, based on privacy settings, the plurality of audio streams to remove one or more of the plurality of audio streams and obtain the adapted plurality of audio streams.

Clause 8A. The device of any combination of clauses 1A-7A, wherein the one or more processors are further configured to apply an override to reduce the adapted plurality of audio streams such that the total number of sub-streams is below the render threshold and obtain a reduced plurality of audio streams.

Clause 9A. The device of any combination of clauses 1A-8A, wherein the adapted plurality of audio streams includes at least one audio stream representative of channel-based audio data, wherein the renderer comprises a six degrees of freedom renderer, and wherein the one or more processors are further configured to: obtain tracking information representative of movement of the device; and modify, based on the tracking information and prior to applying the six degrees of freedom renderer, the six degrees of freedom renderer to reflect the movement of the device.

Clause 10A. The device of any combination of clauses 1A-8A, wherein the adapted plurality of audio streams includes at least one audio stream representative of ambisonic audio data, wherein the renderer comprises a six degrees of freedom renderer, and wherein the one or more processors are further configured to: obtain tracking information representative of movement of the device; and modify, based on the tracking information and prior to applying the six degrees of freedom renderer, the six degrees of freedom renderer to reflect the movement of the device.

Clause 11A. The device of any combination of clauses 1A-10A, wherein the plurality of audio streams comprise a first plurality of vehicle to anything audio streams originating from other vehicles within a threshold vicinity of the device, and wherein the one or more processors are further configured to: obtain a second plurality of non-vehicle to anything audio streams representative of additional soundfields; render at least one of the second plurality of non-vehicle to anything audio streams to one or more additional speaker feeds; and output, the one or more speaker feeds and the one or more additional speakers feeds, to reproduce the one or more soundfields and one or more of the additional soundfields.

Clause 12A. The device of clause 11A, wherein the one or more processors are configured to obtain the second plurality of non-vehicle to anything audio streams in accordance with a dynamic adaptive streaming over hypertext transfer protocol (HTTP) (DASH) protocol.

Clause 13A. The device of any combination of clauses 11A and 12A, wherein the first plurality of vehicle to anything audio streams include a first plurality of cellular-vehicle to anything audio streams that conform to a cellular-vehicle to anything (C-V2X) protocol.

Clause 14A. The device of any combination of clauses 1A-13A, wherein the device comprises a mobile handset.

Clause 15A. The device of any combination of clauses 1A-13A, wherein the device comprises a vehicle headunit integrated into a vehicle.

Clause 16A. The device of any combination of clauses 1A-15A, wherein at least one of the one or more of the plurality of audio streams comprise ambisonic coefficients.

Clause 17A. The device of clause 16A, wherein the ambisonic coefficients comprise mixed order ambisonic coefficients.

Clause 18A. The device of clause 16A, wherein the ambisonic coefficients comprise first order ambisonic coefficients associated with a spherical basis function having an order of one or less.

Clause 19A. The device of clause 16A, wherein the ambisonic coefficients comprise ambisonic coefficients associated with a spherical basis function having an order greater than one.

Clause 20A. The device of any combination of clauses 1A-19A, wherein the one or more processors are further configured to: obtain a user audio stream representative of a soundfield in which the device resides; output, to a second device, the user audio stream.

Clause 21A. A method of playing one or more of a plurality of audio streams, the method comprising: storing, by one or more processors, a plurality of audio streams, each of the plurality of audio streams representative of a soundfield and include one or more sub-streams; determining, by the one or more processors and based on the plurality of audio streams, a total number of the one or more sub-streams for all of the plurality of audio streams; adapting, by the one or more processors and when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold; applying, by the one or more processors, the renderer to the adapted plurality of audio streams to obtain the one or more speaker feeds; and outputting, by the one or more processors, the one or more speaker feeds to one or more speakers.

Clause 22A. The method of clause 21A, further comprising refraining, based on a user preset, from removing one or more of the plurality of audio streams when obtaining the adapted plurality of audio streams.

Clause 23A. The method of any combination of clauses 21A and 22A, wherein the audio stream includes audio metadata, the audio metadata including originating location information identifying an originating location from which the audio stream originates, and wherein adapting the plurality of audio streams comprises adapting, based on the originating location information, the plurality of audio streams to decrease the total number of the one or more sub-streams and obtain the adapted plurality of audio streams.

Clause 24A. The method of any combination of clauses 21A-23A, wherein adapting the plurality of audio streams comprises adapting, based on a type of audio data specified in the one or more sub-streams, the plurality of audio streams to decrease the total number of the one or more sub-streams and obtain the adapted plurality of audio streams.

Clause 25A. The method of clause 24A, wherein the type of audio data indicates that the audio data includes ambisonic audio data, and wherein adapting the plurality of audio streams comprises performing order reduction with respect to the ambisonic audio data to obtain the adapted plurality of audio streams.

Clause 26A. The method of clause 24A, wherein the type of audio data indicates that the audio data includes channel-based audio data, and wherein adapting the plurality of audio streams comprises performing downmixing with respect to the channel-based audio data to obtain the adapted plurality of audio streams.

Clause 27A. The method of any combination of clauses 21A-26A, wherein adapting the plurality of audio streams comprises adapting, based on privacy settings, the plurality of audio streams to remove one or more of the plurality of audio streams and obtain the adapted plurality of audio streams.

Clause 28A. The method of any combination of clauses 21A-27A, further comprising applying an override to reduce the adapted plurality of audio streams such that the total number of sub-streams is below the render threshold and obtain a reduced plurality of audio streams.

Clause 29A. The method of any combination of clauses 21A-28A, wherein the adapted plurality of audio streams includes at least one audio stream representative of channel-based audio data, wherein the renderer comprises a six degrees of freedom renderer, and wherein the method further comprises: obtaining tracking information representative of movement of the device; and modifying, based on the tracking information and prior to applying the six degrees of freedom renderer, the six degrees of freedom renderer to reflect the movement of the device.

Clause 30A. The method of any combination of clauses 21A-28A, wherein the adapted plurality of audio streams includes at least one audio stream representative of ambisonic audio data, wherein the renderer comprises a six degrees of freedom renderer, and wherein the method further comprises: obtaining tracking information representative of movement of the device; and modifying, based on the tracking information and prior to applying the six degrees of freedom renderer, the six degrees of freedom renderer to reflect the movement of the device.

Clause 31A. The method of any combination of clauses 21A-30A, wherein the plurality of audio streams comprise a first plurality of vehicle to anything audio streams originating from other vehicles within a threshold vicinity of the device, and wherein the method further comprises: obtaining a second plurality of non-vehicle to anything audio streams representative of additional soundfields; rendering at least one of the second plurality of non-vehicle to anything audio streams to one or more additional speaker feeds; and outputting, the one or more speaker feeds and the one or more additional speakers feeds, to reproduce the one or more soundfields and one or more of the additional soundfields.

Clause 32A. The method of clause 31A, wherein obtaining the second plurality of non-vehicle to anything audio streams comprises obtaining the second plurality of non-vehicle to anything audio streams in accordance with a dynamic adaptive streaming over hypertext transfer protocol (HTTP) (DASH) protocol.

Clause 33A. The method of any combination of clauses 31A and 32A, wherein the first plurality of vehicle to anything audio streams include a first plurality of cellular-vehicle to anything audio streams that conform to a cellular-vehicle to anything (C-V2X) protocol.

Clause 34A. The method of any combination of clauses 21A-33A, wherein the method is performed by a mobile handset.

Clause 35A. The method of any combination of clauses 21A-33A, wherein the method is performed by a vehicle headunit integrated into a vehicle.

Clause 36A. The method of any combination of clauses 21A-35A, wherein at least one of the one or more of the plurality of audio streams comprise ambisonic coefficients.

Clause 37A. The method of clause 36A, wherein the ambisonic coefficients comprise mixed order ambisonic coefficients.

Clause 38A. The method of clause 36A, wherein the ambisonic coefficients comprise first order ambisonic coefficients associated with a spherical basis function having an order of one or less.

Clause 39A. The method of clause 36A, wherein the ambisonic coefficients comprise ambisonic coefficients associated with a spherical basis function having an order greater than one.

Clause 40A. The method of any combination of clauses 21A-39A, further comprising: obtaining a user audio stream representative of a soundfield in which the device resides; and outputting, to a second device, the user audio stream.

Clause 41A. A device configured to play one or more of a plurality of audio streams, the device comprising: means for storing a plurality of audio streams, each of the plurality of audio streams representative of a soundfield and include one or more sub-streams; means for determining, based on the plurality of audio streams, a total number of the one or more sub-streams for all of the plurality of audio streams; means for adapting, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold; means for applying the renderer to the adapted plurality of audio streams to obtain the one or more speaker feeds; and means for outputting the one or more speaker feeds to one or more speakers.

Clause 42A. The device of clause 41A, further comprising means for refraining, based on a user preset, from removing one or more of the plurality of audio streams when obtaining the adapted plurality of audio streams.

Clause 43A. The device of any combination of clauses 41A and 42A, wherein the audio stream includes audio metadata, the audio metadata including originating location information identifying an originating location from which the audio stream originates, and wherein the means for adapting the plurality of audio streams comprises means for adapting, based on the originating location information, the plurality of audio streams to decrease the total number of the one or more sub-streams and obtain the adapted plurality of audio streams.

Clause 44A. The device of any combination of clauses 41A-43A, wherein the means for adapting the plurality of audio streams comprises means for adapting, based on a type of audio data specified in the one or more sub-streams, the plurality of audio streams to decrease the total number of the one or more sub-streams and obtain the adapted plurality of audio streams.

Clause 45A. The device of clause 44A, wherein the type of audio data indicates that the audio data includes ambisonic audio data, and wherein the means for adapting the plurality of audio streams comprises means for performing order reduction with respect to the ambisonic audio data to obtain the adapted plurality of audio streams.

Clause 46A. The device of clause 44A, wherein the type of audio data indicates that the audio data includes channel-based audio data, and wherein the means for adapting the plurality of audio streams comprises means for performing downmixing with respect to the channel-based audio data to obtain the adapted plurality of audio streams.

Clause 47A. The device of any combination of clauses 41A-46A, wherein the means for adapting the plurality of audio streams comprises means for adapting, based on privacy settings, the plurality of audio streams to remove one or more of the plurality of audio streams and obtain the adapted plurality of audio streams.

Clause 48A. The device of any combination of clauses 41A-47A, further comprising means for applying an override to reduce the adapted plurality of audio streams such that the total number of sub-streams is below the render threshold and obtain a reduced plurality of audio streams.

Clause 49A. The device of any combination of clauses 41A-48A, wherein the adapted plurality of audio streams includes at least one audio stream representative of channel-based audio data, wherein the renderer comprises a six degrees of freedom renderer, and wherein the device further comprises: means for obtaining tracking information representative of movement of the device; and means for modifying, based on the tracking information and prior to applying the six degrees of freedom renderer, the six degrees of freedom renderer to reflect the movement of the device.

Clause 50A. The device of any combination of clauses 41A-48A, wherein the adapted plurality of audio streams includes at least one audio stream representative of ambisonic audio data, wherein the renderer comprises a six degrees of freedom renderer, and wherein the device further comprises: means for obtaining tracking information representative of movement of the device; and means for modifying, based on the tracking information and prior to applying the six degrees of freedom renderer, the six degrees of freedom renderer to reflect the movement of the device.

Clause 51A. The device of any combination of clauses 41A-50A, wherein the plurality of audio streams comprise a first plurality of vehicle to anything audio streams originating from other vehicles within a threshold vicinity of the device, and wherein the device further comprises: means for obtaining a second plurality of non-vehicle to anything audio streams representative of additional soundfields; means for rendering at least one of the second plurality of non-vehicle to anything audio streams to one or more additional speaker feeds; and means for outputting, the one or more speaker feeds and the one or more additional speakers feeds, to reproduce the one or more soundfields and one or more of the additional soundfields.

Clause 52A. The device of clauses 51A, wherein the means for obtaining the second plurality of non-vehicle to anything audio streams comprises means for obtaining the second plurality of non-vehicle to anything audio streams in accordance with a dynamic adaptive streaming over hypertext transfer protocol (HTTP) (DASH) protocol.

Clause 53A. The device of any combination of clauses 51A and 52A, wherein the first plurality of vehicle to anything audio streams include a first plurality of cellular-vehicle to anything audio streams that conform to a cellular-vehicle to anything (C-V2X) protocol.

Clause 54A. The device of any combination of clauses 41A-53A, wherein the device comprises a mobile handset.

Clause 55A. The device of any combination of clauses 41A-53A, wherein the device comprises a vehicle headunit integrated into a vehicle.

Clause 56A. The device of any combination of clauses 41A-55A, wherein at least one of the one or more of the plurality of audio streams comprise ambisonic coefficients.

Clause 57A. The device of clause 56A, wherein the ambisonic coefficients comprise mixed order ambisonic coefficients.

Clause 58A. The device of clause 56A, wherein the ambisonic coefficients comprise first order ambisonic coefficients associated with a spherical basis function having an order of one or less.

Clause 59A. The device of clause 56A, wherein the ambisonic coefficients comprise ambisonic coefficients associated with a spherical basis function having an order greater than one.

Clause 60A. The device of any combination of clauses 41A-59A, further comprising: means for obtaining a user audio stream representative of a soundfield in which the device resides; means for outputting, to a second device, the user audio stream.

Clause 61A. A non-transitory computer-readable storage medium having stored thereon instructions that, when executed, cause one or more processors to: store a plurality of audio streams, each of the plurality of audio streams representative of a soundfield and include one or more sub-streams; determine, based on the plurality of audio streams, a total number of the one or more sub-streams for all of the plurality of audio streams; adapt, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold; apply the renderer to the adapted plurality of audio streams to obtain the one or more speaker feeds; and output the one or more speaker feeds to one or more speakers.

Clause 1B. A device configured to play one or more of a plurality of audio streams, the device comprising: a memory configured to store the plurality of audio streams and corresponding audio metadata, each of the plurality of audio streams representative of a soundfield, and the audio metadata includes origination coordinates at which each of the corresponding one of the plurality of audio streams originates; and one or more processors coupled to the memory, and configured to: determine, based on current coordinates of the device relative to the origination coordinates corresponding to one or more of the plurality of audio streams, a direction of arrival for each of the one or more of the plurality of audio streams; render, based on each of the directions of arrival, each of the one or more of the plurality of audio streams to one or more speaker feeds that spatialize the one or more of the plurality of audio streams to appear to arrive from each of the directions of arrival; and output the one or more speaker feeds to reproduce one or more of the soundfields represented by the one or more of the plurality of audio streams.

Clause 2B. The device of clause 1B, wherein the audio metadata further includes privacy restrictions for one or more of the plurality of audio streams, and wherein the one or more processors are further configured to determine, based on the privacy restrictions, the one or more of the plurality of audio streams.

Clause 3B. The device of clause 2B, wherein the one or more processors are further configured to: determine one or more restricted audio streams from the audio metadata based on the privacy restrictions; and not render the speaker feeds from the one or more restricted audio streams.

Clause 4B. The device of any combination of clauses 2B and 3B, wherein the privacy restrictions indicate whether one or more of the plurality of audio streams are restricted or unrestricted.

Clause 5B. The device of any combination of clauses 1B-4B, wherein the device is in communication with a vehicle, the vehicle including one or more speakers that reproduce, based on the speaker feeds, the one or more of the soundfields represented by the one or more of the plurality of audio streams.

Clause 6B. The device of clause 5B, wherein the vehicle comprises a first vehicle, and wherein the one or more of the plurality of audio streams include at least one audio stream specifying spoken words from an occupant of a second vehicle.

Clause 7B. The device of clause 6B, wherein the first vehicle comprises an autonomous vehicle that autonomously adjusts, based on the spoken words, operation of the autonomous vehicle.

Clause 8B. The device of any combination of clauses 6B and 7B, wherein the second vehicle comprises one of a bicycle, a motorcycle, and a scooter.

Clause 9B. The device of clause 7B, wherein the autonomous vehicle includes at least one speaker configured to output audible commands to the second vehicle.

Clause 10B. The device of any combination of clauses 1B-9B, wherein the plurality of audio streams comprise a first plurality of vehicle to anything audio streams originating from other vehicles within a threshold vicinity of the device, and wherein the one or more processors are further configured to: obtain a second plurality of non-vehicle to anything audio streams representative of additional soundfields; render at least one of the second plurality of non-vehicle to anything audio streams to one or more additional speaker feeds; and output, the one or more speaker feeds and the one or more additional speakers feeds, to reproduce the one or more soundfields and one or more of the additional soundfields.

Clause 11B. The device of clause 10B, wherein the one or more processors are configured to obtain the second plurality of non-vehicle to anything audio streams in accordance with a dynamic adaptive streaming over hypertext transfer protocol (HTTP) (DASH) protocol.

Clause 12B. The device of any combination of clauses 10B and 11B, wherein the first plurality of vehicle to anything audio streams include a first plurality of cellular-vehicle to anything audio streams that conform to a cellular-vehicle to anything (C-V2X) protocol.

Clause 13B. The device of any combination of clauses 1B-12B, wherein the device comprises a mobile handset.

Clause 14B. The device of any combination of clauses 1B-6B, wherein the device comprises a vehicle headunit integrated into a vehicle.

Clause 15B. The device of any combination of clauses 1B-14B, wherein at least one of the one or more of the plurality of audio streams comprise ambisonic coefficients.

Clause 16B. The device of clause 15B, wherein the ambisonic coefficients comprise mixed order ambisonic coefficients.

Clause 17B. The device of clause 15B, wherein the ambisonic coefficients comprise first order ambisonic coefficients associated with a spherical basis function having an order of one or less.

Clause 18B. The device of clause 15B, wherein the ambisonic coefficients comprise ambisonic coefficients associated with a spherical basis function having an order greater than one.

Clause 19B. The device of any combination of clauses 1B-18B, wherein the one or more processors are further configured to: obtain a user audio stream representative of a soundfield in which the device resides; and output, to a second device, the user audio stream.

Clause 20B. The device of clause 19B, wherein the device comprises a first device in communication with a first vehicle, wherein the second device comprises a second device in communication with a second vehicle, and wherein the user audio stream comprises spoken words of a user of the first device.

Clause 21B. The device of clause 20B, wherein the spoken words represent commands specifying a course of action of the user in operating the first device.

Clause 22B. The device of any combination of clauses 1B-21B, wherein the capture location of at least one of the one or more of the plurality of audio streams indicates that the at least one of the one or more of the plurality of audio streams is to be located in a passenger seat of a vehicle with which the device is in communication.

Clause 23B. The device of any combination of clauses 1B-22B, further comprising a receiver configured to receive the plurality of audio streams.

Clause 24B. The device of clause 23B, wherein the receiver includes a receiver configured to receive the plurality of audio streams in accordance with a fifth generation (5G) cellular standard.

Clause 25B. The device of clause 23B, wherein the receiver includes a receiver configured to receive the plurality of audio streams in accordance with a personal area network standard.

Clause 26B. The device of any combination of clauses 1B-25B, wherein the device comprises one or more speakers configured to reproduce, based on the speaker feeds, the one or more of the one or more soundfields represented by the one or more of the plurality of the audio streams.

Clause 27B. A method of playing one or more of a plurality of audio streams, the device comprising: storing, by a memory, the plurality of audio streams and corresponding audio metadata, each of the plurality of audio streams representative of a soundfield, and the audio metadata includes origination coordinates at which each of the corresponding one of the plurality of audio streams originates; and determining, by one or more processors and based on current coordinates of the device relative to the origination coordinates corresponding to one or more of the plurality of audio streams, a direction of arrival for each of the one or more of the plurality of audio streams; rendering, by the one or more processors and based on each of the directions of arrival, each of the one or more of the plurality of audio streams to one or more speaker feeds that spatialize the one or more of the plurality of audio streams to appear to arrive from each of the directions of arrival; and outputting, by the one or more processors, the one or more speaker feeds to reproduce one or more of the soundfields represented by the one or more of the plurality of audio streams.

Clause 28B. The method of clause 27B, wherein the audio metadata further includes privacy restrictions for one or more of the plurality of audio streams, and wherein the device further comprises determining, based on the privacy restrictions, the one or more of the plurality of audio streams.

Clause 29B. The method of clause 28B, further comprising: determining one or more restricted audio streams from the audio metadata based on the privacy restrictions; and not rendering the speaker feeds from the one or more restricted audio streams.

Clause 30B. The method of any combination of clauses 28B and 29B, wherein the privacy restrictions indicate whether one or more of the plurality of audio streams are restricted or unrestricted.

Clause 31B. The method of any combination of clauses 27B-30B, wherein the method is performed by a device, and wherein the device is in communication with a vehicle, the vehicle including one or more speakers that reproduce, based on the speaker feeds, the one or more of the soundfields represented by the one or more of the plurality of audio streams.

Clause 32B. The method of clause 31B, wherein the vehicle comprises a first vehicle, and wherein the one or more of the plurality of audio streams include at least one audio stream specifying spoken words from an occupant of a second vehicle.

Clause 33B. The method of clause 32B, wherein the first vehicle comprises an autonomous vehicle that autonomously adjusts, based on the spoken words, operation of the autonomous vehicle.

Clause 34B. The method of any combination of clauses 32B and 33B, wherein the second vehicle comprises one of a bicycle, a motorcycle, and a scooter.

Clause 35B. The method of clause 33B, wherein the autonomous vehicle includes at least one speaker configured to output audible commands to the second vehicle.

Clause 36B. The method of any combination of clauses 27B-35B, wherein the plurality of audio streams comprise a first plurality of vehicle to anything audio streams originating from other vehicles within a threshold vicinity of the device, and wherein the method further comprises: obtaining a second plurality of non-vehicle to anything audio streams representative of additional soundfields; rendering at least one of the second plurality of non-vehicle to anything audio streams to one or more additional speaker feeds; and outputting, the one or more speaker feeds and the one or more additional speakers feeds, to reproduce the one or more soundfields and one or more of the additional soundfields.

Clause 37B. The method of clause 36B, wherein obtaining the second plurality of non-vehicle to anything audio streams comprises obtaining the second plurality of non-vehicle to anything audio streams in accordance with a dynamic adaptive streaming over hypertext transfer protocol (HTTP) (DASH) protocol.

Clause 38B. The method of any combination of clauses 36B and 37B, wherein the first plurality of vehicle to anything audio streams include a first plurality of cellular-vehicle to anything audio streams that conform to a cellular-vehicle to anything (C-V2X) protocol.

Clause 39B. The method of any combination of clauses 27B-38B, wherein the device comprises a mobile handset.

Clause 40B. The method of any combination of clauses 27B-32B, wherein the device comprises a vehicle headunit integrated into a vehicle.

Clause 41B. The method of any combination of clauses 27B-40B, wherein at least one of the one or more of the plurality of audio streams comprise ambisonic coefficients.

Clause 42B. The method of clause 41B, wherein the ambisonic coefficients comprise mixed order ambisonic coefficients.

Clause 43B. The method of clause 41B, wherein the ambisonic coefficients comprise first order ambisonic coefficients associated with a spherical basis function having an order of one or less.

Clause 44B. The method of clause 41B, wherein the ambisonic coefficients comprise ambisonic coefficients associated with a spherical basis function having an order greater than one.

Clause 45B. The method of any combination of clauses 27B-44B, further comprising: obtaining a user audio stream representative of a soundfield in which the device resides; and outputting, to a second device, the user audio stream.

Clause 46B. The method of clause 45B, wherein the device comprises a first device in communication with a first vehicle, wherein the second device comprises a second device in communication with a second vehicle, and wherein the user audio stream comprises spoken words of a user of the first device.

Clause 47B. The method of clause 46B, wherein the spoken words represent commands specifying a course of action of the user in operating the first device.

Clause 48B. The method of any combination of clauses 27B-47B, wherein the capture location of at least one of the one or more of the plurality of audio streams indicates that the at least one of the one or more of the plurality of audio streams is to be located in a passenger seat of a vehicle with which the device is in communication.

Clause 49B. The method of any combination of clauses 27B-48B, further comprising receiving the plurality of audio streams.

Clause 50B. The method of clause 49B, wherein receiving the plurality of audio streams comprises receiving the plurality of audio streams in accordance with a fifth generation (5G) cellular standard.

Clause 51B. The method of clause 49B, wherein receiving the plurality of audio streams comprises receiving the plurality of audio streams in accordance with a personal area network standard.

Clause 52B. The method of any combination of clauses 27B-51B, further comprising reproducing, based on the speaker feeds, the one or more of the one or more soundfields represented by the one or more of the plurality of the audio streams.

Clause 53B. A device configured to play one or more of a plurality of audio streams, the device comprising: means for storing the plurality of audio streams and corresponding audio metadata, each of the plurality of audio streams representative of a soundfield, and the audio metadata includes origination coordinates at which each of the corresponding one of the plurality of audio streams originates; and means for determining, based on current coordinates of the device relative to the origination coordinates corresponding to one or more of the plurality of audio streams, a direction of arrival for each of the one or more of the plurality of audio streams; means for rendering, based on each of the directions of arrival, each of the one or more of the plurality of audio streams to one or more speaker feeds that spatialize the one or more of the plurality of audio streams to appear to arrive from each of the directions of arrival; and means for outputting the one or more speaker feeds to reproduce one or more of the soundfields represented by the one or more of the plurality of audio streams.

Clause 54B. The device of clause 53B, wherein the audio metadata further includes privacy restrictions for one or more of the plurality of audio streams, and wherein the device further comprises means for determining, based on the privacy restrictions, the one or more of the plurality of audio streams.

Clause 55B. The device of clause 54B, further comprising: means for determining one or more restricted audio streams from the audio metadata based on the privacy restrictions; and means for not rendering the speaker feeds from the one or more restricted audio streams.

Clause 56B. The device of any combination of clauses 54B and 55B, wherein the privacy restrictions indicate whether one or more of the plurality of audio streams are restricted or unrestricted.

Clause 57B. The device of any combination of clauses 53B-56B, wherein the device is in communication with a vehicle, the vehicle including one or more speakers that reproduce, based on the speaker feeds, the one or more of the soundfields represented by the one or more of the plurality of audio streams.

Clause 58B. The device of clause 57B, wherein the vehicle comprises a first vehicle, and wherein the one or more of the plurality of audio streams include at least one audio stream specifying spoken words from an occupant of a second vehicle.

Clause 59B. The device of clause 58B, wherein the first vehicle comprises an autonomous vehicle that autonomously adjusts, based on the spoken words, operation of the autonomous vehicle.

Clause 60B. The device of any combination of clauses 58B and 59B, wherein the second vehicle comprises one of a bicycle, a motorcycle, and a scooter.

Clause 61B. The device of clause 59B, wherein the autonomous vehicle includes at least one speaker configured to output audible commands to the second vehicle.

Clause 62B. The device of any combination of clauses 53B-61B, wherein the plurality of audio streams comprise a first plurality of vehicle to anything audio streams originating from other vehicles within a threshold vicinity of the device, and wherein the device further comprises: means for obtaining a second plurality of non-vehicle to anything audio streams representative of additional soundfields; means for rendering at least one of the second plurality of non-vehicle to anything audio streams to one or more additional speaker feeds; and means for outputting, the one or more speaker feeds and the one or more additional speakers feeds, to reproduce the one or more soundfields and one or more of the additional soundfields.

Clause 63B. The device of clause 62B, wherein the means for obtaining the second plurality of non-vehicle to anything audio streams comprises means for obtaining the second plurality of non-vehicle to anything audio streams in accordance with a dynamic adaptive streaming over hypertext transfer protocol (HTTP) (DASH) protocol.

Clause 64B. The device of any combination of clauses 62B and 63B, wherein the first plurality of vehicle to anything audio streams include a first plurality of cellular-vehicle to anything audio streams that conform to a cellular-vehicle to anything (C-V2X) protocol.

Clause 65B. The device of any combination of clauses 53B-64B, wherein the device comprises a mobile handset.

Clause 66B. The device of any combination of clauses 53B-58B, wherein the device comprises a vehicle headunit integrated into a vehicle.

Clause 67B. The device of any combination of clauses 53B-66B, wherein at least one of the one or more of the plurality of audio streams comprise ambisonic coefficients.

Clause 68B. The device of clause 67B, wherein the ambisonic coefficients comprise mixed order ambisonic coefficients.

Clause 69B. The device of clause 67B, wherein the ambisonic coefficients comprise first order ambisonic coefficients associated with a spherical basis function having an order of one or less.

Clause 70B. The device of clause 67B, wherein the ambisonic coefficients comprise ambisonic coefficients associated with a spherical basis function having an order greater than one.

Clause 71B. The device of any combination of clauses 53B-70B, further comprising: means for obtaining a user audio stream representative of a soundfield in which the device resides; and means for outputting, to a second device, the user audio stream.

Clause 72B. The device of clause 71B, wherein the device comprises a first device in communication with a first vehicle, wherein the second device comprises a second device in communication with a second vehicle, and wherein the user audio stream comprises spoken words of a user of the first device.

Clause 73B. The device of clause 72B, wherein the spoken words represent commands specifying a course of action of the user in operating the first device.

Clause 74B. The device of any combination of clauses 53B-73B, wherein the capture location of at least one of the one or more of the plurality of audio streams indicates that the at least one of the one or more of the plurality of audio streams is to be located in a passenger seat of a vehicle with which the device is in communication.

Clause 75B. The device of any combination of clauses 53B-74B, further comprising means for receiving the plurality of audio streams.

Clause 76B. The device of clause 75B, wherein the means for receiving the plurality of audio streams comprises means for receiving the plurality of audio streams in accordance with a fifth generation (5G) cellular standard.

Clause 77B. The device of clause 75B, wherein the means for receiving the plurality of audio streams comprises means for receiving the plurality of audio streams in accordance with a personal area network standard.

Clause 78B. The device of any combination of clauses 53B-77B, further comprising means for reproducing, based on the speaker feeds, the one or more of the one or more soundfields represented by the one or more of the plurality of the audio streams.

Clause 79B. A non-transitory computer-readable storage medium having stored thereon instructions that, when executed, cause one or more processors to: store a plurality of audio streams and corresponding audio metadata, each of the plurality of audio streams representative of a soundfield, and the audio metadata includes origination coordinates at which each of the corresponding one of the plurality of audio streams originates; and determine, based on current coordinates of the device relative to the origination coordinates corresponding to one or more of the plurality of audio streams, a direction of arrival for each of the one or more of the plurality of audio streams; render, based on each of the directions of arrival, each of the one or more of the plurality of audio streams to one or more speaker feeds that spatialize the one or more of the plurality of audio streams to appear to arrive from each of the directions of arrival; and output the one or more speaker feeds to reproduce one or more of the soundfields represented by the one or more of the plurality of audio streams.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to play one or more of a plurality of audio streams, the device comprising:
a memory configured to store a plurality of audio streams, each of the plurality of audio streams representative of a soundfield and include one or more sub-streams; and
one or more processors coupled to the memory, and configured to:
determine, based on the plurality of audio streams, a total number of the one or more sub-streams for all of the plurality of audio streams;
adapt, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio streams including a reduced total number of the one or more sub-streams that is equal to or less than the render threshold;
apply the renderer to the adapted plurality of audio streams to obtain the one or more speaker feeds; and
output the one or more speaker feeds to one or more speakers.

2. The device of claim 1, wherein the one or more processors are further configured to refrain, based on a user preset, from removing one or more of the plurality of audio streams when obtaining the adapted plurality of audio streams.

3. The device of claim 1,
wherein the audio stream includes audio metadata, the audio metadata including originating location information identifying an originating location from which the audio stream originates, and
wherein the one or more processors are configured to adapt, based on the originating location information, the plurality of audio streams to decrease the total number of the one or more sub-streams and obtain the adapted plurality of audio streams.

4. The device of claim 1, wherein the one or more processors are configured to adapt, based on a type of audio data specified in the one or more sub-streams, the plurality of audio streams to decrease the total number of the one or more sub-streams and obtain the adapted plurality of audio streams.

5. The device of claim 4,
wherein the type of audio data indicates that the audio data includes ambisonic audio data, and
wherein the one or more processors are configured to perform order reduction with respect to the ambisonic audio data to obtain the adapted plurality of audio streams.

6. The device of claim 4,
wherein the type of audio data indicates that the audio data includes channel-based audio data, and
wherein the one or more processors are configured to perform downmixing with respect to the channel-based audio data to obtain the adapted plurality of audio streams.

7. The device of claim 1, wherein the one or more processors are configured to adapt, based on privacy settings, the plurality of audio streams to remove one or more of the plurality of audio streams and obtain the adapted plurality of audio streams.

8. The device of claim 1, wherein the one or more processors are further configured to apply an override to reduce the adapted plurality of audio streams such that the total number of sub-streams is below the render threshold and obtain a reduced plurality of audio streams.

9. The device of claim 1,
wherein the adapted plurality of audio streams includes at least one audio stream representative of channel-based audio data,
wherein the renderer comprises a six degrees of freedom renderer, and wherein the one or more processors are further configured to:
obtain tracking information representative of movement of the device; and
modify, based on the tracking information and prior to applying the six degrees of freedom renderer, the six degrees of freedom renderer to reflect the movement of the device.

10. The device of claim 1,
wherein the adapted plurality of audio streams includes at least one audio stream representative of ambisonic audio data,
wherein the renderer comprises a six degrees of freedom renderer, and
wherein the one or more processors are further configured to:
obtain tracking information representative of movement of the device; and
modify, based on the tracking information and prior to applying the six degrees of freedom renderer, the six degrees of freedom renderer to reflect the movement of the device.

11. The device of claim 1,
wherein the plurality of audio streams comprise a first plurality of vehicle to anything audio streams originating from other vehicles within a threshold vicinity of the device, and
wherein the one or more processors are further configured to:
obtain a second plurality of non-vehicle to anything audio streams representative of additional soundfields;
render at least one of the second plurality of non-vehicle to anything audio streams to one or more additional speaker feeds; and
output, the one or more speaker feeds and the one or more additional speakers feeds, to reproduce the one or more soundfields and one or more of the additional soundfields.

12. The device of claim 11, wherein the one or more processors are configured to obtain the second plurality of non-vehicle to anything audio streams in accordance with a dynamic adaptive streaming over hypertext transfer protocol (HTTP) (DASH) protocol.

13. The device of claim 11, wherein the first plurality of vehicle to anything audio streams include a first plurality of cellular-vehicle to anything audio streams that conform to a cellular-vehicle to anything (C-V2X) protocol.

14. The device of claim 1, wherein the device comprises a mobile handset.

15. The device of claim 1, wherein the device comprises a vehicle headunit integrated into a vehicle.

16. The device of claim 1, wherein at least one of the one or more of the plurality of audio streams comprise ambisonic coefficients.

17. The device of claim 16, wherein the ambisonic coefficients comprise mixed order ambisonic coefficients.

18. The device of claim 16, wherein the ambisonic coefficients comprise first order ambisonic coefficients associated with a spherical basis function having an order of one or less.

19. The device of claim 16, wherein the ambisonic coefficients comprise ambisonic coefficients associated with a spherical basis function having an order greater than one.

20. The device of claim 1, wherein the one or more processors are further configured to:
obtain a user audio stream representative of a soundfield in which the device resides;
output, to a second device, the user audio stream.

21. A method of playing one or more of a plurality of audio streams, the method comprising:
storing, by one or more processors, a plurality of audio streams, each of the plurality of audio streams representative of a soundfield and include one or more sub-streams;
determining, by the one or more processors and based on the plurality of audio streams, a total number of the one or more sub-streams for all of the plurality of audio streams;
adapting, by the one or more processors and when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold;
applying, by the one or more processors, the renderer to the adapted plurality of audio streams to obtain the one or more speaker feeds; and
outputting, by the one or more processors, the one or more speaker feeds to one or more speakers.

22. The method of claim 21, further comprising refraining, based on a user preset, from removing one or more of the plurality of audio streams when obtaining the adapted plurality of audio streams.

23. The method of claim 21,
wherein the audio stream includes audio metadata, the audio metadata including originating location information identifying an originating location from which the audio stream originates, and
wherein adapting the plurality of audio streams comprises adapting, based on the originating location information, the plurality of audio streams to decrease the total number of the one or more sub-streams and obtain the adapted plurality of audio streams.

24. The method of claim 21, wherein adapting the plurality of audio streams comprises adapting, based on a type of audio data specified in the one or more sub-streams, the plurality of audio streams to decrease the total number of the one or more sub-streams and obtain the adapted plurality of audio streams.

25. The method of claim 24,
wherein the type of audio data indicates that the audio data includes ambisonic audio data, and
wherein adapting the plurality of audio streams comprises performing order reduction with respect to the ambisonic audio data to obtain the adapted plurality of audio streams.

26. The method of claim 24,
wherein the type of audio data indicates that the audio data includes channel-based audio data, and
wherein adapting the plurality of audio streams comprises performing downmixing with respect to the channel-based audio data to obtain the adapted plurality of audio streams.

27. The method of claim 21, wherein adapting the plurality of audio streams comprises adapting, based on privacy settings, the plurality of audio streams to remove one or more of the plurality of audio streams and obtain the adapted plurality of audio streams.

28. The method of claim 21, further comprising applying an override to reduce the adapted plurality of audio streams such that the total number of sub-streams is below the render threshold and obtain a reduced plurality of audio streams.

29. A device configured to play one or more of a plurality of audio streams, the device comprising:
- means for storing a plurality of audio streams, each of the plurality of audio streams representative of a soundfield and include one or more sub-streams;
- means for determining, based on the plurality of audio streams, a total number of the one or more sub-streams for all of the plurality of audio streams;
- means for adapting, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold;
- means for applying the renderer to the adapted plurality of audio streams to obtain the one or more speaker feeds; and
- means for outputting the one or more speaker feeds to one or more speakers.

30. A non-transitory computer-readable storage medium having stored thereon instructions that, when executed, cause one or more processors to:
- store a plurality of audio streams, each of the plurality of audio streams representative of a soundfield and include one or more sub-streams;
- determine, based on the plurality of audio streams, a total number of the one or more sub-streams for all of the plurality of audio streams;
- adapt, when the total number of the one or more sub-streams is greater than a render threshold indicative of a total number of sub-streams a renderer supports when rendering the plurality of audio streams to one or more speaker feeds, the plurality of audio streams to decrease the number of the one or more sub-streams and obtain an adapted plurality of audio stream including a reduced total number of the one or more sub-streams that is equal to or less than the render threshold;
- apply the renderer to the adapted plurality of audio streams to obtain the one or more speaker feeds; and
- output the one or more speaker feeds to one or more speakers.

* * * * *